United States Patent [19]
Fujita et al.

[11] Patent Number: 5,956,110
[45] Date of Patent: Sep. 21, 1999

[54] LIQUID CRYSTAL DISPLAY PANEL AND DISPLAY DEVICE

[75] Inventors: Hiroyuki Fujita; Shigeru Senbonmatsu; Kaori Taniguchi; Shuhei Yamamoto, all of Chiba, Japan; Theo Welzen, Maastricht, Netherlands

[73] Assignee: Seiko Instruments Inc., Japan

[21] Appl. No.: 08/540,087

[22] Filed: Oct. 6, 1995

[51] Int. Cl.⁶ ................................................. G02F 1/335
[52] U.S. Cl. .................... 349/118; 349/119; 349/120; 349/121
[58] Field of Search .................. 349/118–121

[56] References Cited

U.S. PATENT DOCUMENTS

| | | | |
|---|---|---|---|
| 5,126,866 | 6/1992 | Yoshimizu et al. | 349/119 |
| 5,142,393 | 8/1992 | Okumura et al. | 349/121 |
| 5,175,638 | 12/1992 | Kanemoto et al. | 349/121 |
| 5,583,678 | 12/1996 | Nishino et al. | 349/118 |

FOREIGN PATENT DOCUMENTS 379315  7/1990  European Pat. Off. .

2-111918  4/1990  Japan .

OTHER PUBLICATIONS

IBM Technical Disclosure Bulletin, vol. 36, No. 9B, Sep. 1993, New York, U.S.A., H. Hatoh et al., "Normally White Negative Birefringence Film Compensated Twisted Nematic Liquid Crystal Displays With Improved Optical Performance."

Primary Examiner—William L. Sikes
Assistant Examiner—Julie Ngo
Attorney, Agent, or Firm—Adams & Wilks

[57] ABSTRACT

A liquid crystal display panel comprises first and second substrates each having a transparent electrode and an orientation plane, a nematic liquid crystal material disposed between the first and second substrates, a polarizer disposed over the first substrate and the nematic liquid crystal material, and a simplex polymer film comprised of a single optically anisotropic substance disposed between the first substrate and the polarizer. The nematic liquid crystal material has a positive anisotropy of refractive index, a retardation of 0.55 $\mu$m to 1.75 $\mu$m, and molecules twisted at a high degree with a twist angle of 180° to 270°. The simplex polymer film has a retardation of 20 nm to 200 nm.

13 Claims, 84 Drawing Sheets

F I G. 5
PRIOR ART

| Display Mode | Twist Angle (Φ) | Retardation (Δn·d) | Pretilt Angle (θ₀) | Azimuth of Polarizers (β, γ) |
|---|---|---|---|---|
| S B E Mode | 270° | * | 20° | Yellow mode $\beta=30°, \gamma=60°$<br>Blue Mode $\beta=30°, \gamma=-30°$ |
| S T N Mode | 180° | 0.9 μm | ≈1° | $\beta=45°, \gamma=45°$ |
| O M I Mode | 180° | 0.5 μm | ≈1° | $\beta=0°, \gamma=90°$ |

*Δn·d cos²⟨θ⟩ ≈ 0.8 μm

RCF $n_y > n_x = n_z$

LC $n_x > n_y = n_z$

RCF+LC

FIG. 9A RCF
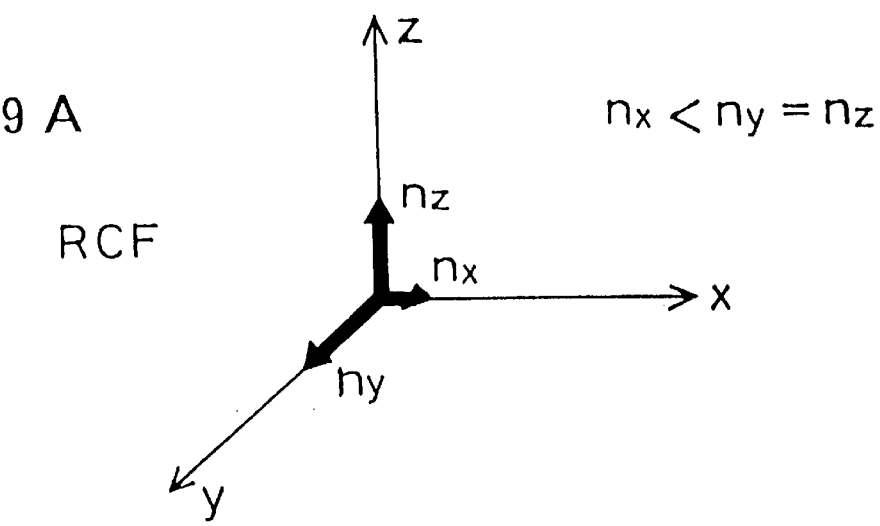
$n_x < n_y = n_z$
FIG. 9B LC
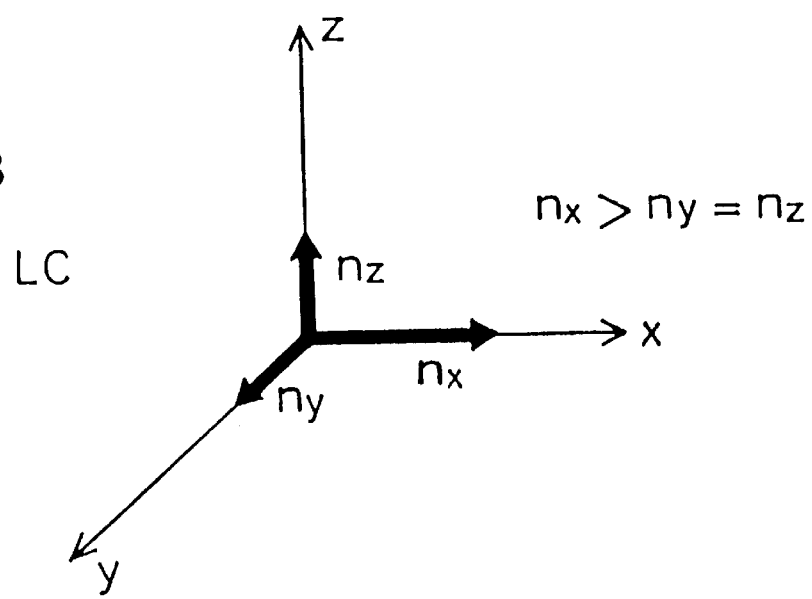
$n_x > n_y = n_z$
FIG. 9C RCF+LC
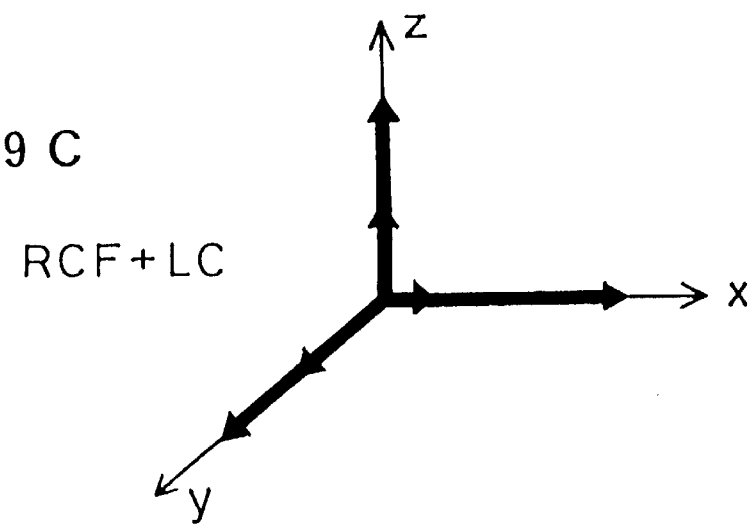

FIG. 14
Sample E
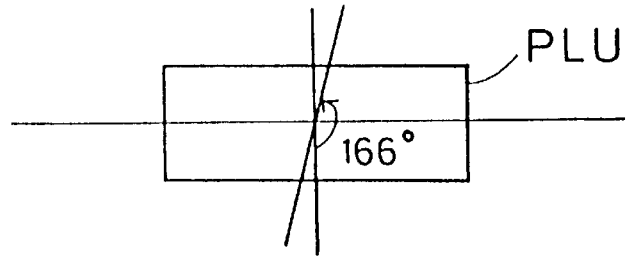
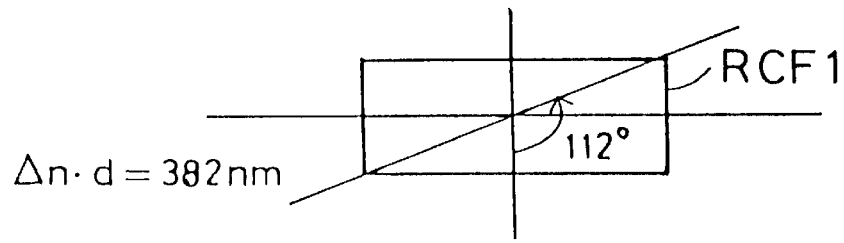
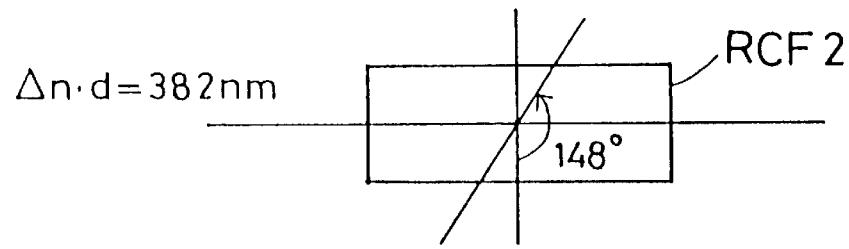
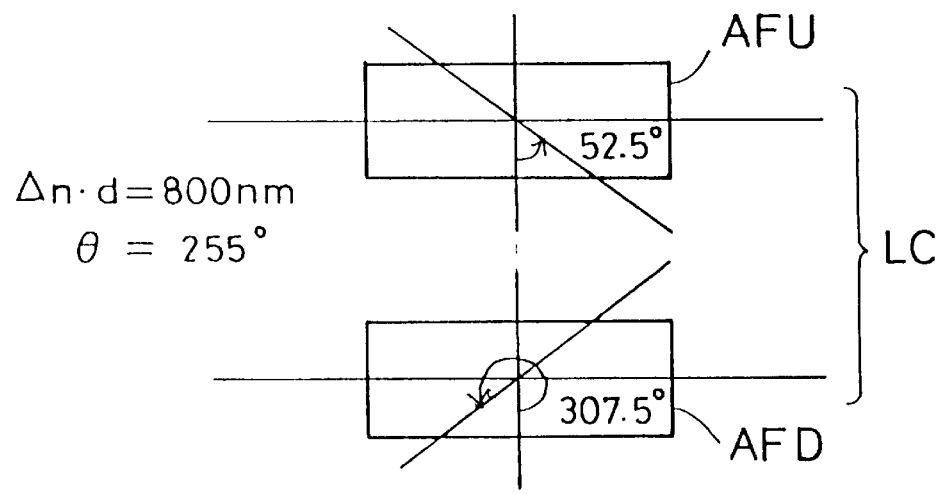
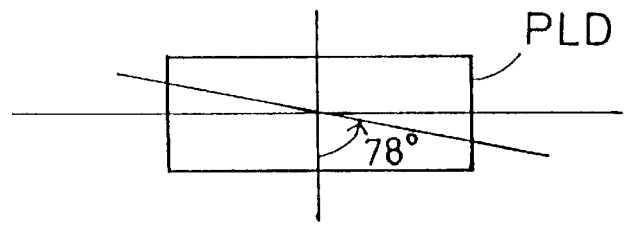

F I G. 2 5
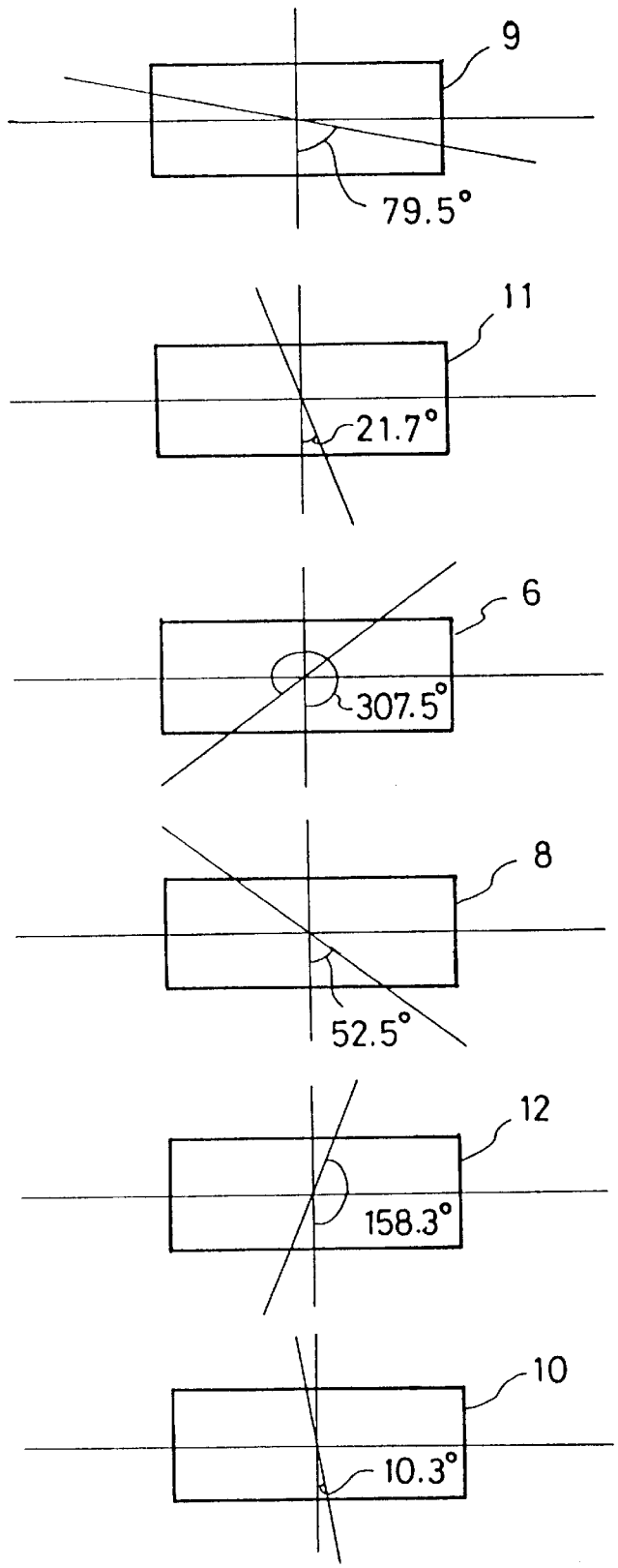

FIG. 26

| | Present Invention | STN | OMI |
|---|---|---|---|
| Retardation of LC Cell | 0.55 μm~0.75 μm | 0.80 μm~0.85 μm | 0.50 μm~0.60 μm |
| Existence of RCF | Yes | Usually Yes | No |
| Retardation of RCF | 0 μm~200 nm | ≃400 nm | — |
| Normally white / Normally Black | Normally white | Normally white / Normally Black | Normally white |
| Twist Angle | 180°~270° | 180°~270° | 180° |

FIG. 37

| Number | Angle θ | Angle Φ | Chromaticity X | Chromaticity Y | Lightness Y |
|---|---|---|---|---|---|
| 1 | 0 | 0 | 0.265 | 0.327 | 0.331 |
| 2 | 10 | 0 | 0.261 | 0.320 | 0.321 |
| 3 | 10 | 10 | 0.261 | 0.320 | 0.321 |
| 4 | 10 | 20 | 0.261 | 0.321 | 0.322 |
| 5 | 10 | 30 | 0.262 | 0.321 | 0.322 |
| 6 | 10 | 40 | 0.262 | 0.321 | 0.322 |
| 7 | 10 | 50 | 0.262 | 0.321 | 0.322 |
| 8 | 10 | 60 | 0.262 | 0.322 | 0.323 |
| 9 | 10 | 70 | 0.262 | 0.322 | 0.323 |
| 10 | 10 | 80 | 0.262 | 0.322 | 0.323 |
| 11 | 10 | 90 | 0.262 | 0.323 | 0.324 |
| 12 | 10 | 100 | 0.263 | 0.324 | 0.325 |
| 13 | 10 | 110 | 0.263 | 0.324 | 0.326 |
| 14 | 10 | 120 | 0.264 | 0.325 | 0.328 |
| 15 | 10 | 130 | 0.264 | 0.326 | 0.330 |
| 16 | 10 | 140 | 0.265 | 0.327 | 0.332 |
| 17 | 10 | 150 | 0.265 | 0.328 | 0.333 |
| 18 | 10 | 160 | 0.266 | 0.329 | 0.335 |
| 19 | 10 | 170 | 0.267 | 0.330 | 0.336 |
| 20 | 10 | 180 | 0.267 | 0.330 | 0.337 |
| 21 | 10 | 190 | 0.267 | 0.330 | 0.337 |
| 22 | 10 | 200 | 0.267 | 0.330 | 0.337 |
| 23 | 10 | 210 | 0.267 | 0.330 | 0.336 |
| 24 | 10 | 220 | 0.267 | 0.329 | 0.335 |
| 25 | 10 | 230 | 0.266 | 0.328 | 0.333 |
| 26 | 10 | 240 | 0.265 | 0.327 | 0.331 |
| 27 | 10 | 250 | 0.264 | 0.325 | 0.329 |

FIG. 38

| Number | Angle θ | Angle Φ | Chromaticity X | Chromaticity Y | Lightness Y |
|---|---|---|---|---|---|
| 28 | 10 | 260 | 0.263 | 0.324 | 0.326 |
| 29 | 10 | 270 | 0.262 | 0.323 | 0.324 |
| 30 | 10 | 280 | 0.262 | 0.322 | 0.322 |
| 31 | 10 | 290 | 0.261 | 0.321 | 0.321 |
| 32 | 10 | 300 | 0.260 | 0.320 | 0.320 |
| 33 | 10 | 310 | 0.260 | 0.320 | 0.319 |
| 34 | 10 | 320 | 0.260 | 0.319 | 0.319 |
| 35 | 10 | 330 | 0.260 | 0.319 | 0.319 |
| 36 | 10 | 340 | 0.260 | 0.319 | 0.320 |
| 37 | 10 | 350 | 0.260 | 0.320 | 0.320 |
| 38 | 20 | 0 | 0.264 | 0.319 | 0.317 |
| 39 | 20 | 10 | 0.265 | 0.320 | 0.318 |
| 40 | 20 | 20 | 0.266 | 0.321 | 0.319 |
| 41 | 20 | 30 | 0.266 | 0.321 | 0.319 |
| 42 | 20 | 40 | 0.266 | 0.322 | 0.318 |
| 43 | 20 | 50 | 0.266 | 0.322 | 0.317 |
| 44 | 20 | 60 | 0.266 | 0.321 | 0.315 |
| 45 | 20 | 70 | 0.265 | 0.321 | 0.314 |
| 46 | 20 | 80 | 0.265 | 0.321 | 0.313 |
| 47 | 20 | 90 | 0.264 | 0.321 | 0.313 |
| 48 | 20 | 100 | 0.264 | 0.322 | 0.315 |
| 49 | 20 | 110 | 0.265 | 0.323 | 0.318 |
| 50 | 20 | 120 | 0.266 | 0.325 | 0.322 |
| 51 | 20 | 130 | 0.268 | 0.327 | 0.327 |
| 52 | 20 | 140 | 0.269 | 0.330 | 0.332 |
| 53 | 20 | 150 | 0.271 | 0.332 | 0.336 |
| 54 | 20 | 160 | 0.273 | 0.335 | 0.340 |

FIG. 39

| Number | Angle θ | Angle Φ | Chromaticity X | Chromaticity Y | Lightness Y |
|---|---|---|---|---|---|
| 55 | 20 | 170 | 0.275 | 0.337 | 0.343 |
| 56 | 20 | 180 | 0.276 | 0.338 | 0.345 |
| 57 | 20 | 190 | 0.277 | 0.339 | 0.346 |
| 58 | 20 | 200 | 0.277 | 0.339 | 0.345 |
| 59 | 20 | 210 | 0.277 | 0.338 | 0.344 |
| 60 | 20 | 220 | 0.276 | 0.336 | 0.341 |
| 61 | 20 | 230 | 0.274 | 0.334 | 0.337 |
| 62 | 20 | 240 | 0.272 | 0.331 | 0.331 |
| 63 | 20 | 250 | 0.269 | 0.328 | 0.325 |
| 64 | 20 | 260 | 0.267 | 0.324 | 0.319 |
| 65 | 20 | 270 | 0.264 | 0.321 | 0.313 |
| 66 | 20 | 280 | 0.262 | 0.318 | 0.309 |
| 67 | 20 | 290 | 0.261 | 0.316 | 0.306 |
| 68 | 20 | 300 | 0.260 | 0.315 | 0.305 |
| 69 | 20 | 310 | 0.260 | 0.315 | 0.306 |
| 70 | 20 | 320 | 0.260 | 0.315 | 0.307 |
| 71 | 20 | 330 | 0.261 | 0.315 | 0.310 |
| 72 | 20 | 340 | 0.262 | 0.316 | 0.312 |
| 73 | 20 | 350 | 0.263 | 0.318 | 0.315 |
| 74 | 30 | 0 | 0.262 | 0.324 | 0.334 |
| 75 | 30 | 10 | 0.264 | 0.326 | 0.337 |
| 76 | 30 | 20 | 0.265 | 0.327 | 0.339 |
| 77 | 30 | 30 | 0.266 | 0.328 | 0.338 |
| 78 | 30 | 40 | 0.267 | 0.327 | 0.335 |
| 79 | 30 | 50 | 0.266 | 0.326 | 0.330 |
| 80 | 30 | 60 | 0.264 | 0.324 | 0.324 |
| 81 | 30 | 70 | 0.262 | 0.321 | 0.317 |

FIG. 40

| Number | Angle θ | Angle Φ | Chromaticity X | Chromaticity Y | Lightness Y |
|---|---|---|---|---|---|
| 82 | 30 | 80 | 0.260 | 0.319 | 0.312 |
| 83 | 30 | 90 | 0.258 | 0.318 | 0.310 |
| 84 | 30 | 100 | 0.257 | 0.319 | 0.312 |
| 85 | 30 | 110 | 0.258 | 0.321 | 0.318 |
| 86 | 30 | 120 | 0.260 | 0.325 | 0.327 |
| 87 | 30 | 130 | 0.263 | 0.329 | 0.338 |
| 88 | 30 | 140 | 0.267 | 0.335 | 0.348 |
| 89 | 30 | 150 | 0.270 | 0.340 | 0.356 |
| 90 | 30 | 160 | 0.273 | 0.345 | 0.363 |
| 91 | 30 | 170 | 0.276 | 0.349 | 0.367 |
| 92 | 30 | 180 | 0.279 | 0.352 | 0.369 |
| 93 | 30 | 190 | 0.281 | 0.353 | 0.370 |
| 94 | 30 | 200 | 0.282 | 0.353 | 0.370 |
| 95 | 30 | 210 | 0.281 | 0.351 | 0.368 |
| 96 | 30 | 220 | 0.280 | 0.348 | 0.364 |
| 97 | 30 | 230 | 0.277 | 0.343 | 0.357 |
| 98 | 30 | 240 | 0.273 | 0.337 | 0.347 |
| 99 | 30 | 250 | 0.268 | 0.331 | 0.335 |
| 100 | 30 | 260 | 0.263 | 0.324 | 0.322 |
| 101 | 30 | 270 | 0.258 | 0.319 | 0.311 |
| 102 | 30 | 280 | 0.255 | 0.315 | 0.302 |
| 103 | 30 | 290 | 0.253 | 0.312 | 0.299 |
| 104 | 30 | 300 | 0.253 | 0.312 | 0.300 |
| 105 | 30 | 310 | 0.253 | 0.312 | 0.304 |
| 106 | 30 | 320 | 0.255 | 0.314 | 0.311 |
| 107 | 30 | 330 | 0.256 | 0.317 | 0.319 |
| 108 | 30 | 340 | 0.258 | 0.319 | 0.325 |

FIG. 41

| Number | Angle θ | Angle Φ | Chromaticity X | Chromaticity Y | Lightness Y |
|---|---|---|---|---|---|
| 109 | 30 | 350 | 0.260 | 0.321 | 0.331 |
| 110 | 40 | 0 | 0.268 | 0.325 | 0.341 |
| 111 | 40 | 10 | 0.271 | 0.328 | 0.344 |
| 112 | 40 | 20 | 0.275 | 0.330 | 0.347 |
| 113 | 40 | 30 | 0.278 | 0.331 | 0.348 |
| 114 | 40 | 40 | 0.279 | 0.331 | 0.345 |
| 115 | 40 | 50 | 0.277 | 0.329 | 0.337 |
| 116 | 40 | 60 | 0.273 | 0.325 | 0.324 |
| 117 | 40 | 70 | 0.267 | 0.319 | 0.310 |
| 118 | 40 | 80 | 0.261 | 0.314 | 0.298 |
| 119 | 40 | 90 | 0.256 | 0.311 | 0.292 |
| 120 | 40 | 100 | 0.254 | 0.311 | 0.295 |
| 121 | 40 | 110 | 0.255 | 0.314 | 0.305 |
| 122 | 40 | 120 | 0.259 | 0.319 | 0.321 |
| 123 | 40 | 130 | 0.264 | 0.327 | 0.338 |
| 124 | 40 | 140 | 0.269 | 0.334 | 0.353 |
| 125 | 40 | 150 | 0.275 | 0.342 | 0.365 |
| 126 | 40 | 160 | 0.280 | 0.349 | 0.371 |
| 127 | 40 | 170 | 0.285 | 0.355 | 0.373 |
| 128 | 40 | 180 | 0.289 | 0.359 | 0.373 |
| 129 | 40 | 190 | 0.293 | 0.361 | 0.373 |
| 130 | 40 | 200 | 0.295 | 0.362 | 0.373 |
| 131 | 40 | 210 | 0.296 | 0.360 | 0.374 |
| 132 | 40 | 220 | 0.294 | 0.356 | 0.373 |
| 133 | 40 | 230 | 0.290 | 0.349 | 0.367 |
| 134 | 40 | 240 | 0.283 | 0.341 | 0.353 |
| 135 | 40 | 250 | 0.274 | 0.331 | 0.334 |

FIG. 42

| Number | Angle θ | Angle Φ | Chromaticity X | Chromaticity Y | Lightness Y |
|---|---|---|---|---|---|
| 136 | 40 | 260 | 0.265 | 0.321 | 0.312 |
| 137 | 40 | 270 | 0.257 | 0.312 | 0.293 |
| 138 | 40 | 280 | 0.252 | 0.306 | 0.280 |
| 139 | 40 | 290 | 0.250 | 0.303 | 0.276 |
| 140 | 40 | 300 | 0.251 | 0.304 | 0.282 |
| 141 | 40 | 310 | 0.253 | 0.307 | 0.294 |
| 142 | 40 | 320 | 0.256 | 0.311 | 0.309 |
| 143 | 40 | 330 | 0.259 | 0.315 | 0.322 |
| 144 | 40 | 340 | 0.262 | 0.318 | 0.332 |
| 145 | 40 | 350 | 0.265 | 0.322 | 0.338 |
| 146 | 50 | 0 | 0.269 | 0.336 | 0.354 |
| 147 | 50 | 10 | 0.273 | 0.342 | 0.359 |
| 148 | 50 | 20 | 0.278 | 0.347 | 0.367 |
| 149 | 50 | 30 | 0.282 | 0.351 | 0.375 |
| 150 | 50 | 40 | 0.285 | 0.352 | 0.374 |
| 151 | 50 | 50 | 0.283 | 0.348 | 0.361 |
| 152 | 50 | 60 | 0.277 | 0.340 | 0.337 |
| 153 | 50 | 70 | 0.268 | 0.329 | 0.308 |
| 154 | 50 | 80 | 0.257 | 0.317 | 0.285 |
| 155 | 50 | 90 | 0.249 | 0.309 | 0.273 |
| 156 | 50 | 100 | 0.246 | 0.306 | 0.276 |
| 157 | 50 | 110 | 0.249 | 0.310 | 0.292 |
| 158 | 50 | 120 | 0.255 | 0.318 | 0.316 |
| 159 | 50 | 130 | 0.263 | 0.329 | 0.342 |
| 160 | 50 | 140 | 0.270 | 0.340 | 0.363 |
| 161 | 50 | 150 | 0.277 | 0.350 | 0.376 |
| 162 | 50 | 160 | 0.283 | 0.359 | 0.380 |

FIG. 43

| Number | Angle θ | Angle Φ | Chromaticity X | Chromaticity Y | Lightness Y |
|---|---|---|---|---|---|
| 163 | 50 | 170 | 0.288 | 0.367 | 0.377 |
| 164 | 50 | 180 | 0.292 | 0.374 | 0.373 |
| 165 | 50 | 190 | 0.296 | 0.379 | 0.373 |
| 166 | 50 | 200 | 0.300 | 0.383 | 0.379 |
| 167 | 50 | 210 | 0.302 | 0.383 | 0.388 |
| 168 | 50 | 220 | 0.301 | 0.379 | 0.394 |
| 169 | 50 | 230 | 0.296 | 0.371 | 0.389 |
| 170 | 50 | 240 | 0.287 | 0.358 | 0.370 |
| 171 | 50 | 250 | 0.275 | 0.343 | 0.339 |
| 172 | 50 | 260 | 0.262 | 0.326 | 0.304 |
| 173 | 50 | 270 | 0.250 | 0.311 | 0.273 |
| 174 | 50 | 280 | 0.244 | 0.301 | 0.254 |
| 175 | 50 | 290 | 0.244 | 0.299 | 0.252 |
| 176 | 50 | 300 | 0.248 | 0.303 | 0.265 |
| 177 | 50 | 310 | 0.254 | 0.309 | 0.288 |
| 178 | 50 | 320 | 0.259 | 0.316 | 0.314 |
| 179 | 50 | 330 | 0.262 | 0.322 | 0.334 |
| 180 | 50 | 340 | 0.265 | 0.326 | 0.347 |
| 181 | 50 | 350 | 0.267 | 0.331 | 0.352 |
| 182 | 60 | 0 | 0.284 | 0.344 | 0.336 |
| 183 | 60 | 10 | 0.289 | 0.349 | 0.332 |
| 184 | 60 | 20 | 0.294 | 0.354 | 0.336 |
| 185 | 60 | 30 | 0.300 | 0.357 | 0.343 |
| 186 | 60 | 40 | 0.304 | 0.356 | 0.343 |
| 187 | 60 | 50 | 0.303 | 0.352 | 0.332 |
| 188 | 60 | 60 | 0.294 | 0.343 | 0.308 |
| 189 | 60 | 70 | 0.280 | 0.329 | 0.278 |

FIG. 44

| Number | Angle θ | Angle Φ | Chromaticity X | Chromaticity Y | Lightness Y |
|---|---|---|---|---|---|
| 190 | 60 | 80 | 0.265 | 0.313 | 0.252 |
| 191 | 60 | 90 | 0.253 | 0.302 | 0.241 |
| 192 | 60 | 100 | 0.249 | 0.300 | 0.248 |
| 193 | 60 | 110 | 0.253 | 0.307 | 0.272 |
| 194 | 60 | 120 | 0.261 | 0.319 | 0.306 |
| 195 | 60 | 130 | 0.271 | 0.334 | 0.340 |
| 196 | 60 | 140 | 0.280 | 0.347 | 0.366 |
| 197 | 60 | 150 | 0.289 | 0.359 | 0.376 |
| 198 | 60 | 160 | 0.296 | 0.369 | 0.371 |
| 199 | 60 | 170 | 0.303 | 0.378 | 0.356 |
| 200 | 60 | 180 | 0.309 | 0.385 | 0.339 |
| 201 | 60 | 190 | 0.315 | 0.390 | 0.329 |
| 202 | 60 | 200 | 0.320 | 0.393 | 0.329 |
| 203 | 60 | 210 | 0.324 | 0.392 | 0.338 |
| 204 | 60 | 220 | 0.324 | 0.386 | 0.349 |
| 205 | 60 | 230 | 0.317 | 0.376 | 0.352 |
| 206 | 60 | 240 | 0.305 | 0.362 | 0.340 |
| 207 | 60 | 250 | 0.288 | 0.345 | 0.312 |
| 208 | 60 | 260 | 0.271 | 0.324 | 0.274 |
| 209 | 60 | 270 | 0.255 | 0.306 | 0.239 |
| 210 | 60 | 280 | 0.247 | 0.295 | 0.219 |
| 211 | 60 | 290 | 0.248 | 0.296 | 0.221 |
| 212 | 60 | 300 | 0.255 | 0.305 | 0.243 |
| 213 | 60 | 310 | 0.264 | 0.317 | 0.278 |
| 214 | 60 | 320 | 0.271 | 0.326 | 0.314 |
| 215 | 60 | 330 | 0.275 | 0.332 | 0.340 |
| 216 | 60 | 340 | 0.278 | 0.336 | 0.349 |
| 217 | 60 | 350 | 0.281 | 0.339 | 0.345 |

FIG. 45

| Number | Angle θ | Angle Φ | Chromaticity X | Chromaticity Y | Lightness Y |
|---|---|---|---|---|---|
| 1 | 0 | 0 | 0.182 | 0.061 | 0.003 |
| 2 | 10 | 0 | 0.154 | 0.085 | 0.007 |
| 3 | 10 | 10 | 0.154 | 0.086 | 0.007 |
| 4 | 10 | 20 | 0.154 | 0.086 | 0.007 |
| 5 | 10 | 30 | 0.155 | 0.087 | 0.007 |
| 6 | 10 | 40 | 0.156 | 0.087 | 0.007 |
| 7 | 10 | 50 | 0.159 | 0.088 | 0.007 |
| 8 | 10 | 60 | 0.162 | 0.089 | 0.007 |
| 9 | 10 | 70 | 0.167 | 0.092 | 0.007 |
| 10 | 10 | 80 | 0.173 | 0.095 | 0.007 |
| 11 | 10 | 90 | 0.182 | 0.100 | 0.006 |
| 12 | 10 | 100 | 0.193 | 0.106 | 0.006 |
| 13 | 10 | 110 | 0.206 | 0.112 | 0.006 |
| 14 | 10 | 120 | 0.222 | 0.119 | 0.006 |
| 15 | 10 | 130 | 0.240 | 0.127 | 0.005 |
| 16 | 10 | 140 | 0.260 | 0.133 | 0.005 |
| 17 | 10 | 150 | 0.280 | 0.139 | 0.004 |
| 18 | 10 | 160 | 0.299 | 0.143 | 0.004 |
| 19 | 10 | 170 | 0.311 | 0.144 | 0.004 |
| 20 | 10 | 180 | 0.313 | 0.142 | 0.004 |
| 21 | 10 | 190 | 0.303 | 0.138 | 0.004 |
| 22 | 10 | 200 | 0.285 | 0.134 | 0.004 |
| 23 | 10 | 210 | 0.265 | 0.129 | 0.004 |
| 24 | 10 | 220 | 0.245 | 0.124 | 0.005 |
| 25 | 10 | 230 | 0.227 | 0.119 | 0.005 |
| 26 | 10 | 240 | 0.213 | 0.113 | 0.006 |
| 27 | 10 | 250 | 0.200 | 0.108 | 0.006 |

FIG. 46

| Number | Angle θ | Angle Φ | Chromaticity X | Chromaticity Y | Lightness Y |
|---|---|---|---|---|---|
| 28 | 10 | 260 | 0.189 | 0.102 | 0.006 |
| 29 | 10 | 270 | 0.180 | 0.097 | 0.006 |
| 30 | 10 | 280 | 0.173 | 0.092 | 0.006 |
| 31 | 10 | 290 | 0.167 | 0.088 | 0.006 |
| 32 | 10 | 300 | 0.163 | 0.086 | 0.006 |
| 33 | 10 | 310 | 0.159 | 0.084 | 0.006 |
| 34 | 10 | 320 | 0.157 | 0.083 | 0.007 |
| 35 | 10 | 330 | 0.156 | 0.083 | 0.007 |
| 36 | 10 | 340 | 0.155 | 0.084 | 0.007 |
| 37 | 10 | 350 | 0.154 | 0.084 | 0.007 |
| 38 | 20 | 0 | 0.158 | 0.117 | 0.016 |
| 39 | 20 | 10 | 0.160 | 0.120 | 0.017 |
| 40 | 20 | 20 | 0.161 | 0.123 | 0.018 |
| 41 | 20 | 30 | 0.162 | 0.125 | 0.018 |
| 42 | 20 | 40 | 0.163 | 0.127 | 0.019 |
| 43 | 20 | 50 | 0.164 | 0.129 | 0.019 |
| 44 | 20 | 60 | 0.167 | 0.131 | 0.020 |
| 45 | 20 | 70 | 0.171 | 0.135 | 0.020 |
| 46 | 20 | 80 | 0.178 | 0.142 | 0.020 |
| 47 | 20 | 90 | 0.188 | 0.150 | 0.020 |
| 48 | 20 | 100 | 0.199 | 0.161 | 0.020 |
| 49 | 20 | 110 | 0.213 | 0.172 | 0.020 |
| 50 | 20 | 120 | 0.230 | 0.184 | 0.018 |
| 51 | 20 | 130 | 0.250 | 0.197 | 0.016 |
| 52 | 20 | 140 | 0.275 | 0.210 | 0.014 |
| 53 | 20 | 150 | 0.308 | 0.222 | 0.011 |
| 54 | 20 | 160 | 0.348 | 0.233 | 0.008 |

FIG. 47

| Number | Angle θ | Angle Φ | Chromaticity X | Chromaticity Y | Lightness Y |
|---|---|---|---|---|---|
| 55 | 20 | 170 | 0.386 | 0.235 | 0.006 |
| 56 | 20 | 180 | 0.391 | 0.225 | 0.006 |
| 57 | 20 | 190 | 0.351 | 0.209 | 0.006 |
| 58 | 20 | 200 | 0.301 | 0.197 | 0.007 |
| 59 | 20 | 210 | 0.265 | 0.191 | 0.010 |
| 60 | 20 | 220 | 0.242 | 0.186 | 0.013 |
| 61 | 20 | 230 | 0.226 | 0.180 | 0.016 |
| 62 | 20 | 240 | 0.214 | 0.173 | 0.018 |
| 63 | 20 | 250 | 0.202 | 0.164 | 0.019 |
| 64 | 20 | 260 | 0.192 | 0.153 | 0.019 |
| 65 | 20 | 270 | 0.182 | 0.142 | 0.018 |
| 66 | 20 | 280 | 0.173 | 0.131 | 0.017 |
| 67 | 20 | 290 | 0.166 | 0.122 | 0.016 |
| 68 | 20 | 300 | 0.161 | 0.116 | 0.015 |
| 69 | 20 | 310 | 0.158 | 0.112 | 0.015 |
| 70 | 20 | 320 | 0.157 | 0.110 | 0.014 |
| 71 | 20 | 330 | 0.157 | 0.110 | 0.014 |
| 72 | 20 | 340 | 0.157 | 0.112 | 0.015 |
| 73 | 20 | 350 | 0.158 | 0.114 | 0.015 |
| 74 | 30 | 0 | 0.165 | 0.134 | 0.022 |
| 75 | 30 | 10 | 0.169 | 0.143 | 0.025 |
| 76 | 30 | 20 | 0.173 | 0.152 | 0.030 |
| 77 | 30 | 30 | 0.177 | 0.159 | 0.035 |
| 78 | 30 | 40 | 0.178 | 0.163 | 0.039 |
| 79 | 30 | 50 | 0.180 | 0.165 | 0.041 |
| 80 | 30 | 60 | 0.181 | 0.168 | 0.043 |
| 81 | 30 | 70 | 0.185 | 0.172 | 0.045 |

FIG. 48

| Number | Angle θ | Angle Φ | Chromaticity X | Chromaticity Y | Lightness Y |
|---|---|---|---|---|---|
| 82 | 30 | 80 | 0.191 | 0.179 | 0.048 |
| 83 | 30 | 90 | 0.200 | 0.188 | 0.050 |
| 84 | 30 | 100 | 0.210 | 0.198 | 0.050 |
| 85 | 30 | 110 | 0.220 | 0.207 | 0.048 |
| 86 | 30 | 120 | 0.232 | 0.215 | 0.043 |
| 87 | 30 | 130 | 0.245 | 0.222 | 0.036 |
| 88 | 30 | 140 | 0.260 | 0.225 | 0.027 |
| 89 | 30 | 150 | 0.278 | 0.222 | 0.018 |
| 90 | 30 | 160 | 0.297 | 0.205 | 0.011 |
| 91 | 30 | 170 | 0.307 | 0.163 | 0.006 |
| 92 | 30 | 180 | 0.285 | 0.123 | 0.004 |
| 93 | 30 | 190 | 0.251 | 0.136 | 0.006 |
| 94 | 30 | 200 | 0.235 | 0.170 | 0.011 |
| 95 | 30 | 210 | 0.231 | 0.193 | 0.020 |
| 96 | 30 | 220 | 0.228 | 0.206 | 0.030 |
| 97 | 30 | 230 | 0.224 | 0.210 | 0.039 |
| 98 | 30 | 240 | 0.219 | 0.207 | 0.046 |
| 99 | 30 | 250 | 0.211 | 0.200 | 0.048 |
| 100 | 30 | 260 | 0.202 | 0.190 | 0.047 |
| 101 | 30 | 270 | 0.191 | 0.176 | 0.043 |
| 102 | 30 | 280 | 0.181 | 0.162 | 0.038 |
| 103 | 30 | 290 | 0.172 | 0.150 | 0.033 |
| 104 | 30 | 300 | 0.167 | 0.141 | 0.029 |
| 105 | 30 | 310 | 0.164 | 0.134 | 0.026 |
| 106 | 30 | 320 | 0.163 | 0.131 | 0.024 |
| 107 | 30 | 330 | 0.162 | 0.128 | 0.022 |
| 108 | 30 | 340 | 0.161 | 0.127 | 0.020 |

FIG. 49

| Number | Angle θ | Angle Φ | Chromaticity X | Chromaticity Y | Lightness Y |
|---|---|---|---|---|---|
| 109 | 30 | 350 | 0.162 | 0.128 | 0.020 |
| 110 | 40 | 0 | 0.165 | 0.137 | 0.020 |
| 111 | 40 | 10 | 0.177 | 0.158 | 0.029 |
| 112 | 40 | 20 | 0.187 | 0.176 | 0.042 |
| 113 | 40 | 30 | 0.193 | 0.187 | 0.055 |
| 114 | 40 | 40 | 0.196 | 0.192 | 0.066 |
| 115 | 40 | 50 | 0.197 | 0.194 | 0.073 |
| 116 | 40 | 60 | 0.197 | 0.196 | 0.078 |
| 117 | 40 | 70 | 0.200 | 0.200 | 0.084 |
| 118 | 40 | 80 | 0.206 | 0.207 | 0.092 |
| 119 | 40 | 90 | 0.214 | 0.215 | 0.097 |
| 120 | 40 | 100 | 0.222 | 0.224 | 0.099 |
| 121 | 40 | 110 | 0.230 | 0.230 | 0.092 |
| 122 | 40 | 120 | 0.238 | 0.234 | 0.079 |
| 123 | 40 | 130 | 0.244 | 0.233 | 0.062 |
| 124 | 40 | 140 | 0.246 | 0.222 | 0.043 |
| 125 | 40 | 150 | 0.241 | 0.196 | 0.026 |
| 126 | 40 | 160 | 0.221 | 0.145 | 0.013 |
| 127 | 40 | 170 | 0.185 | 0.082 | 0.006 |
| 128 | 40 | 180 | 0.162 | 0.064 | 0.005 |
| 129 | 40 | 190 | 0.174 | 0.109 | 0.011 |
| 130 | 40 | 200 | 0.198 | 0.163 | 0.024 |
| 131 | 40 | 210 | 0.217 | 0.200 | 0.043 |
| 132 | 40 | 220 | 0.228 | 0.222 | 0.064 |
| 133 | 40 | 230 | 0.232 | 0.232 | 0.083 |
| 134 | 40 | 240 | 0.230 | 0.233 | 0.096 |
| 135 | 40 | 250 | 0.224 | 0.227 | 0.100 |

FIG. 50

| Number | Angle θ | Angle Φ | Chromaticity X | Chromaticity Y | Lightness Y |
|---|---|---|---|---|---|
| 136 | 40 | 260 | 0.215 | 0.217 | 0.096 |
| 137 | 40 | 270 | 0.204 | 0.203 | 0.085 |
| 138 | 40 | 280 | 0.193 | 0.188 | 0.072 |
| 139 | 40 | 290 | 0.183 | 0.173 | 0.060 |
| 140 | 40 | 300 | 0.177 | 0.162 | 0.050 |
| 141 | 40 | 310 | 0.174 | 0.155 | 0.042 |
| 142 | 40 | 320 | 0.173 | 0.149 | 0.035 |
| 143 | 40 | 330 | 0.170 | 0.142 | 0.027 |
| 144 | 40 | 340 | 0.165 | 0.133 | 0.021 |
| 145 | 40 | 350 | 0.161 | 0.128 | 0.018 |
| 146 | 50 | 0 | 0.161 | 0.127 | 0.013 |
| 147 | 50 | 10 | 0.185 | 0.171 | 0.027 |
| 148 | 50 | 20 | 0.202 | 0.200 | 0.051 |
| 149 | 50 | 30 | 0.210 | 0.214 | 0.075 |
| 150 | 50 | 40 | 0.212 | 0.220 | 0.094 |
| 151 | 50 | 50 | 0.212 | 0.222 | 0.105 |
| 152 | 50 | 60 | 0.212 | 0.223 | 0.113 |
| 153 | 50 | 70 | 0.214 | 0.227 | 0.126 |
| 154 | 50 | 80 | 0.219 | 0.233 | 0.141 |
| 155 | 50 | 90 | 0.225 | 0.241 | 0.154 |
| 156 | 50 | 100 | 0.232 | 0.248 | 0.157 |
| 157 | 50 | 110 | 0.238 | 0.251 | 0.145 |
| 158 | 50 | 120 | 0.242 | 0.250 | 0.121 |
| 159 | 50 | 130 | 0.240 | 0.240 | 0.091 |
| 160 | 50 | 140 | 0.231 | 0.217 | 0.062 |
| 161 | 50 | 150 | 0.211 | 0.180 | 0.039 |
| 162 | 50 | 160 | 0.183 | 0.138 | 0.025 |

FIG. 51

| Number | Angle θ | Angle Φ | Chromaticity X | Chromaticity Y | Lightness Y |
|---|---|---|---|---|---|
| 163 | 50 | 170 | 0.162 | 0.114 | 0.020 |
| 164 | 50 | 180 | 0.161 | 0.124 | 0.024 |
| 165 | 50 | 190 | 0.179 | 0.157 | 0.037 |
| 166 | 50 | 200 | 0.202 | 0.194 | 0.059 |
| 167 | 50 | 210 | 0.222 | 0.225 | 0.087 |
| 168 | 50 | 220 | 0.236 | 0.246 | 0.117 |
| 169 | 50 | 230 | 0.243 | 0.257 | 0.143 |
| 170 | 50 | 240 | 0.243 | 0.260 | 0.160 |
| 171 | 50 | 250 | 0.238 | 0.256 | 0.164 |
| 172 | 50 | 260 | 0.228 | 0.245 | 0.155 |
| 173 | 50 | 270 | 0.215 | 0.229 | 0.137 |
| 174 | 50 | 280 | 0.203 | 0.212 | 0.115 |
| 175 | 50 | 290 | 0.192 | 0.197 | 0.094 |
| 176 | 50 | 300 | 0.187 | 0.185 | 0.078 |
| 177 | 50 | 310 | 0.185 | 0.177 | 0.064 |
| 178 | 50 | 320 | 0.186 | 0.172 | 0.050 |
| 179 | 50 | 330 | 0.185 | 0.163 | 0.035 |
| 180 | 50 | 340 | 0.177 | 0.144 | 0.021 |
| 181 | 50 | 350 | 0.160 | 0.116 | 0.011 |
| 182 | 60 | 0 | 0.162 | 0.099 | 0.006 |
| 183 | 60 | 10 | 0.196 | 0.179 | 0.024 |
| 184 | 60 | 20 | 0.214 | 0.212 | 0.057 |
| 185 | 60 | 30 | 0.222 | 0.225 | 0.091 |
| 186 | 60 | 40 | 0.226 | 0.231 | 0.116 |
| 187 | 60 | 50 | 0.226 | 0.235 | 0.129 |
| 188 | 60 | 60 | 0.226 | 0.238 | 0.140 |
| 189 | 60 | 70 | 0.228 | 0.244 | 0.159 |

FIG. 52

| Number | Angle θ | Angle Φ | Chromaticity X | Chromaticity Y | Lightness Y |
|---|---|---|---|---|---|
| 190 | 60 | 80 | 0.234 | 0.252 | 0.185 |
| 191 | 60 | 90 | 0.241 | 0.260 | 0.206 |
| 192 | 60 | 100 | 0.248 | 0.266 | 0.211 |
| 193 | 60 | 110 | 0.251 | 0.268 | 0.192 |
| 194 | 60 | 120 | 0.250 | 0.262 | 0.158 |
| 195 | 60 | 130 | 0.241 | 0.244 | 0.118 |
| 196 | 60 | 140 | 0.223 | 0.215 | 0.084 |
| 197 | 60 | 150 | 0.200 | 0.182 | 0.062 |
| 198 | 60 | 160 | 0.182 | 0.161 | 0.052 |
| 199 | 60 | 170 | 0.177 | 0.160 | 0.054 |
| 200 | 60 | 180 | 0.184 | 0.175 | 0.066 |
| 201 | 60 | 190 | 0.199 | 0.198 | 0.086 |
| 202 | 60 | 200 | 0.217 | 0.222 | 0.114 |
| 203 | 60 | 210 | 0.234 | 0.243 | 0.146 |
| 204 | 60 | 220 | 0.249 | 0.261 | 0.179 |
| 205 | 60 | 230 | 0.258 | 0.274 | 0.207 |
| 206 | 60 | 240 | 0.260 | 0.280 | 0.224 |
| 207 | 60 | 250 | 0.255 | 0.277 | 0.226 |
| 208 | 60 | 260 | 0.244 | 0.265 | 0.212 |
| 209 | 60 | 270 | 0.230 | 0.249 | 0.186 |
| 210 | 60 | 280 | 0.216 | 0.230 | 0.156 |
| 211 | 60 | 290 | 0.205 | 0.214 | 0.128 |
| 212 | 60 | 300 | 0.199 | 0.202 | 0.106 |
| 213 | 60 | 310 | 0.198 | 0.196 | 0.086 |
| 214 | 60 | 320 | 0.202 | 0.193 | 0.067 |
| 215 | 60 | 330 | 0.206 | 0.188 | 0.045 |
| 216 | 60 | 340 | 0.204 | 0.169 | 0.023 |
| 217 | 60 | 350 | 0.179 | 0.110 | 0.007 |

FIG. 53

| Number | Angle θ | Angle Φ | Chromaticity X | Chromaticity Y | Lightness Y |
|---|---|---|---|---|---|
| 1 | 0 | 0 | 0.297 | 0.345 | 0.373 |
| 2 | 10 | 0 | 0.280 | 0.322 | 0.334 |
| 3 | 10 | 10 | 0.280 | 0.322 | 0.335 |
| 4 | 10 | 20 | 0.281 | 0.323 | 0.338 |
| 5 | 10 | 30 | 0.282 | 0.325 | 0.341 |
| 6 | 10 | 40 | 0.283 | 0.326 | 0.345 |
| 7 | 10 | 50 | 0.285 | 0.329 | 0.349 |
| 8 | 10 | 60 | 0.286 | 0.332 | 0.353 |
| 9 | 10 | 70 | 0.289 | 0.335 | 0.358 |
| 10 | 10 | 80 | 0.291 | 0.338 | 0.361 |
| 11 | 10 | 90 | 0.294 | 0.342 | 0.365 |
| 12 | 10 | 100 | 0.296 | 0.346 | 0.368 |
| 13 | 10 | 110 | 0.299 | 0.349 | 0.370 |
| 14 | 10 | 120 | 0.302 | 0.353 | 0.372 |
| 15 | 10 | 130 | 0.304 | 0.356 | 0.373 |
| 16 | 10 | 140 | 0.307 | 0.359 | 0.375 |
| 17 | 10 | 150 | 0.309 | 0.362 | 0.376 |
| 18 | 10 | 160 | 0.310 | 0.364 | 0.376 |
| 19 | 10 | 170 | 0.311 | 0.365 | 0.377 |
| 20 | 10 | 180 | 0.311 | 0.365 | 0.377 |
| 21 | 10 | 190 | 0.311 | 0.364 | 0.378 |
| 22 | 10 | 200 | 0.310 | 0.363 | 0.378 |
| 23 | 10 | 210 | 0.309 | 0.361 | 0.378 |
| 24 | 10 | 220 | 0.307 | 0.359 | 0.377 |
| 25 | 10 | 230 | 0.305 | 0.356 | 0.376 |
| 26 | 10 | 240 | 0.302 | 0.353 | 0.374 |
| 27 | 10 | 250 | 0.299 | 0.349 | 0.372 |

FIG. 54

| Number | Angle θ | Angle Φ | Chromaticity X | Chromaticity Y | Lightness Y |
|---|---|---|---|---|---|
| 28 | 10 | 260 | 0.297 | 0.346 | 0.369 |
| 29 | 10 | 270 | 0.294 | 0.342 | 0.365 |
| 30 | 10 | 280 | 0.291 | 0.338 | 0.361 |
| 31 | 10 | 290 | 0.288 | 0.335 | 0.356 |
| 32 | 10 | 300 | 0.286 | 0.332 | 0.351 |
| 33 | 10 | 310 | 0.284 | 0.329 | 0.346 |
| 34 | 10 | 320 | 0.282 | 0.326 | 0.342 |
| 35 | 10 | 330 | 0.281 | 0.325 | 0.338 |
| 36 | 10 | 340 | 0.280 | 0.323 | 0.336 |
| 37 | 10 | 350 | 0.280 | 0.322 | 0.334 |
| 38 | 20 | 0 | 0.274 | 0.306 | 0.287 |
| 39 | 20 | 10 | 0.275 | 0.306 | 0.292 |
| 40 | 20 | 20 | 0.275 | 0.307 | 0.300 |
| 41 | 20 | 30 | 0.276 | 0.308 | 0.310 |
| 42 | 20 | 40 | 0.277 | 0.310 | 0.321 |
| 43 | 20 | 50 | 0.278 | 0.313 | 0.333 |
| 44 | 20 | 60 | 0.280 | 0.317 | 0.343 |
| 45 | 20 | 70 | 0.283 | 0.322 | 0.352 |
| 46 | 20 | 80 | 0.287 | 0.326 | 0.359 |
| 47 | 20 | 90 | 0.291 | 0.332 | 0.363 |
| 48 | 20 | 100 | 0.295 | 0.337 | 0.365 |
| 49 | 20 | 110 | 0.300 | 0.343 | 0.365 |
| 50 | 20 | 120 | 0.305 | 0.348 | 0.364 |
| 51 | 20 | 130 | 0.310 | 0.354 | 0.362 |
| 52 | 20 | 140 | 0.314 | 0.358 | 0.360 |
| 53 | 20 | 150 | 0.318 | 0.362 | 0.359 |
| 54 | 20 | 160 | 0.320 | 0.364 | 0.359 |

FIG. 55

| Number | Angle θ | Angle Φ | Chromaticity X | Chromaticity Y | Lightness Y |
|---|---|---|---|---|---|
| 55 | 20 | 170 | 0.321 | 0.366 | 0.361 |
| 56 | 20 | 180 | 0.322 | 0.366 | 0.363 |
| 57 | 20 | 190 | 0.321 | 0.365 | 0.366 |
| 58 | 20 | 200 | 0.320 | 0.363 | 0.369 |
| 59 | 20 | 210 | 0.317 | 0.361 | 0.372 |
| 60 | 20 | 220 | 0.314 | 0.357 | 0.374 |
| 61 | 20 | 230 | 0.310 | 0.353 | 0.375 |
| 62 | 20 | 240 | 0.306 | 0.348 | 0.375 |
| 63 | 20 | 250 | 0.301 | 0.343 | 0.373 |
| 64 | 20 | 260 | 0.296 | 0.337 | 0.370 |
| 65 | 20 | 270 | 0.291 | 0.332 | 0.363 |
| 66 | 20 | 280 | 0.286 | 0.326 | 0.355 |
| 67 | 20 | 290 | 0.282 | 0.321 | 0.344 |
| 68 | 20 | 300 | 0.279 | 0.316 | 0.332 |
| 69 | 20 | 310 | 0.276 | 0.312 | 0.319 |
| 70 | 20 | 320 | 0.274 | 0.308 | 0.307 |
| 71 | 20 | 330 | 0.274 | 0.307 | 0.297 |
| 72 | 20 | 340 | 0.274 | 0.306 | 0.290 |
| 73 | 20 | 350 | 0.274 | 0.305 | 0.286 |
| 74 | 30 | 0 | 0.275 | 0.304 | 0.227 |
| 75 | 30 | 10 | 0.275 | 0.304 | 0.237 |
| 76 | 30 | 20 | 0.273 | 0.301 | 0.252 |
| 77 | 30 | 30 | 0.271 | 0.299 | 0.270 |
| 78 | 30 | 40 | 0.270 | 0.298 | 0.289 |
| 79 | 30 | 50 | 0.269 | 0.299 | 0.306 |
| 80 | 30 | 60 | 0.271 | 0.301 | 0.320 |
| 81 | 30 | 70 | 0.273 | 0.305 | 0.330 |

FIG. 56

| Number | Angle θ | Angle Φ | Chromaticity X | Chromaticity Y | Lightness Y |
|---|---|---|---|---|---|
| 82 | 30 | 80 | 0.276 | 0.309 | 0.337 |
| 83 | 30 | 90 | 0.280 | 0.313 | 0.338 |
| 84 | 30 | 100 | 0.285 | 0.318 | 0.333 |
| 85 | 30 | 110 | 0.291 | 0.323 | 0.323 |
| 86 | 30 | 120 | 0.297 | 0.329 | 0.311 |
| 87 | 30 | 130 | 0.303 | 0.334 | 0.298 |
| 88 | 30 | 140 | 0.308 | 0.338 | 0.289 |
| 89 | 30 | 150 | 0.311 | 0.340 | 0.284 |
| 90 | 30 | 160 | 0.313 | 0.340 | 0.284 |
| 91 | 30 | 170 | 0.314 | 0.340 | 0.287 |
| 92 | 30 | 180 | 0.314 | 0.340 | 0.293 |
| 93 | 30 | 190 | 0.314 | 0.340 | 0.301 |
| 94 | 30 | 200 | 0.313 | 0.339 | 0.309 |
| 95 | 30 | 210 | 0.311 | 0.338 | 0.318 |
| 96 | 30 | 220 | 0.308 | 0.335 | 0.326 |
| 97 | 30 | 230 | 0.304 | 0.332 | 0.333 |
| 98 | 30 | 240 | 0.298 | 0.328 | 0.339 |
| 99 | 30 | 250 | 0.293 | 0.323 | 0.342 |
| 100 | 30 | 260 | 0.287 | 0.319 | 0.343 |
| 101 | 30 | 270 | 0.281 | 0.314 | 0.340 |
| 102 | 30 | 280 | 0.276 | 0.310 | 0.331 |
| 103 | 30 | 290 | 0.271 | 0.304 | 0.318 |
| 104 | 30 | 300 | 0.267 | 0.299 | 0.300 |
| 105 | 30 | 310 | 0.264 | 0.295 | 0.279 |
| 106 | 30 | 320 | 0.264 | 0.294 | 0.258 |
| 107 | 30 | 330 | 0.267 | 0.295 | 0.240 |
| 108 | 30 | 340 | 0.270 | 0.299 | 0.228 |

FIG. 57

| Number | Angle θ | Angle Φ | Chromaticity X | Chromaticity Y | Lightness Y |
|---|---|---|---|---|---|
| 109 | 30 | 350 | 0.274 | 0.303 | 0.224 |
| 110 | 40 | 0 | 0.285 | 0.319 | 0.182 |
| 111 | 40 | 10 | 0.284 | 0.316 | 0.199 |
| 112 | 40 | 20 | 0.278 | 0.308 | 0.223 |
| 113 | 40 | 30 | 0.271 | 0.301 | 0.251 |
| 114 | 40 | 40 | 0.267 | 0.297 | 0.277 |
| 115 | 40 | 50 | 0.265 | 0.297 | 0.298 |
| 116 | 40 | 60 | 0.265 | 0.299 | 0.313 |
| 117 | 40 | 70 | 0.267 | 0.302 | 0.322 |
| 118 | 40 | 80 | 0.269 | 0.303 | 0.325 |
| 119 | 40 | 90 | 0.270 | 0.301 | 0.317 |
| 120 | 40 | 100 | 0.273 | 0.299 | 0.296 |
| 121 | 40 | 110 | 0.276 | 0.296 | 0.265 |
| 122 | 40 | 120 | 0.280 | 0.293 | 0.231 |
| 123 | 40 | 130 | 0.284 | 0.289 | 0.202 |
| 124 | 40 | 140 | 0.285 | 0.284 | 0.181 |
| 125 | 40 | 150 | 0.287 | 0.281 | 0.169 |
| 126 | 40 | 160 | 0.288 | 0.280 | 0.165 |
| 127 | 40 | 170 | 0.291 | 0.282 | 0.169 |
| 128 | 40 | 180 | 0.293 | 0.285 | 0.179 |
| 129 | 40 | 190 | 0.294 | 0.289 | 0.195 |
| 130 | 40 | 200 | 0.295 | 0.294 | 0.215 |
| 131 | 40 | 210 | 0.295 | 0.298 | 0.235 |
| 132 | 40 | 220 | 0.295 | 0.302 | 0.255 |
| 133 | 40 | 230 | 0.292 | 0.305 | 0.274 |
| 134 | 40 | 240 | 0.288 | 0.306 | 0.291 |
| 135 | 40 | 250 | 0.282 | 0.305 | 0.306 |

FIG. 58

| Number | Angle θ | Angle Φ | Chromaticity X | Chromaticity Y | Lightness Y |
|---|---|---|---|---|---|
| 136 | 40 | 260 | 0.277 | 0.304 | 0.317 |
| 137 | 40 | 270 | 0.272 | 0.303 | 0.321 |
| 138 | 40 | 280 | 0.267 | 0.300 | 0.317 |
| 139 | 40 | 290 | 0.261 | 0.295 | 0.303 |
| 140 | 40 | 300 | 0.256 | 0.288 | 0.280 |
| 141 | 40 | 310 | 0.254 | 0.283 | 0.251 |
| 142 | 40 | 320 | 0.255 | 0.284 | 0.220 |
| 143 | 40 | 330 | 0.262 | 0.291 | 0.195 |
| 144 | 40 | 340 | 0.272 | 0.303 | 0.179 |
| 145 | 40 | 350 | 0.281 | 0.314 | 0.175 |
| 146 | 50 | 0 | 0.292 | 0.331 | 0.157 |
| 147 | 50 | 10 | 0.288 | 0.324 | 0.180 |
| 148 | 50 | 20 | 0.278 | 0.310 | 0.210 |
| 149 | 50 | 30 | 0.269 | 0.297 | 0.242 |
| 150 | 50 | 40 | 0.263 | 0.290 | 0.268 |
| 151 | 50 | 50 | 0.262 | 0.290 | 0.285 |
| 152 | 50 | 60 | 0.264 | 0.294 | 0.293 |
| 153 | 50 | 70 | 0.266 | 0.298 | 0.298 |
| 154 | 50 | 80 | 0.265 | 0.295 | 0.296 |
| 155 | 50 | 90 | 0.262 | 0.285 | 0.280 |
| 156 | 50 | 100 | 0.258 | 0.269 | 0.244 |
| 157 | 50 | 110 | 0.253 | 0.249 | 0.193 |
| 158 | 50 | 120 | 0.246 | 0.226 | 0.144 |
| 159 | 50 | 130 | 0.237 | 0.203 | 0.109 |
| 160 | 50 | 140 | 0.230 | 0.188 | 0.087 |
| 161 | 50 | 150 | 0.228 | 0.179 | 0.071 |
| 162 | 50 | 160 | 0.235 | 0.174 | 0.057 |

FIG. 59

| Number | Angle θ | Angle Φ | Chromaticity X | Chromaticity Y | Lightness Y |
|---|---|---|---|---|---|
| 163 | 50 | 170 | 0.247 | 0.175 | 0.050 |
| 164 | 50 | 180 | 0.259 | 0.189 | 0.057 |
| 165 | 50 | 190 | 0.263 | 0.211 | 0.079 |
| 166 | 50 | 200 | 0.266 | 0.230 | 0.111 |
| 167 | 50 | 210 | 0.269 | 0.245 | 0.145 |
| 168 | 50 | 220 | 0.273 | 0.257 | 0.174 |
| 169 | 50 | 230 | 0.275 | 0.266 | 0.198 |
| 170 | 50 | 240 | 0.275 | 0.272 | 0.221 |
| 171 | 50 | 250 | 0.272 | 0.278 | 0.246 |
| 172 | 50 | 260 | 0.269 | 0.283 | 0.270 |
| 173 | 50 | 270 | 0.265 | 0.288 | 0.289 |
| 174 | 50 | 280 | 0.261 | 0.290 | 0.296 |
| 175 | 50 | 290 | 0.255 | 0.286 | 0.289 |
| 176 | 50 | 300 | 0.248 | 0.278 | 0.268 |
| 177 | 50 | 310 | 0.244 | 0.271 | 0.236 |
| 178 | 50 | 320 | 0.246 | 0.273 | 0.198 |
| 179 | 50 | 330 | 0.255 | 0.285 | 0.167 |
| 180 | 50 | 340 | 0.270 | 0.305 | 0.149 |
| 181 | 50 | 350 | 0.285 | 0.324 | 0.146 |
| 182 | 60 | 0 | 0.284 | 0.330 | 0.145 |
| 183 | 60 | 10 | 0.282 | 0.324 | 0.173 |
| 184 | 60 | 20 | 0.274 | 0.311 | 0.210 |
| 185 | 60 | 30 | 0.268 | 0.300 | 0.245 |
| 186 | 60 | 40 | 0.265 | 0.294 | 0.267 |
| 187 | 60 | 50 | 0.266 | 0.297 | 0.274 |
| 188 | 60 | 60 | 0.270 | 0.306 | 0.272 |
| 189 | 60 | 70 | 0.272 | 0.315 | 0.272 |

FIG. 60

| Number | Angle θ | Angle Φ | Chromaticity X | Chromaticity Y | Lightness Y |
|---|---|---|---|---|---|
| 190 | 60 | 80 | 0.269 | 0.310 | 0.273 |
| 191 | 60 | 90 | 0.259 | 0.289 | 0.255 |
| 192 | 60 | 100 | 0.244 | 0.255 | 0.205 |
| 193 | 60 | 110 | 0.226 | 0.212 | 0.141 |
| 194 | 60 | 120 | 0.207 | 0.176 | 0.095 |
| 195 | 60 | 130 | 0.197 | 0.167 | 0.078 |
| 196 | 60 | 140 | 0.198 | 0.181 | 0.074 |
| 197 | 60 | 150 | 0.204 | 0.195 | 0.062 |
| 198 | 60 | 160 | 0.207 | 0.189 | 0.037 |
| 199 | 60 | 170 | 0.198 | 0.119 | 0.011 |
| 200 | 60 | 180 | 0.189 | 0.040 | 0.003 |
| 201 | 60 | 190 | 0.218 | 0.158 | 0.022 |
| 202 | 60 | 200 | 0.239 | 0.224 | 0.061 |
| 203 | 60 | 210 | 0.253 | 0.252 | 0.102 |
| 204 | 60 | 220 | 0.263 | 0.264 | 0.132 |
| 205 | 60 | 230 | 0.269 | 0.267 | 0.151 |
| 206 | 60 | 240 | 0.269 | 0.267 | 0.168 |
| 207 | 60 | 250 | 0.265 | 0.271 | 0.194 |
| 208 | 60 | 260 | 0.263 | 0.281 | 0.231 |
| 209 | 60 | 270 | 0.264 | 0.295 | 0.266 |
| 210 | 60 | 280 | 0.263 | 0.302 | 0.287 |
| 211 | 60 | 290 | 0.256 | 0.296 | 0.289 |
| 212 | 60 | 300 | 0.247 | 0.282 | 0.272 |
| 213 | 60 | 310 | 0.239 | 0.269 | 0.236 |
| 214 | 60 | 320 | 0.237 | 0.267 | 0.193 |
| 215 | 60 | 330 | 0.244 | 0.277 | 0.156 |
| 216 | 60 | 340 | 0.259 | 0.299 | 0.134 |
| 217 | 60 | 350 | 0.276 | 0.321 | 0.131 |

FIG. 61

| Number | Angle θ | Angle Φ | Chromaticity X | Chromaticity Y | Lightness Y |
|---|---|---|---|---|---|
| 1 | 0 | 0 | 0.342 | 0.216 | 0.001 |
| 2 | 10 | 0 | 0.593 | 0.307 | 0.001 |
| 3 | 10 | 10 | 0.592 | 0.312 | 0.001 |
| 4 | 10 | 20 | 0.587 | 0.320 | 0.002 |
| 5 | 10 | 30 | 0.583 | 0.325 | 0.002 |
| 6 | 10 | 40 | 0.580 | 0.323 | 0.002 |
| 7 | 10 | 50 | 0.578 | 0.314 | 0.002 |
| 8 | 10 | 60 | 0.573 | 0.298 | 0.002 |
| 9 | 10 | 70 | 0.556 | 0.275 | 0.002 |
| 10 | 10 | 80 | 0.513 | 0.251 | 0.001 |
| 11 | 10 | 90 | 0.434 | 0.233 | 0.001 |
| 12 | 10 | 100 | 0.339 | 0.228 | 0.001 |
| 13 | 10 | 110 | 0.265 | 0.231 | 0.002 |
| 14 | 10 | 120 | 0.223 | 0.233 | 0.003 |
| 15 | 10 | 130 | 0.202 | 0.233 | 0.004 |
| 16 | 10 | 140 | 0.191 | 0.229 | 0.005 |
| 17 | 10 | 150 | 0.186 | 0.225 | 0.006 |
| 18 | 10 | 160 | 0.183 | 0.220 | 0.006 |
| 19 | 10 | 170 | 0.181 | 0.216 | 0.007 |
| 20 | 10 | 180 | 0.180 | 0.212 | 0.007 |
| 21 | 10 | 190 | 0.180 | 0.209 | 0.007 |
| 22 | 10 | 200 | 0.181 | 0.207 | 0.006 |
| 23 | 10 | 210 | 0.184 | 0.206 | 0.005 |
| 24 | 10 | 220 | 0.191 | 0.205 | 0.004 |
| 25 | 10 | 230 | 0.204 | 0.205 | 0.003 |
| 26 | 10 | 240 | 0.231 | 0.206 | 0.002 |
| 27 | 10 | 250 | 0.279 | 0.209 | 0.002 |

FIG. 62

| Number | Angle θ | Angle Φ | Chromaticity X | Chromaticity Y | Lightness Y |
|---|---|---|---|---|---|
| 28 | 10 | 260 | 0.355 | 0.218 | 0.001 |
| 29 | 10 | 270 | 0.446 | 0.236 | 0.001 |
| 30 | 10 | 280 | 0.518 | 0.263 | 0.001 |
| 31 | 10 | 290 | 0.553 | 0.288 | 0.001 |
| 32 | 10 | 300 | 0.565 | 0.308 | 0.002 |
| 33 | 10 | 310 | 0.566 | 0.321 | 0.002 |
| 34 | 10 | 320 | 0.567 | 0.326 | 0.002 |
| 35 | 10 | 330 | 0.571 | 0.324 | 0.002 |
| 36 | 10 | 340 | 0.579 | 0.317 | 0.001 |
| 37 | 10 | 350 | 0.588 | 0.309 | 0.001 |
| 38 | 20 | 0 | 0.542 | 0.297 | 0.001 |
| 39 | 20 | 10 | 0.514 | 0.383 | 0.002 |
| 40 | 20 | 20 | 0.502 | 0.417 | 0.005 |
| 41 | 20 | 30 | 0.500 | 0.421 | 0.008 |
| 42 | 20 | 40 | 0.500 | 0.410 | 0.010 |
| 43 | 20 | 50 | 0.499 | 0.387 | 0.010 |
| 44 | 20 | 60 | 0.495 | 0.353 | 0.009 |
| 45 | 20 | 70 | 0.488 | 0.309 | 0.007 |
| 46 | 20 | 80 | 0.474 | 0.265 | 0.004 |
| 47 | 20 | 90 | 0.444 | 0.250 | 0.003 |
| 48 | 20 | 100 | 0.381 | 0.310 | 0.003 |
| 49 | 20 | 110 | 0.312 | 0.367 | 0.005 |
| 50 | 20 | 120 | 0.273 | 0.355 | 0.009 |
| 51 | 20 | 130 | 0.251 | 0.321 | 0.014 |
| 52 | 20 | 140 | 0.236 | 0.290 | 0.019 |
| 53 | 20 | 150 | 0.224 | 0.268 | 0.024 |
| 54 | 20 | 160 | 0.215 | 0.252 | 0.028 |

FIG. 63

| Number | Angle θ | Angle Φ | Chromaticity X | Chromaticity Y | Lightness Y |
|---|---|---|---|---|---|
| 55 | 20 | 170 | 0.208 | 0.241 | 0.030 |
| 56 | 20 | 180 | 0.204 | 0.233 | 0.030 |
| 57 | 20 | 190 | 0.202 | 0.229 | 0.028 |
| 58 | 20 | 200 | 0.204 | 0.228 | 0.025 |
| 59 | 20 | 210 | 0.209 | 0.232 | 0.020 |
| 60 | 20 | 220 | 0.220 | 0.242 | 0.015 |
| 61 | 20 | 230 | 0.242 | 0.260 | 0.011 |
| 62 | 20 | 240 | 0.282 | 0.286 | 0.007 |
| 63 | 20 | 250 | 0.357 | 0.309 | 0.004 |
| 64 | 20 | 260 | 0.458 | 0.294 | 0.003 |
| 65 | 20 | 270 | 0.497 | 0.260 | 0.003 |
| 66 | 20 | 280 | 0.483 | 0.272 | 0.004 |
| 67 | 20 | 290 | 0.472 | 0.311 | 0.006 |
| 68 | 20 | 300 | 0.469 | 0.352 | 0.008 |
| 69 | 20 | 310 | 0.470 | 0.386 | 0.009 |
| 70 | 20 | 320 | 0.472 | 0.410 | 0.008 |
| 71 | 20 | 330 | 0.475 | 0.424 | 0.006 |
| 72 | 20 | 340 | 0.481 | 0.422 | 0.004 |
| 73 | 20 | 350 | 0.503 | 0.376 | 0.001 |
| 74 | 30 | 0 | 0.250 | 0.364 | 0.003 |
| 75 | 30 | 10 | 0.363 | 0.419 | 0.007 |
| 76 | 30 | 20 | 0.430 | 0.457 | 0.017 |
| 77 | 30 | 30 | 0.458 | 0.466 | 0.027 |
| 78 | 30 | 40 | 0.470 | 0.457 | 0.035 |
| 79 | 30 | 50 | 0.470 | 0.428 | 0.035 |
| 80 | 30 | 60 | 0.456 | 0.377 | 0.030 |
| 81 | 30 | 70 | 0.424 | 0.310 | 0.021 |

FIG. 64

| Number | Angle θ | Angle Φ | Chromaticity X | Chromaticity Y | Lightness Y |
|---|---|---|---|---|---|
| 82 | 30 | 80 | 0.378 | 0.246 | 0.013 |
| 83 | 30 | 90 | 0.335 | 0.235 | 0.009 |
| 84 | 30 | 100 | 0.335 | 0.343 | 0.011 |
| 85 | 30 | 110 | 0.368 | 0.464 | 0.018 |
| 86 | 30 | 120 | 0.361 | 0.452 | 0.028 |
| 87 | 30 | 130 | 0.325 | 0.385 | 0.040 |
| 88 | 30 | 140 | 0.289 | 0.328 | 0.053 |
| 89 | 30 | 150 | 0.262 | 0.291 | 0.065 |
| 90 | 30 | 160 | 0.244 | 0.269 | 0.076 |
| 91 | 30 | 170 | 0.232 | 0.256 | 0.082 |
| 92 | 30 | 180 | 0.226 | 0.248 | 0.082 |
| 93 | 30 | 190 | 0.224 | 0.243 | 0.076 |
| 94 | 30 | 200 | 0.227 | 0.242 | 0.066 |
| 95 | 30 | 210 | 0.239 | 0.249 | 0.054 |
| 96 | 30 | 220 | 0.263 | 0.269 | 0.041 |
| 97 | 30 | 230 | 0.306 | 0.311 | 0.031 |
| 98 | 30 | 240 | 0.369 | 0.375 | 0.022 |
| 99 | 30 | 250 | 0.429 | 0.421 | 0.015 |
| 100 | 30 | 260 | 0.423 | 0.349 | 0.010 |
| 101 | 30 | 270 | 0.377 | 0.241 | 0.008 |
| 102 | 30 | 280 | 0.374 | 0.240 | 0.011 |
| 103 | 30 | 290 | 0.401 | 0.303 | 0.018 |
| 104 | 30 | 300 | 0.428 | 0.375 | 0.027 |
| 105 | 30 | 310 | 0.445 | 0.431 | 0.033 |
| 106 | 30 | 320 | 0.451 | 0.467 | 0.033 |
| 107 | 30 | 330 | 0.446 | 0.484 | 0.026 |
| 108 | 30 | 340 | 0.426 | 0.485 | 0.015 |

FIG. 65

| Number | Angle θ | Angle Φ | Chromaticity X | Chromaticity Y | Lightness Y |
|---|---|---|---|---|---|
| 109 | 30 | 350 | 0.355 | 0.449 | 0.006 |
| 110 | 40 | 0 | 0.305 | 0.342 | 0.027 |
| 111 | 40 | 10 | 0.330 | 0.369 | 0.035 |
| 112 | 40 | 20 | 0.381 | 0.422 | 0.053 |
| 113 | 40 | 30 | 0.425 | 0.461 | 0.073 |
| 114 | 40 | 40 | 0.455 | 0.474 | 0.084 |
| 115 | 40 | 50 | 0.462 | 0.452 | 0.081 |
| 116 | 40 | 60 | 0.440 | 0.390 | 0.066 |
| 117 | 40 | 70 | 0.390 | 0.302 | 0.044 |
| 118 | 40 | 80 | 0.322 | 0.222 | 0.026 |
| 119 | 40 | 90 | 0.273 | 0.220 | 0.021 |
| 120 | 40 | 100 | 0.302 | 0.343 | 0.029 |
| 121 | 40 | 110 | 0.383 | 0.472 | 0.046 |
| 122 | 40 | 120 | 0.412 | 0.477 | 0.066 |
| 123 | 40 | 130 | 0.376 | 0.407 | 0.087 |
| 124 | 40 | 140 | 0.326 | 0.341 | 0.109 |
| 125 | 40 | 150 | 0.288 | 0.301 | 0.132 |
| 126 | 40 | 160 | 0.265 | 0.282 | 0.153 |
| 127 | 40 | 170 | 0.252 | 0.274 | 0.165 |
| 128 | 40 | 180 | 0.244 | 0.268 | 0.166 |
| 129 | 40 | 190 | 0.241 | 0.262 | 0.155 |
| 130 | 40 | 200 | 0.245 | 0.259 | 0.134 |
| 131 | 40 | 210 | 0.261 | 0.264 | 0.109 |
| 132 | 40 | 220 | 0.294 | 0.287 | 0.086 |
| 133 | 40 | 230 | 0.349 | 0.338 | 0.067 |
| 134 | 40 | 240 | 0.415 | 0.413 | 0.052 |
| 135 | 40 | 250 | 0.441 | 0.454 | 0.039 |

FIG. 66

| Number | Angle θ | Angle Φ | Chromaticity X | Chromaticity Y | Lightness Y |
|---|---|---|---|---|---|
| 136 | 40 | 260 | 0.376 | 0.362 | 0.026 |
| 137 | 40 | 270 | 0.301 | 0.222 | 0.017 |
| 138 | 40 | 280 | 0.310 | 0.205 | 0.021 |
| 139 | 40 | 290 | 0.367 | 0.290 | 0.038 |
| 140 | 40 | 300 | 0.418 | 0.391 | 0.063 |
| 141 | 40 | 310 | 0.443 | 0.458 | 0.083 |
| 142 | 40 | 320 | 0.444 | 0.483 | 0.088 |
| 143 | 40 | 330 | 0.427 | 0.476 | 0.076 |
| 144 | 40 | 340 | 0.393 | 0.442 | 0.054 |
| 145 | 40 | 350 | 0.342 | 0.384 | 0.035 |
| 146 | 50 | 0 | 0.316 | 0.338 | 0.095 |
| 147 | 50 | 10 | 0.323 | 0.349 | 0.102 |
| 148 | 50 | 20 | 0.356 | 0.388 | 0.121 |
| 149 | 50 | 30 | 0.404 | 0.437 | 0.139 |
| 150 | 50 | 40 | 0.448 | 0.473 | 0.146 |
| 151 | 50 | 50 | 0.464 | 0.461 | 0.135 |
| 152 | 50 | 60 | 0.434 | 0.388 | 0.105 |
| 153 | 50 | 70 | 0.366 | 0.282 | 0.067 |
| 154 | 50 | 80 | 0.284 | 0.197 | 0.038 |
| 155 | 50 | 90 | 0.237 | 0.210 | 0.034 |
| 156 | 50 | 100 | 0.290 | 0.340 | 0.054 |
| 157 | 50 | 110 | 0.390 | 0.444 | 0.086 |
| 158 | 50 | 120 | 0.437 | 0.449 | 0.118 |
| 159 | 50 | 130 | 0.410 | 0.395 | 0.147 |
| 160 | 50 | 140 | 0.355 | 0.336 | 0.180 |
| 161 | 50 | 150 | 0.312 | 0.304 | 0.217 |
| 162 | 50 | 160 | 0.289 | 0.295 | 0.248 |

FIG. 67

| Number | Angle θ | Angle Φ | Chromaticity X | Chromaticity Y | Lightness Y |
|---|---|---|---|---|---|
| 163 | 50 | 170 | 0.277 | 0.296 | 0.265 |
| 164 | 50 | 180 | 0.269 | 0.294 | 0.264 |
| 165 | 50 | 190 | 0.263 | 0.285 | 0.246 |
| 166 | 50 | 200 | 0.264 | 0.275 | 0.213 |
| 167 | 50 | 210 | 0.279 | 0.274 | 0.173 |
| 168 | 50 | 220 | 0.317 | 0.294 | 0.137 |
| 169 | 50 | 230 | 0.376 | 0.341 | 0.111 |
| 170 | 50 | 240 | 0.431 | 0.406 | 0.091 |
| 171 | 50 | 250 | 0.437 | 0.446 | 0.071 |
| 172 | 50 | 260 | 0.354 | 0.370 | 0.047 |
| 173 | 50 | 270 | 0.256 | 0.208 | 0.028 |
| 174 | 50 | 280 | 0.268 | 0.170 | 0.030 |
| 175 | 50 | 290 | 0.348 | 0.268 | 0.061 |
| 176 | 50 | 300 | 0.421 | 0.392 | 0.112 |
| 177 | 50 | 310 | 0.452 | 0.465 | 0.157 |
| 178 | 50 | 320 | 0.445 | 0.476 | 0.176 |
| 179 | 50 | 330 | 0.416 | 0.448 | 0.164 |
| 180 | 50 | 340 | 0.378 | 0.403 | 0.135 |
| 181 | 50 | 350 | 0.339 | 0.360 | 0.107 |
| 182 | 60 | 0 | 0.316 | 0.340 | 0.195 |
| 183 | 60 | 10 | 0.316 | 0.343 | 0.196 |
| 184 | 60 | 20 | 0.339 | 0.369 | 0.204 |
| 185 | 60 | 30 | 0.385 | 0.421 | 0.209 |
| 186 | 60 | 40 | 0.441 | 0.472 | 0.199 |
| 187 | 60 | 50 | 0.465 | 0.464 | 0.170 |
| 188 | 60 | 60 | 0.424 | 0.374 | 0.127 |
| 189 | 60 | 70 | 0.341 | 0.255 | 0.080 |

FIG. 68

| Number | Angle θ | Angle Φ | Chromaticity X | Chromaticity Y | Lightness Y |
|---|---|---|---|---|---|
| 190 | 60 | 80 | 0.253 | 0.176 | 0.046 |
| 191 | 60 | 90 | 0.215 | 0.214 | 0.047 |
| 192 | 60 | 100 | 0.289 | 0.351 | 0.084 |
| 193 | 60 | 110 | 0.385 | 0.416 | 0.132 |
| 194 | 60 | 120 | 0.435 | 0.414 | 0.168 |
| 195 | 60 | 130 | 0.422 | 0.376 | 0.197 |
| 196 | 60 | 140 | 0.364 | 0.327 | 0.236 |
| 197 | 60 | 150 | 0.320 | 0.303 | 0.285 |
| 198 | 60 | 160 | 0.303 | 0.307 | 0.323 |
| 199 | 60 | 170 | 0.299 | 0.321 | 0.339 |
| 200 | 60 | 180 | 0.294 | 0.325 | 0.336 |
| 201 | 60 | 190 | 0.284 | 0.313 | 0.318 |
| 202 | 60 | 200 | 0.281 | 0.299 | 0.283 |
| 203 | 60 | 210 | 0.296 | 0.295 | 0.231 |
| 204 | 60 | 220 | 0.335 | 0.310 | 0.179 |
| 205 | 60 | 230 | 0.390 | 0.341 | 0.142 |
| 206 | 60 | 240 | 0.429 | 0.381 | 0.119 |
| 207 | 60 | 250 | 0.425 | 0.420 | 0.098 |
| 208 | 60 | 260 | 0.343 | 0.382 | 0.068 |
| 209 | 60 | 270 | 0.223 | 0.206 | 0.038 |
| 210 | 60 | 280 | 0.234 | 0.147 | 0.037 |
| 211 | 60 | 290 | 0.329 | 0.251 | 0.083 |
| 212 | 60 | 300 | 0.419 | 0.391 | 0.158 |
| 213 | 60 | 310 | 0.457 | 0.471 | 0.226 |
| 214 | 60 | 320 | 0.439 | 0.468 | 0.259 |
| 215 | 60 | 330 | 0.398 | 0.424 | 0.257 |
| 216 | 60 | 340 | 0.360 | 0.380 | 0.234 |
| 217 | 60 | 350 | 0.332 | 0.353 | 0.209 |

FIG. 69

| Number | Angle θ | Angle Φ | Chromaticity X | Chromaticity Y | Lightness Y |
|---|---|---|---|---|---|
| 1 | 0 | 0 | 0.300 | 0.349 | 0.405 |
| 2 | 10 | 0 | 0.285 | 0.330 | 0.376 |
| 3 | 10 | 10 | 0.285 | 0.331 | 0.376 |
| 4 | 10 | 20 | 0.285 | 0.332 | 0.377 |
| 5 | 10 | 30 | 0.286 | 0.333 | 0.377 |
| 6 | 10 | 40 | 0.286 | 0.333 | 0.378 |
| 7 | 10 | 50 | 0.287 | 0.334 | 0.378 |
| 8 | 10 | 60 | 0.288 | 0.334 | 0.378 |
| 9 | 10 | 70 | 0.289 | 0.334 | 0.379 |
| 10 | 10 | 80 | 0.290 | 0.335 | 0.379 |
| 11 | 10 | 90 | 0.292 | 0.336 | 0.381 |
| 12 | 10 | 100 | 0.294 | 0.338 | 0.383 |
| 13 | 10 | 110 | 0.297 | 0.341 | 0.386 |
| 14 | 10 | 120 | 0.299 | 0.345 | 0.390 |
| 15 | 10 | 130 | 0.302 | 0.349 | 0.394 |
| 16 | 10 | 140 | 0.305 | 0.353 | 0.399 |
| 17 | 10 | 150 | 0.308 | 0.358 | 0.403 |
| 18 | 10 | 160 | 0.311 | 0.362 | 0.408 |
| 19 | 10 | 170 | 0.313 | 0.366 | 0.411 |
| 20 | 10 | 180 | 0.314 | 0.369 | 0.414 |
| 21 | 10 | 190 | 0.315 | 0.371 | 0.415 |
| 22 | 10 | 200 | 0.314 | 0.372 | 0.415 |
| 23 | 10 | 210 | 0.313 | 0.371 | 0.415 |
| 24 | 10 | 220 | 0.311 | 0.369 | 0.413 |
| 25 | 10 | 230 | 0.309 | 0.366 | 0.411 |
| 26 | 10 | 240 | 0.306 | 0.362 | 0.408 |
| 27 | 10 | 250 | 0.303 | 0.358 | 0.404 |

FIG. 70

| Number | Angle θ | Angle Φ | Chromaticity X | Chromaticity Y | Lightness Y |
|---|---|---|---|---|---|
| 28 | 10 | 260 | 0.300 | 0.353 | 0.400 |
| 29 | 10 | 270 | 0.297 | 0.348 | 0.396 |
| 30 | 10 | 280 | 0.294 | 0.343 | 0.392 |
| 31 | 10 | 290 | 0.291 | 0.339 | 0.387 |
| 32 | 10 | 300 | 0.289 | 0.336 | 0.384 |
| 33 | 10 | 310 | 0.288 | 0.333 | 0.380 |
| 34 | 10 | 320 | 0.286 | 0.331 | 0.378 |
| 35 | 10 | 330 | 0.285 | 0.330 | 0.376 |
| 36 | 10 | 340 | 0.285 | 0.330 | 0.376 |
| 37 | 10 | 350 | 0.285 | 0.330 | 0.375 |
| 38 | 20 | 0 | 0.273 | 0.317 | 0.353 |
| 39 | 20 | 10 | 0.274 | 0.321 | 0.357 |
| 40 | 20 | 20 | 0.275 | 0.324 | 0.360 |
| 41 | 20 | 30 | 0.275 | 0.325 | 0.361 |
| 42 | 20 | 40 | 0.275 | 0.325 | 0.360 |
| 43 | 20 | 50 | 0.274 | 0.323 | 0.356 |
| 44 | 20 | 60 | 0.273 | 0.320 | 0.351 |
| 45 | 20 | 70 | 0.272 | 0.315 | 0.345 |
| 46 | 20 | 80 | 0.272 | 0.311 | 0.338 |
| 47 | 20 | 90 | 0.273 | 0.308 | 0.332 |
| 48 | 20 | 100 | 0.276 | 0.308 | 0.331 |
| 49 | 20 | 110 | 0.280 | 0.311 | 0.334 |
| 50 | 20 | 120 | 0.286 | 0.318 | 0.343 |
| 51 | 20 | 130 | 0.292 | 0.326 | 0.356 |
| 52 | 20 | 140 | 0.298 | 0.336 | 0.371 |
| 53 | 20 | 150 | 0.305 | 0.347 | 0.387 |
| 54 | 20 | 160 | 0.310 | 0.357 | 0.400 |

FIG. 71

| Number | Angle θ | Angle Φ | Chromaticity X | Chromaticity Y | Lightness Y |
|---|---|---|---|---|---|
| 55 | 20 | 170 | 0.314 | 0.367 | 0.411 |
| 56 | 20 | 180 | 0.317 | 0.374 | 0.417 |
| 57 | 20 | 190 | 0.318 | 0.379 | 0.419 |
| 58 | 20 | 200 | 0.317 | 0.380 | 0.418 |
| 59 | 20 | 210 | 0.314 | 0.379 | 0.415 |
| 60 | 20 | 220 | 0.309 | 0.373 | 0.409 |
| 61 | 20 | 230 | 0.304 | 0.365 | 0.402 |
| 62 | 20 | 240 | 0.298 | 0.355 | 0.394 |
| 63 | 20 | 250 | 0.292 | 0.344 | 0.385 |
| 64 | 20 | 260 | 0.286 | 0.334 | 0.375 |
| 65 | 20 | 270 | 0.281 | 0.324 | 0.365 |
| 66 | 20 | 280 | 0.277 | 0.316 | 0.354 |
| 67 | 20 | 290 | 0.274 | 0.309 | 0.345 |
| 68 | 20 | 300 | 0.271 | 0.304 | 0.338 |
| 69 | 20 | 310 | 0.270 | 0.302 | 0.334 |
| 70 | 20 | 320 | 0.270 | 0.303 | 0.334 |
| 71 | 20 | 330 | 0.270 | 0.305 | 0.336 |
| 72 | 20 | 340 | 0.271 | 0.308 | 0.341 |
| 73 | 20 | 350 | 0.272 | 0.312 | 0.347 |
| 74 | 30 | 0 | 0.270 | 0.306 | 0.338 |
| 75 | 30 | 10 | 0.271 | 0.311 | 0.344 |
| 76 | 30 | 20 | 0.271 | 0.315 | 0.346 |
| 77 | 30 | 30 | 0.271 | 0.317 | 0.344 |
| 78 | 30 | 40 | 0.270 | 0.317 | 0.341 |
| 79 | 30 | 50 | 0.267 | 0.314 | 0.335 |
| 80 | 30 | 60 | 0.262 | 0.306 | 0.325 |
| 81 | 30 | 70 | 0.257 | 0.294 | 0.309 |

FIG. 72

| Number | Angle $\theta$ | Angle $\Phi$ | Chromaticity X | Chromaticity Y | Lightness Y |
|---|---|---|---|---|---|
| 82 | 30 | 80 | 0.253 | 0.282 | 0.288 |
| 83 | 30 | 90 | 0.252 | 0.273 | 0.268 |
| 84 | 30 | 100 | 0.255 | 0.271 | 0.255 |
| 85 | 30 | 110 | 0.263 | 0.277 | 0.256 |
| 86 | 30 | 120 | 0.272 | 0.288 | 0.271 |
| 87 | 30 | 130 | 0.282 | 0.301 | 0.298 |
| 88 | 30 | 140 | 0.289 | 0.314 | 0.330 |
| 89 | 30 | 150 | 0.296 | 0.324 | 0.359 |
| 90 | 30 | 160 | 0.301 | 0.334 | 0.381 |
| 91 | 30 | 170 | 0.305 | 0.343 | 0.394 |
| 92 | 30 | 180 | 0.307 | 0.351 | 0.399 |
| 93 | 30 | 190 | 0.307 | 0.356 | 0.397 |
| 94 | 30 | 200 | 0.304 | 0.357 | 0.391 |
| 95 | 30 | 210 | 0.298 | 0.353 | 0.384 |
| 96 | 30 | 220 | 0.291 | 0.345 | 0.375 |
| 97 | 30 | 230 | 0.283 | 0.334 | 0.364 |
| 98 | 30 | 240 | 0.276 | 0.322 | 0.354 |
| 99 | 30 | 250 | 0.271 | 0.310 | 0.343 |
| 100 | 30 | 260 | 0.268 | 0.301 | 0.331 |
| 101 | 30 | 270 | 0.265 | 0.293 | 0.318 |
| 102 | 30 | 280 | 0.264 | 0.287 | 0.303 |
| 103 | 30 | 290 | 0.262 | 0.281 | 0.290 |
| 104 | 30 | 300 | 0.261 | 0.278 | 0.280 |
| 105 | 30 | 310 | 0.262 | 0.279 | 0.278 |
| 106 | 30 | 320 | 0.263 | 0.282 | 0.285 |
| 107 | 30 | 330 | 0.266 | 0.288 | 0.298 |
| 108 | 30 | 340 | 0.268 | 0.295 | 0.314 |

FIG. 73

| Number | Angle θ | Angle Φ | Chromaticity X | Chromaticity Y | Lightness Y |
|---|---|---|---|---|---|
| 109 | 30 | 350 | 0.269 | 0.301 | 0.328 |
| 110 | 40 | 0 | 0.275 | 0.327 | 0.366 |
| 111 | 40 | 10 | 0.275 | 0.334 | 0.374 |
| 112 | 40 | 20 | 0.275 | 0.340 | 0.371 |
| 113 | 40 | 30 | 0.274 | 0.344 | 0.363 |
| 114 | 40 | 40 | 0.272 | 0.343 | 0.352 |
| 115 | 40 | 50 | 0.266 | 0.335 | 0.338 |
| 116 | 40 | 60 | 0.255 | 0.318 | 0.315 |
| 117 | 40 | 70 | 0.242 | 0.292 | 0.278 |
| 118 | 40 | 80 | 0.231 | 0.262 | 0.228 |
| 119 | 40 | 90 | 0.226 | 0.237 | 0.180 |
| 120 | 40 | 100 | 0.230 | 0.226 | 0.150 |
| 121 | 40 | 110 | 0.245 | 0.237 | 0.147 |
| 122 | 40 | 120 | 0.262 | 0.260 | 0.171 |
| 123 | 40 | 130 | 0.273 | 0.280 | 0.214 |
| 124 | 40 | 140 | 0.279 | 0.293 | 0.263 |
| 125 | 40 | 150 | 0.281 | 0.302 | 0.309 |
| 126 | 40 | 160 | 0.281 | 0.309 | 0.344 |
| 127 | 40 | 170 | 0.281 | 0.317 | 0.368 |
| 128 | 40 | 180 | 0.281 | 0.326 | 0.381 |
| 129 | 40 | 190 | 0.280 | 0.333 | 0.385 |
| 130 | 40 | 200 | 0.277 | 0.336 | 0.381 |
| 131 | 40 | 210 | 0.270 | 0.333 | 0.370 |
| 132 | 40 | 220 | 0.260 | 0.323 | 0.352 |
| 133 | 40 | 230 | 0.250 | 0.308 | 0.328 |
| 134 | 40 | 240 | 0.243 | 0.292 | 0.300 |
| 135 | 40 | 250 | 0.243 | 0.278 | 0.275 |

FIG. 74

| Number | Angle θ | Angle Φ | Chromaticity X | Chromaticity Y | Lightness Y |
|---|---|---|---|---|---|
| 136 | 40 | 260 | 0.247 | 0.271 | 0.255 |
| 137 | 40 | 270 | 0.252 | 0.267 | 0.240 |
| 138 | 40 | 280 | 0.256 | 0.264 | 0.226 |
| 139 | 40 | 290 | 0.258 | 0.261 | 0.212 |
| 140 | 40 | 300 | 0.259 | 0.260 | 0.203 |
| 141 | 40 | 310 | 0.262 | 0.265 | 0.208 |
| 142 | 40 | 320 | 0.266 | 0.279 | 0.232 |
| 143 | 40 | 330 | 0.270 | 0.294 | 0.270 |
| 144 | 40 | 340 | 0.273 | 0.308 | 0.311 |
| 145 | 40 | 350 | 0.275 | 0.319 | 0.345 |
| 146 | 50 | 0 | 0.294 | 0.358 | 0.382 |
| 147 | 50 | 10 | 0.297 | 0.371 | 0.380 |
| 148 | 50 | 20 | 0.299 | 0.384 | 0.367 |
| 149 | 50 | 30 | 0.300 | 0.391 | 0.351 |
| 150 | 50 | 40 | 0.298 | 0.389 | 0.336 |
| 151 | 50 | 50 | 0.289 | 0.378 | 0.325 |
| 152 | 50 | 60 | 0.270 | 0.352 | 0.306 |
| 153 | 50 | 70 | 0.245 | 0.308 | 0.258 |
| 154 | 50 | 80 | 0.220 | 0.253 | 0.181 |
| 155 | 50 | 90 | 0.205 | 0.202 | 0.106 |
| 156 | 50 | 100 | 0.209 | 0.173 | 0.061 |
| 157 | 50 | 110 | 0.238 | 0.195 | 0.056 |
| 158 | 50 | 120 | 0.272 | 0.246 | 0.086 |
| 159 | 50 | 130 | 0.286 | 0.277 | 0.137 |
| 160 | 50 | 140 | 0.287 | 0.289 | 0.190 |
| 161 | 50 | 150 | 0.280 | 0.291 | 0.232 |
| 162 | 50 | 160 | 0.271 | 0.289 | 0.264 |

FIG. 75

| Number | Angle θ | Angle Φ | Chromaticity X | Chromaticity Y | Lightness Y |
|---|---|---|---|---|---|
| 163 | 50 | 170 | 0.265 | 0.291 | 0.289 |
| 164 | 50 | 180 | 0.263 | 0.299 | 0.310 |
| 165 | 50 | 190 | 0.264 | 0.311 | 0.324 |
| 166 | 50 | 200 | 0.264 | 0.321 | 0.329 |
| 167 | 50 | 210 | 0.259 | 0.323 | 0.322 |
| 168 | 50 | 220 | 0.247 | 0.313 | 0.302 |
| 169 | 50 | 230 | 0.232 | 0.293 | 0.268 |
| 170 | 50 | 240 | 0.221 | 0.269 | 0.228 |
| 171 | 50 | 250 | 0.221 | 0.249 | 0.192 |
| 172 | 50 | 260 | 0.235 | 0.244 | 0.171 |
| 173 | 50 | 270 | 0.255 | 0.252 | 0.165 |
| 174 | 50 | 280 | 0.268 | 0.260 | 0.163 |
| 175 | 50 | 290 | 0.272 | 0.258 | 0.154 |
| 176 | 50 | 300 | 0.273 | 0.254 | 0.144 |
| 177 | 50 | 310 | 0.276 | 0.262 | 0.151 |
| 178 | 50 | 320 | 0.282 | 0.286 | 0.190 |
| 179 | 50 | 330 | 0.286 | 0.312 | 0.256 |
| 180 | 50 | 340 | 0.289 | 0.332 | 0.322 |
| 181 | 50 | 350 | 0.291 | 0.346 | 0.366 |
| 182 | 60 | 0 | 0.320 | 0.386 | 0.365 |
| 183 | 60 | 10 | 0.331 | 0.415 | 0.359 |
| 184 | 60 | 20 | 0.343 | 0.440 | 0.338 |
| 185 | 60 | 30 | 0.349 | 0.450 | 0.313 |
| 186 | 60 | 40 | 0.346 | 0.442 | 0.291 |
| 187 | 60 | 50 | 0.333 | 0.424 | 0.280 |
| 188 | 60 | 60 | 0.303 | 0.393 | 0.268 |
| 189 | 60 | 70 | 0.259 | 0.330 | 0.221 |

FIG. 76

| Number | Angle θ | Angle Φ | Chromaticity X | Chromaticity Y | Lightness Y |
|---|---|---|---|---|---|
| 190 | 60 | 80 | 0.216 | 0.246 | 0.135 |
| 191 | 60 | 90 | 0.193 | 0.171 | 0.056 |
| 192 | 60 | 100 | 0.194 | 0.115 | 0.017 |
| 193 | 60 | 110 | 0.248 | 0.123 | 0.009 |
| 194 | 60 | 120 | 0.317 | 0.245 | 0.033 |
| 195 | 60 | 130 | 0.329 | 0.294 | 0.076 |
| 196 | 60 | 140 | 0.324 | 0.305 | 0.110 |
| 197 | 60 | 150 | 0.304 | 0.294 | 0.128 |
| 198 | 60 | 160 | 0.277 | 0.273 | 0.143 |
| 199 | 60 | 170 | 0.260 | 0.263 | 0.169 |
| 200 | 60 | 180 | 0.256 | 0.273 | 0.204 |
| 201 | 60 | 190 | 0.261 | 0.298 | 0.239 |
| 202 | 60 | 200 | 0.267 | 0.324 | 0.259 |
| 203 | 60 | 210 | 0.267 | 0.337 | 0.258 |
| 204 | 60 | 220 | 0.254 | 0.329 | 0.234 |
| 205 | 60 | 230 | 0.229 | 0.299 | 0.191 |
| 206 | 60 | 240 | 0.204 | 0.254 | 0.141 |
| 207 | 60 | 250 | 0.196 | 0.210 | 0.100 |
| 208 | 60 | 260 | 0.225 | 0.203 | 0.087 |
| 209 | 60 | 270 | 0.271 | 0.239 | 0.101 |
| 210 | 60 | 280 | 0.293 | 0.267 | 0.121 |
| 211 | 60 | 290 | 0.293 | 0.265 | 0.125 |
| 212 | 60 | 300 | 0.288 | 0.249 | 0.111 |
| 213 | 60 | 310 | 0.289 | 0.248 | 0.108 |
| 214 | 60 | 320 | 0.295 | 0.278 | 0.147 |
| 215 | 60 | 330 | 0.298 | 0.311 | 0.225 |
| 216 | 60 | 340 | 0.303 | 0.336 | 0.303 |
| 217 | 60 | 350 | 0.310 | 0.360 | 0.349 |

FIG. 77

| Number | Angle θ | Angle Φ | Chromaticity X | Chromaticity Y | Lightness Y |
|---|---|---|---|---|---|
| 1 | 0 | 0 | 0.187 | 0.028 | 0.001 |
| 2 | 10 | 0 | 0.231 | 0.087 | 0.003 |
| 3 | 10 | 10 | 0.226 | 0.087 | 0.003 |
| 4 | 10 | 20 | 0.222 | 0.083 | 0.003 |
| 5 | 10 | 30 | 0.217 | 0.077 | 0.003 |
| 6 | 10 | 40 | 0.213 | 0.069 | 0.003 |
| 7 | 10 | 50 | 0.208 | 0.059 | 0.003 |
| 8 | 10 | 60 | 0.203 | 0.048 | 0.002 |
| 9 | 10 | 70 | 0.198 | 0.038 | 0.002 |
| 10 | 10 | 80 | 0.191 | 0.031 | 0.001 |
| 11 | 10 | 90 | 0.185 | 0.027 | 0.001 |
| 12 | 10 | 100 | 0.180 | 0.028 | 0.001 |
| 13 | 10 | 110 | 0.176 | 0.033 | 0.002 |
| 14 | 10 | 120 | 0.173 | 0.041 | 0.002 |
| 15 | 10 | 130 | 0.171 | 0.049 | 0.003 |
| 16 | 10 | 140 | 0.171 | 0.056 | 0.004 |
| 17 | 10 | 150 | 0.170 | 0.062 | 0.004 |
| 18 | 10 | 160 | 0.170 | 0.066 | 0.005 |
| 19 | 10 | 170 | 0.170 | 0.067 | 0.005 |
| 20 | 10 | 180 | 0.170 | 0.067 | 0.005 |
| 21 | 10 | 190 | 0.169 | 0.065 | 0.005 |
| 22 | 10 | 200 | 0.169 | 0.061 | 0.004 |
| 23 | 10 | 210 | 0.169 | 0.056 | 0.004 |
| 24 | 10 | 220 | 0.170 | 0.050 | 0.003 |
| 25 | 10 | 230 | 0.171 | 0.045 | 0.002 |
| 26 | 10 | 240 | 0.173 | 0.040 | 0.002 |
| 27 | 10 | 250 | 0.178 | 0.036 | 0.002 |

FIG. 78

| Number | Angle θ | Angle Φ | Chromaticity X | Chromaticity Y | Lightness Y |
|---|---|---|---|---|---|
| 28 | 10 | 260 | 0.184 | 0.034 | 0.001 |
| 29 | 10 | 270 | 0.192 | 0.035 | 0.001 |
| 30 | 10 | 280 | 0.201 | 0.038 | 0.001 |
| 31 | 10 | 290 | 0.212 | 0.043 | 0.002 |
| 32 | 10 | 300 | 0.222 | 0.051 | 0.002 |
| 33 | 10 | 310 | 0.230 | 0.059 | 0.002 |
| 34 | 10 | 320 | 0.235 | 0.068 | 0.002 |
| 35 | 10 | 330 | 0.237 | 0.075 | 0.003 |
| 36 | 10 | 340 | 0.237 | 0.081 | 0.003 |
| 37 | 10 | 350 | 0.234 | 0.085 | 0.003 |
| 38 | 20 | 0 | 0.245 | 0.151 | 0.007 |
| 39 | 20 | 10 | 0.229 | 0.151 | 0.008 |
| 40 | 20 | 20 | 0.219 | 0.148 | 0.009 |
| 41 | 20 | 30 | 0.214 | 0.140 | 0.009 |
| 42 | 20 | 40 | 0.212 | 0.129 | 0.008 |
| 43 | 20 | 50 | 0.213 | 0.114 | 0.007 |
| 44 | 20 | 60 | 0.213 | 0.096 | 0.005 |
| 45 | 20 | 70 | 0.210 | 0.073 | 0.004 |
| 46 | 20 | 80 | 0.202 | 0.050 | 0.002 |
| 47 | 20 | 90 | 0.189 | 0.037 | 0.002 |
| 48 | 20 | 100 | 0.178 | 0.042 | 0.002 |
| 49 | 20 | 110 | 0.172 | 0.060 | 0.004 |
| 50 | 20 | 120 | 0.171 | 0.081 | 0.007 |
| 51 | 20 | 130 | 0.173 | 0.100 | 0.011 |
| 52 | 20 | 140 | 0.175 | 0.115 | 0.014 |
| 53 | 20 | 150 | 0.178 | 0.125 | 0.017 |
| 54 | 20 | 160 | 0.181 | 0.131 | 0.019 |

FIG. 79

| Number | Angle θ | Angle Φ | Chromaticity X | Chromaticity Y | Lightness Y |
|---|---|---|---|---|---|
| 55 | 20 | 170 | 0.182 | 0.132 | 0.019 |
| 56 | 20 | 180 | 0.182 | 0.129 | 0.017 |
| 57 | 20 | 190 | 0.180 | 0.122 | 0.015 |
| 58 | 20 | 200 | 0.178 | 0.112 | 0.012 |
| 59 | 20 | 210 | 0.175 | 0.100 | 0.010 |
| 60 | 20 | 220 | 0.173 | 0.087 | 0.007 |
| 61 | 20 | 230 | 0.172 | 0.076 | 0.005 |
| 62 | 20 | 240 | 0.174 | 0.066 | 0.004 |
| 63 | 20 | 250 | 0.178 | 0.060 | 0.003 |
| 64 | 20 | 260 | 0.187 | 0.058 | 0.002 |
| 65 | 20 | 270 | 0.203 | 0.061 | 0.002 |
| 66 | 20 | 280 | 0.227 | 0.070 | 0.002 |
| 67 | 20 | 290 | 0.257 | 0.085 | 0.002 |
| 68 | 20 | 300 | 0.285 | 0.100 | 0.003 |
| 69 | 20 | 310 | 0.304 | 0.114 | 0.003 |
| 70 | 20 | 320 | 0.310 | 0.124 | 0.004 |
| 71 | 20 | 330 | 0.303 | 0.133 | 0.005 |
| 72 | 20 | 340 | 0.287 | 0.141 | 0.005 |
| 73 | 20 | 350 | 0.265 | 0.147 | 0.006 |
| 74 | 30 | 0 | 0.244 | 0.171 | 0.010 |
| 75 | 30 | 10 | 0.213 | 0.174 | 0.013 |
| 76 | 30 | 20 | 0.200 | 0.170 | 0.015 |
| 77 | 30 | 30 | 0.198 | 0.160 | 0.017 |
| 78 | 30 | 40 | 0.203 | 0.147 | 0.016 |
| 79 | 30 | 50 | 0.211 | 0.135 | 0.015 |
| 80 | 30 | 60 | 0.220 | 0.123 | 0.012 |
| 81 | 30 | 70 | 0.227 | 0.108 | 0.008 |

FIG. 80

| Number | Angle θ | Angle Φ | Chromaticity X | Chromaticity Y | Lightness Y |
|---|---|---|---|---|---|
| 82 | 30 | 80 | 0.222 | 0.085 | 0.005 |
| 83 | 30 | 90 | 0.200 | 0.059 | 0.003 |
| 84 | 30 | 100 | 0.177 | 0.062 | 0.004 |
| 85 | 30 | 110 | 0.171 | 0.087 | 0.008 |
| 86 | 30 | 120 | 0.173 | 0.112 | 0.016 |
| 87 | 30 | 130 | 0.178 | 0.133 | 0.025 |
| 88 | 30 | 140 | 0.185 | 0.150 | 0.035 |
| 89 | 30 | 150 | 0.191 | 0.163 | 0.043 |
| 90 | 30 | 160 | 0.196 | 0.172 | 0.046 |
| 91 | 30 | 170 | 0.199 | 0.175 | 0.045 |
| 92 | 30 | 180 | 0.200 | 0.172 | 0.039 |
| 93 | 30 | 190 | 0.197 | 0.162 | 0.032 |
| 94 | 30 | 200 | 0.191 | 0.145 | 0.024 |
| 95 | 30 | 210 | 0.185 | 0.125 | 0.017 |
| 96 | 30 | 220 | 0.182 | 0.107 | 0.012 |
| 97 | 30 | 230 | 0.183 | 0.096 | 0.009 |
| 98 | 30 | 240 | 0.189 | 0.092 | 0.007 |
| 99 | 30 | 250 | 0.198 | 0.096 | 0.006 |
| 100 | 30 | 260 | 0.207 | 0.106 | 0.005 |
| 101 | 30 | 270 | 0.220 | 0.121 | 0.004 |
| 102 | 30 | 280 | 0.246 | 0.138 | 0.004 |
| 103 | 30 | 290 | 0.288 | 0.152 | 0.005 |
| 104 | 30 | 300 | 0.327 | 0.157 | 0.005 |
| 105 | 30 | 310 | 0.351 | 0.154 | 0.006 |
| 106 | 30 | 320 | 0.363 | 0.151 | 0.006 |
| 107 | 30 | 330 | 0.361 | 0.151 | 0.006 |
| 108 | 30 | 340 | 0.338 | 0.156 | 0.007 |

FIG. 81

| Number | Angle θ | Angle Φ | Chromaticity X | Chromaticity Y | Lightness Y |
|---|---|---|---|---|---|
| 109 | 30 | 350 | 0.292 | 0.164 | 0.008 |
| 110 | 40 | 0 | 0.256 | 0.191 | 0.012 |
| 111 | 40 | 10 | 0.203 | 0.191 | 0.017 |
| 112 | 40 | 20 | 0.187 | 0.180 | 0.023 |
| 113 | 40 | 30 | 0.187 | 0.163 | 0.026 |
| 114 | 40 | 40 | 0.195 | 0.144 | 0.026 |
| 115 | 40 | 50 | 0.209 | 0.130 | 0.023 |
| 116 | 40 | 60 | 0.228 | 0.126 | 0.020 |
| 117 | 40 | 70 | 0.247 | 0.130 | 0.016 |
| 118 | 40 | 80 | 0.254 | 0.128 | 0.010 |
| 119 | 40 | 90 | 0.224 | 0.102 | 0.006 |
| 120 | 40 | 100 | 0.178 | 0.090 | 0.006 |
| 121 | 40 | 110 | 0.173 | 0.112 | 0.015 |
| 122 | 40 | 120 | 0.176 | 0.134 | 0.029 |
| 123 | 40 | 130 | 0.181 | 0.155 | 0.049 |
| 124 | 40 | 140 | 0.189 | 0.177 | 0.069 |
| 125 | 40 | 150 | 0.199 | 0.195 | 0.086 |
| 126 | 40 | 160 | 0.209 | 0.208 | 0.093 |
| 127 | 40 | 170 | 0.215 | 0.213 | 0.087 |
| 128 | 40 | 180 | 0.216 | 0.210 | 0.072 |
| 129 | 40 | 190 | 0.213 | 0.198 | 0.053 |
| 130 | 40 | 200 | 0.204 | 0.175 | 0.037 |
| 131 | 40 | 210 | 0.193 | 0.145 | 0.026 |
| 132 | 40 | 220 | 0.187 | 0.121 | 0.019 |
| 133 | 40 | 230 | 0.192 | 0.111 | 0.015 |
| 134 | 40 | 240 | 0.209 | 0.118 | 0.013 |
| 135 | 40 | 250 | 0.235 | 0.143 | 0.012 |

FIG. 82

| Number | Angle θ | Angle Φ | Chromaticity X | Chromaticity Y | Lightness Y |
|---|---|---|---|---|---|
| 136 | 40 | 260 | 0.248 | 0.175 | 0.011 |
| 137 | 40 | 270 | 0.237 | 0.193 | 0.010 |
| 138 | 40 | 280 | 0.235 | 0.194 | 0.010 |
| 139 | 40 | 290 | 0.263 | 0.188 | 0.010 |
| 140 | 40 | 300 | 0.291 | 0.174 | 0.011 |
| 141 | 40 | 310 | 0.305 | 0.155 | 0.011 |
| 142 | 40 | 320 | 0.320 | 0.146 | 0.011 |
| 143 | 40 | 330 | 0.345 | 0.153 | 0.010 |
| 144 | 40 | 340 | 0.365 | 0.169 | 0.010 |
| 145 | 40 | 350 | 0.335 | 0.183 | 0.010 |
| 146 | 50 | 0 | 0.309 | 0.264 | 0.017 |
| 147 | 50 | 10 | 0.216 | 0.235 | 0.022 |
| 148 | 50 | 20 | 0.189 | 0.202 | 0.031 |
| 149 | 50 | 30 | 0.184 | 0.169 | 0.036 |
| 150 | 50 | 40 | 0.187 | 0.138 | 0.034 |
| 151 | 50 | 50 | 0.203 | 0.118 | 0.030 |
| 152 | 50 | 60 | 0.233 | 0.117 | 0.028 |
| 153 | 50 | 70 | 0.265 | 0.136 | 0.026 |
| 154 | 50 | 80 | 0.289 | 0.160 | 0.018 |
| 155 | 50 | 90 | 0.262 | 0.158 | 0.008 |
| 156 | 50 | 100 | 0.181 | 0.115 | 0.008 |
| 157 | 50 | 110 | 0.180 | 0.120 | 0.021 |
| 158 | 50 | 120 | 0.180 | 0.133 | 0.042 |
| 159 | 50 | 130 | 0.181 | 0.157 | 0.070 |
| 160 | 50 | 140 | 0.192 | 0.188 | 0.104 |
| 161 | 50 | 150 | 0.208 | 0.216 | 0.133 |
| 162 | 50 | 160 | 0.223 | 0.234 | 0.144 |

FIG. 83

| Number | Angle θ | Angle Φ | Chromaticity X | Chromaticity Y | Lightness Y |
|---|---|---|---|---|---|
| 163 | 50 | 170 | 0.231 | 0.241 | 0.133 |
| 164 | 50 | 180 | 0.233 | 0.245 | 0.106 |
| 165 | 50 | 190 | 0.228 | 0.243 | 0.076 |
| 166 | 50 | 200 | 0.216 | 0.220 | 0.052 |
| 167 | 50 | 210 | 0.199 | 0.176 | 0.037 |
| 168 | 50 | 220 | 0.188 | 0.140 | 0.029 |
| 169 | 50 | 230 | 0.192 | 0.127 | 0.024 |
| 170 | 50 | 240 | 0.218 | 0.140 | 0.022 |
| 171 | 50 | 250 | 0.266 | 0.183 | 0.021 |
| 172 | 50 | 260 | 0.285 | 0.227 | 0.023 |
| 173 | 50 | 270 | 0.242 | 0.223 | 0.021 |
| 174 | 50 | 280 | 0.213 | 0.189 | 0.019 |
| 175 | 50 | 290 | 0.234 | 0.167 | 0.018 |
| 176 | 50 | 300 | 0.251 | 0.152 | 0.019 |
| 177 | 50 | 310 | 0.245 | 0.131 | 0.019 |
| 178 | 50 | 320 | 0.250 | 0.131 | 0.019 |
| 179 | 50 | 330 | 0.287 | 0.167 | 0.023 |
| 180 | 50 | 340 | 0.343 | 0.218 | 0.023 |
| 181 | 50 | 350 | 0.380 | 0.260 | 0.019 |
| 182 | 60 | 0 | 0.361 | 0.351 | 0.027 |
| 183 | 60 | 10 | 0.249 | 0.280 | 0.028 |
| 184 | 60 | 20 | 0.203 | 0.205 | 0.038 |
| 185 | 60 | 30 | 0.186 | 0.160 | 0.043 |
| 186 | 60 | 40 | 0.178 | 0.125 | 0.040 |
| 187 | 60 | 50 | 0.189 | 0.100 | 0.033 |
| 188 | 60 | 60 | 0.226 | 0.102 | 0.032 |
| 189 | 60 | 70 | 0.273 | 0.134 | 0.034 |

FIG. 84

| Number | Angle θ | Angle Φ | Chromaticity X | Chromaticity Y | Lightness Y |
|---|---|---|---|---|---|
| 190 | 60 | 80 | 0.314 | 0.183 | 0.026 |
| 191 | 60 | 90 | 0.308 | 0.245 | 0.011 |
| 192 | 60 | 100 | 0.183 | 0.149 | 0.012 |
| 193 | 60 | 110 | 0.188 | 0.129 | 0.029 |
| 194 | 60 | 120 | 0.179 | 0.133 | 0.052 |
| 195 | 60 | 130 | 0.176 | 0.160 | 0.085 |
| 196 | 60 | 140 | 0.191 | 0.205 | 0.132 |
| 197 | 60 | 150 | 0.217 | 0.240 | 0.173 |
| 198 | 60 | 160 | 0.237 | 0.255 | 0.187 |
| 199 | 60 | 170 | 0.246 | 0.262 | 0.169 |
| 200 | 60 | 180 | 0.247 | 0.272 | 0.132 |
| 201 | 60 | 190 | 0.247 | 0.288 | 0.093 |
| 202 | 60 | 200 | 0.238 | 0.277 | 0.064 |
| 203 | 60 | 210 | 0.214 | 0.210 | 0.048 |
| 204 | 60 | 220 | 0.194 | 0.154 | 0.041 |
| 205 | 60 | 230 | 0.189 | 0.135 | 0.036 |
| 206 | 60 | 240 | 0.211 | 0.150 | 0.033 |
| 207 | 60 | 250 | 0.278 | 0.215 | 0.034 |
| 208 | 60 | 260 | 0.310 | 0.274 | 0.039 |
| 209 | 60 | 270 | 0.244 | 0.249 | 0.039 |
| 210 | 60 | 280 | 0.197 | 0.184 | 0.031 |
| 211 | 60 | 290 | 0.216 | 0.151 | 0.028 |
| 212 | 60 | 300 | 0.225 | 0.139 | 0.029 |
| 213 | 60 | 310 | 0.198 | 0.115 | 0.027 |
| 214 | 60 | 320 | 0.195 | 0.123 | 0.030 |
| 215 | 60 | 330 | 0.241 | 0.181 | 0.045 |
| 216 | 60 | 340 | 0.306 | 0.248 | 0.051 |
| 217 | 60 | 350 | 0.368 | 0.310 | 0.039 |

LIQUID CRYSTAL DISPLAY PANEL AND DISPLAY DEVICE

BACKGROUND OF THE INVENTION

The present invention relates to a liquid crystal display panel. More particularly, the present invention relates to a liquid crystal display panel including nematic liquid crystal twisted at a high degree which is arranged between a pair of substrates having a transparent electrode and an orientation plane and which has a positive anisotropy of refractive index.

In order to provide a multiplex-driven simple matrix type liquid crystal display panel having a larger capacity and higher image quality, a liquid crystal cell having a steep threshold voltage characteristic is required. It has been recently discovered that the threshold voltage characteristic of a liquid crystal cell can be significantly improved by increasing the twist angle of a cell structure having twisted orientation used in a conventional twisted nematic (TN) mode. Then, new display modes utilizing this effect have been developed one after another. Those new modes include SBE (super-twisted birefringence effect), STN (super-twisted nematic) and OMI (optical mode interference) modes.

The SBE mode is characterized in that the twist angle is set at 270° and in that the pretilt angle of liquid crystal molecules is as large as about 20°. The STN mode is characterized in that the pretilt angle is small and the twist angle is set at 180° as disclosed in Japanese unexamined patent publication (KOKAI) No. S60-50511, for example. The OMI mode is characterized by an improvement wherein a coloration phenomenon in an off-state of the STN mode is avoided to provide a substantially achromatic color. These modes are rapidly coming in practice as highly multiplex-driven and high quality liquid crystal displays that replace the conventional TN mode.

Cells in the SBE, STN and OMI modes have a structure wherein a cell having twisted orientation is sandwiched by two polarizers like a conventional TN cell as shown in FIG. 4. Major structural differences between those display modes exist in the values of the twist angle $\Phi$ of liquid crystal molecules, retardation $\Delta n \cdot d$ (the product of the anisotropy of refractive index of liquid crystal and a cell gap), the pretilt angle $\theta_0$ and the azimuth angles $\beta$ and $\gamma$ of the polarizers shown in FIG. 9. Typical values of these parameters are shown in FIG. 5.

The STN mode will be explained below in more detail. In the STN mode, a pair of polarizers were provided above and below the liquid crystal cell and an included angle made by their polarizing axis and a molecular axis of liquid crystal molecules adjacent to the electrode substrate was in a range of 30° to 60°. Due to that, coloration is caused by birefringence and a hue of appearance is not white even if no voltage is applied to the liquid crystal cell, presenting a hue of green to yellowish red color in general. The hue of the appearance generally turns blue, not black, in a state when a voltage is applied.

FIG. 3 is a typical view of the conventional STN mode liquid crystal display panel. In the figure, the liquid crystal cell is sandwiched by a pair of upper and lower polarizers 9 and 10. A transparent electrode 5 composed of ITO or the like is patterned on the inner surface of an upper substrate 1 and an orientation film 6 is applied thereon and is rubbed. similarly, a transparent electrode 7 is patterned on the inner surface of a lower substrate 2 and an orientation film 8 is applied thereon and is rubbed. The upper and lower substrates 1 and 2 face from each other via a sealing material 3, thus holding liquid crystal 4. The liquid crystal 4 is twistedly oriented at a twist angle of about 180° to 200° for example.

In the conventional liquid crystal display panel, normally white and normally black modes may be obtained by selecting a direction of a polarizing axis of the pair of upper and lower polarizers 9 and 10. The normally white mode presents white color when no voltage is applied (off state) and presents black color when a voltage is applied (on state). Contrary to that, the normally black mode presents black color in the off-state and presents white color in the on-state. However, in the normally white mode, the appearance color of the conventional liquid crystal display panel actually assumes green, yellowish green, yellow or yellowish red in the off-state and blue or dark blue in the on-state. in the normally black mode, it turns dark blue in the off-state and yellow in the on-state.

Those colors are not preferable in general as colors displayed on the display panel. A combination of white and black is most suitable psychologically and physically as displayed colors after all and a liquid crystal display panel capable of displaying white and black is requested. In particular, it exerts a large influence on a vividness of color in displaying in color in combination with color filters.

It should be noted that an arrangement in which a compensating optically anisotropic substance is. used as means for eliminating such coloration as described above has been proposed and has been disclosed in Japanese examined patent publication (KOKOKU) No. Hei. 3-50249 for example. FIG. 6 schematically shows the arrangement disclosed therein. In the figure, linear polarizers 102 and 103 are disposed before and after a liquid crystal cell 101. An optically anisotropic substance 120 is interposed between the liquid crystal cell 101 and the linear polarizer 103. As the optically anisotropic substance 120, a liquid crystal component, an uniaxial oriented film, a liquid crystal polymer film, a film created by a mixture of liquid crystal and a polymer compound or the like is used.

Referring still to FIG. 6, a compensating effect of the optically anisotropic substance 120 will be explained briefly.

In the figure, an incident beam 130 is generally white light and includes lights of all wavelengths in the visible region. Its polarization direction is also at random. Passing through the linear polarizer 102, the incident light 130 results in a set of linearly polarized beams 130B, 130G and 130R whose polarizing directions are uniform. 130B, 130G and 130R here refer to polarized beams having 450 nm, 550 nm and 650 nm of wavelength, respectively. Although linearly polarized beams have wavelengths other than those that are naturally contained therein, only typical wavelengths of three colors of blue (B), green (G) and red (R) are shown here. Then, those linearly polarized beams 130B, 130G and 130R pass through the liquid crystal cell 101. The liquid crystal layer within the liquid crystal cell has a structure in which nematic liquid crystal which presents an uniaxial anisotropy of refractive index optically is twisted. Passing through the liquid crystal layer having such structure, the linearly polarized beams 130B, 130G and 130R are polarized as denoted by 131B, 131G and 131R, respectively. When they pass through the liquid crystal layer like that, wavelength dispersion occurs in the polarization state. If the optically anisotropic substance 120 is not interposed for instance, those polarized beams 131B, 131G and 131R pass directly through the linear polarizer 103. Then, only components of the polarized beams having respective wavelengths which correspond to the direction of the linear polarizer 103 pass through it. Because that component differs per 131B 131G and 131R, a combined result does not turn white color and is colored.

Thus, the wavelength dispersion was caused by the birefringence and the coloration was unavoidable in the conventional STN mode liquid crystal cell. Then, the optically anisotropic substance 120 is interposed to cancel the wavelength dispersion caused when the polarized beams 131B, 131G and 131R pass through the liquid crystal cell 101. Each polarized beam component 132B, 132G and 132R which has passed through the optically anisotropic substance 120 is polarized almost linearly and passes through the polarizer 103 as it is. The polarized beam components 132B, 132G and 132R which have passed through the linear polarizer 103 are combined as they are, presenting the same white color with the incident beam.

The coloring phenomenon caused by the wavelength dispersion described above may be considered as a shift of color caused by the thickness of the liquid crystal layer when the beam passes through the liquid crystal cell. Furthermore, a shift of color is caused by twisted orientation of liquid crystal molecules. The beam is influenced by both of them. The uniaxial oriented film such as polycarbonate is used as described above as a compensating material for recovering the shift. However, although it may compensate the shift caused by the thickness of the liquid crystal layer, it is impossible to compensate the shift of color caused by the twisted orientation of the liquid crystal molecules. it then causes a leakage of beams of a wide range of wavelengths, causing coloration. In order to solve that problem, a compensating material having a twisted structure has been developed recently and has allowed the compensation of both shifts. Because it can completely shut down light, a contrast of white and black become clearer and because it can enhance the transmittance, it contributes a reduction in power consumption.

FIG. 7 shows the compensating material having the twisted structure. As shown in the figure, the compensating material comprises polymer films and about 3000 layers of polymer liquid crystal 202 are laminated within a thickness of only 3 μm on a substrate 201. The laminated layers of the polymer liquid crystal 202 are twisted by 240°. The shift of color caused by the twist of the liquid crystal molecules, in addition to the shift of color caused by the thickness of the liquid crystal cell, may be compensated and varied by laminating the polymer films in a relationship reverse to the twisted orientation of the liquid crystal cell.

In the SBE and STN modes, since the orientation of molecules on the wall surface and the polarizing direction of the polarizers are shifted as shown in FIGS. 4 and 5, an incident polarized beam is split into beams having planes of polarization which are parallel with and vertical to the orientation of the molecules (abnormal beam and normal beam, respectively). Since these beams propagate in liquid crystal at different rates, they interfere with each other when passing through the upper polarizer. The conditions of this interference significantly vary against slight changes in the molecular orientation, resulting in a steep threshold characteristic. Thus, in the SBE and STN modes, the retardation $\Delta n \cdot d$ and the azimuth angles $\beta$ and $\gamma$ of polarizers are optimized to provide better display characteristics by means of a sophisticated combination of the steep transformation of the molecular orientation as a result of the application of a voltage and an optical birefringence effect. In the case of the SBE mode, the value of $\Delta n \cdot d$ is about 0.8 μm. There are two types of arrangements of azimuth angles $\beta$ and $\gamma$ of polarizers, i.e., an arrangement wherein $\beta$ and $\gamma$ are about 30° and 60°, respectively, and an arrangement wherein $\beta$ and $\gamma$ are about 30° and −30°, respectively. Under the former condition, the displayed color will be yellow in an unselected state and black in a selected state, which is referred to as a "yellow mode".

On the other hand, under the latter condition, the displayed color will be blue in the unselected state and substantially achromatic in the selected state, which is referred to as a "blue model". The SBE and STN modes have problems in that it is difficult to provide multicolor display because the coloration in the unselected state occurs as a result of the birefringence effect and in that the cell gap must be controlled with an accuracy as high as +0.1 μm to 0.2 μm or less because variations in the cell gap are sensitively reflected as changes in the birefringent color. As a technique for preventing coloring, methods utilizing polymer films which are an optically anisotropic substance have been proposed, one example of such methods being disclosed in Japanese examined patent publication (KOKOKU) No. Hei. 3-50249. As described above, in the conventional SBE and STN modes, the colored state has been unavoidable because of wavelength dispersion as a result of birefringence. The optically anisotropic substance has an effect of canceling such wavelength dispersion.

FIGS. 8a through 8c schematically show the effect of the polymer film which is the optically anisotropic substance for preventing coloring. Hereinafter, the polymer film may be referred to as an RCF (Retardation Compensation Film). As shown in the figure, the RCF is basically uniaxial and has a positive anisotropy of refractive index. Axes of coordinate orthogonal from each other along plane directions are denoted by x and y axes and that in the thickness direction is denoted by z-axis. When a refractive index in the x-axis direction is nx, a refractive index in the y-axis direction is ny and a refractive index in the z-axis direction is nz, a relationship of ny>nx=nz holds. That is, the RCF has an equal refractive index in biaxial directions of x and z and has a refractive index which is different only in the uniaxial direction of y. That is, the RCF has an uniaxial anisotropy of refractive index. This one axis is the y-axis and is referred to as an optical axis hereinafter. Because the refractive index in the direction of the optical axis is larger than the refractive index in the direction orthogonal to the optical axis, the RCF has a positive anisotropy of refractive index. Note that the optical axis (y-axis) is fixed in the case of the RCF 120 used in the first prior art example shown in FIG. 6. In contrast, the optical axis (y-axis) of the RCF of the second prior art example shown in FIG. 7 is twisted along the thickness direction (z-axis direction).

Meanwhile, the liquid crystal molecules within the liquid crystal cell (hereinafter referred to as LC) is uniaxial and shows a positive anisotropy of refractive index optically as described before. FIG. 8b schematically shows it. The LC has an optical axis of x-axis and has a large refractive index nx. It also has small refractive indices ny and nz with respect to y-axis and z-axis directions. Their relationship may be represented by nx>ny=nz. Note that the optical axis (x-axis) is actually twisted along the z-axis direction within the LC.

In the case of an SBE cell, the pretilt angle must be as large as about 20° in order to prevent the occurrence of another orientation-transformed mode wherein the screw axis is tilted. This has not been put into practical use because it requires a rhombic deposition orientation process which is not suitable for mass production. In order to solve this problem, efforts are being put on the development of surface orientation processes which enable larger pretilt angles. From this point of view, an STN mode wherein the twist angle is about 180° to 240° are currently in practical use. However, this STN mode has problems not only in that the use of polymer films which are an optically anisotropic substance can not completely eliminate coloration but also in that it has a poor viewing angle characteristic that results in significant coloration depending on viewing angles.

FIG. 8c shows a state in which the RCF and the LC are superposed. Note that in this case, they are superposed so that the optical axis (y-axis) of the RCF crosses with the optical axis (x-axis) of the LC at right angles. As a result, the refractive index combined with respect to the x-axis direction and the refractive index combined with respect to the y-axis direction becomes almost equal and a symmetrical configuration is brought about with respect to the plane directions. That is, a two-dimensional symmetry is provided and an optically improved display may be obtained as far as it goes. However, a three-dimensional symmetry is not obtained because the refractive index combined with respect to the z-axis direction (thickness direction) is different from that of the x-axis a nd y-axis directions. In other words, they cannot be compensated and varied triaxial-symmetrically. Specifically, the z-axis direction (thickness direction) is related with the viewing angle dependency. Accordingly, although it is possible to eliminate the coloring to a certain degree by using the RCF in the conventional liquid crystal display panel, the contrast changes significantly depending on a viewing angle, damaging a visibility of the display screen.

On the other hand, the basic cell structure in the OMI mode is the same as the STN cell. It is different from the STN mode in that the retardation $\Delta n \cdot d$ of the cell is reduced and in that the azimuth angles of the polarizers are optimized to achieve an elliptic polarization mode which is close to circular polarization. This reduces dependence on wavelength and provides a substantially achromatic color in the unselected state. As a result, black and white display has been substantially achieved to substantially improve the visibility of display and the possibility of multicolor display has been provided. For example, such an OMI mode is disclosed in Japanese unexamined patent publication (KOKAI) No. S63-74030. Another advantage of the OMI mode lies in that the requirement for the accuracy of cell gap control is relaxed. On the other hand, there are problems in that the sharpness of the threshold characteristic is poorer than that achieved in an STN cell and in that contrast is relatively poor because the white level is dark due to low transmittance. Current efforts toward the improvement on these problems are put on increasing the twist angle $\Phi$ to about 240° and on compensating transmitted spectra by adding a dichroic pigment, although not successful yet.

SUMMARY OF THE INVENTION

The present invention confronts the above-described problems with the prior art, and it is an object of the present invention to provide a liquid crystal display panel which has a wide viewing angle characteristic, which is uncolored and which has high contrast.

The means provided to achieve such an object will be explained below with reference to FIG. 2.

As shown in the figure, the display panel of the present invention has a laminated structure in which a liquid crystal cell and an optically anisotropic substance 12 are laminated. A pair of polarizers 9 and 10 are disposed on the both sides of the laminated structure. Hereinafter, the upper polarizer 9 may be denoted by a PLU and the lower polarizer 10 may be denoted by a PLD. The liquid crystal cell has a structure in which a pair of upper and lower glass substrates 1 and 2 are joined by a sealing material 3 and a liquid crystal layer 4 is held within a gap between the both substrates 1 and 2. A transparent electrode 5 patterned into a predetermined shape is provided on the inner surface of the upper glass substrate 1. The transparent electrode 5 is coated by an orientation film 6 rubbed in a predetermined direction. A transparent electrode 7 patterned into a predetermined shape is also provided on the inner surface of the lower glass substrate 2. This transparent electrode 7 is also coated by an orientation film 8 rubbed in a predetermined direction. Note that the upper orientation film 6 may be denoted by an AFU and the lower orientation film by an AFD.

In the arrangement described above, while the liquid crystal cell (LC) modulates beams distributing in the plane direction thereof and advancing in the thickness direction, the optically anisotropic substance 12 compensates and varies wavelength dispersion of the beams passing through the liquid crystal cell. It is characterized in that while the liquid crystal layer 4 held in the liquid crystal cell has a positive anisotropy of refractive index and its optical axis is oriented in the plane direction, the optically anisotropic substance 12 is made of a polymer film (RCF), has a negative anisotropy of refractive index and its optical axis is oriented in the plane direction. More specifically, while the liquid crystal layer 4 is twistedly oriented and its optical axis is twistedly rotated in a forward direction at an angle over 90° along the thickness direction, the optically anisotropic substance is made of a single polymer film (RCF) and its optical axis is twistedly rotated in the reverse direction at an angle over 90° along the thickness direction. Instead of that, the optically anisotropic substance 12 may be composed of a plurality of polymer films (RCF) wherein an optical axis of each polymer film is twistedly rotated in the reverse direction stepwise.

Another means provided to achieve such object will be explained below. Specifically, a liquid crystal display panel according to the present invention has nematic liquid crystal twisted at a high degree which is arranged between a pair of substrates having a transparent electrode and an orientation plane and which has positive anisotropy of refractive index, and is characterized in that the retardation of the liquid crystal is set at 0.55 $\mu$m to 0.75 $\mu$m and in that the twist angle is set at 180° to 270°. In some instances, polymer films which are an optically anisotropic substance may be provided to prevent coloration and the retardation of such a film being set 200 nm or less. In other instances, polymer films which are an optically anisotropic substance whose refractive index in the thickness direction is smaller than that in the plane direction are provided.

BRIEF DESCRIPTION OF THE DRAWINGS

FIG. 5 is a table showing typical values of conventional parameters.

FIGS. 9A, 9B, 9C are typical views for explaining the operation of the display panel of the present invention.

FIG. 14 is a typical view showing a fourth example for reference (E) of the display panel.

FIG. 25 is a typical view showing a seventh example for reference of the display panel.

FIG. 26 is a table showing differences between conventional STN and OMI modes and the present invention.

FIG. 37 is a table showing chromaticity and lightness in an unselected state in the third embodiment of the present invention.

FIG. 38 is a table showing chromaticity and lightness in an unselected state in the third embodiment of the present invention.

FIG. 39 is a table showing chromaticity and lightness in an unselected state in the third embodiment of the present invention.

FIG. 40 is a table showing chromaticity and lightness in an unselected state in the third embodiment of the present invention.

FIG. 41 is a table showing chromaticity and lightness in an unselected state in the third embodiment of the present invention.

FIG. 42 is a table showing chromaticity and lightness in an unselected state in the third embodiment of the present invention.

FIG. 43 is a table showing chromaticity and lightness in an unselected state in the third embodiment of the present invention.

FIG. 44 is a table showing chromaticity and lightness in an unselected state in the third embodiment of the present invention.

FIG. 45 is a table showing chromaticity and lightness in a selected state in the third embodiment of the present invention.

FIG. 46 is a table showing chromaticity and lightness in a selected state in the third embodiment of the present invention.

FIG. 47 is a table showing chromaticity and lightness in a selected state in the third embodiment of the present invention.

FIG. 48 is a table showing chromaticity and lightness in a selected state in the third embodiment of the present invention.

FIG. 49 is a table showing chromaticity and lightness in a selected state in the third embodiment of the present invention.

FIG. 50 is a table showing chromaticity and lightness in a selected state in the third embodiment of the present invention.

FIG. 51 is a table showing chromaticity and lightness in a selected state in the third embodiment of the present invention.

FIG. 52 is a table showing chromaticity and lightness in a selected state in the third embodiment of the present invention.

FIG. 53 is a table showing chromaticity and lightness in a selected state in the fifth example for reference of the display panel.

FIG. 54 is a table showing chromaticity and lightness in a selected state in the fifth example for reference of the display panel.

FIG. 55 is a table showing chromaticity and lightness in a selected state in the fifth example for reference of the display panel.

FIG. 56 is a table showing chromaticity and lightness in a selected state in the fifth example for reference of the display panel.

FIG. 57 is a table showing chromaticity and lightness in a selected state in the fifth example for reference of the display panel.

FIG. 58 is a table showing chromaticity and lightness in a selected state in the fifth example for reference of the display panel.

FIG. 59 is a table showing chromaticity and lightness in a selected state in the fifth example for reference of the display panel.

FIG. 60 is a table showing chromaticity and lightness in a selected state in the fifth example for reference of the display panel.

FIG. 61 is a table showing chromaticity and lightness in an unselected state in the fifth example for reference of the display panel.

FIG. 62 is a table showing chromaticity and lightness in an unselected state in the fifth example for reference of the display panel.

FIG. 63 is a table showing chromaticity and lightness in an unselected state in the fifth example for reference of the display panel.

FIG. 64 is a table showing chromaticity and lightness in an unselected state in the fifth example for reference of the display panel.

FIG. 65 is a table showing chromaticity and lightness in an unselected state in the fifth example for reference of the display panel.

FIG. 66 is a table showing chromaticity and lightness in an unselected state in the fifth example for reference of the display panel.

FIG. 67 is a table showing chromaticity and lightness in an unselected state in the fifth example for reference of the display panel.

FIG. 68 is a table showing chromaticity and lightness in an unselected state in the fifth example for reference of the display panel.

FIG. 69 is a table showing chromaticity and lightness in a selected state in the sixth example for reference of the display panel.

FIG. 70 is a table showing chromaticity and lightness in a selected state in the sixth example for reference of the display panel.

FIG. 71 is a table showing chromaticity and lightness in a selected state in the sixth example for reference of the display panel.

FIG. 72 is a table showing chromaticity and lightness in a selected state in the sixth example for reference of the display panel.

FIG. 73 is a table showing chromaticity and lightness in a selected state in the sixth example for reference of the display panel.

FIG. 74 is a table showing chromaticity and lightness in a selected state in the sixth example for reference of the display panel.

FIG. 75 is a table showing chromaticity and lightness in a selected state in the sixth example for reference of the display panel.

FIG. 76 is a table showing chromaticity and lightness in a selected state in the sixth example for reference of the display panel.

FIG. 77 is a table showing chromaticity and lightness in an unselected state in the sixth example for reference of the display panel.

FIG. 78 is a table showing chromaticity and lightness in an unselected state in the sixth example for reference of the display panel.

FIG. 79 is a table showing chromaticity and lightness in an unselected state in the sixth example for reference of the display panel.

FIG. 80 is a table showing chromaticity and lightness in an unselected state in the sixth example for reference of the display panel.

FIG. 81 is a table showing chromaticity and lightness in an unselected state in the sixth example for reference of the display panel.

FIG. 82 is a table showing chromaticity and lightness in an unselected state in the sixth example for reference of the display panel.

FIG. 83 is a table showing chromaticity and lightness in an unselected state in the sixth example for reference of the display panel.

FIG. 84 is a table showing chromaticity and lightness in an unselected state in the sixth example for reference of the display panel.

DETAILED DESCRIPTION OF THE PREFERRED EMBODIMENTS

Figure 1:
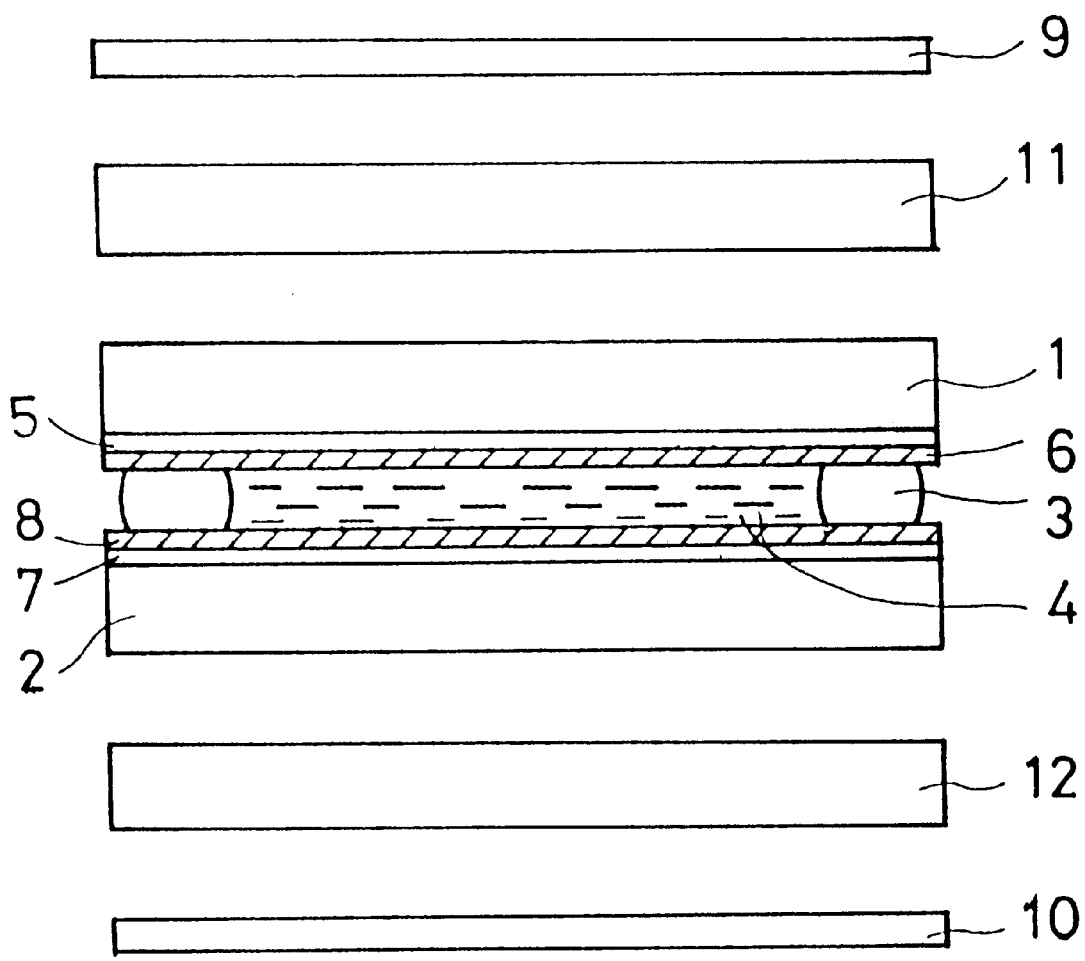
FIG. 1 is a sectional view showing a basic configuration of a liquid crystal display panel according to the present invention.

The operation of the display panel of the present invention will be explained below with reference to FIGS. 9A through 9C. As shown in FIG. 9A, the RCF is uniaxial and has a negative anisotropy of refractive index. The refractive index nx in the x-axis direction is small and the refractive index ny in the y-axis direction and the refractive index nz in the z-axis direction are large. That is, a relationship of $nx<ny=nz$ holds. When $\Delta n=nx-ny$, it follows $\Delta n<0$, so that it has a negative anisotropy of refractive index. Note that the optical axis of the uniaxial birefringent film RCF lies in the x-axis direction. Generally, when the RCF is created by uniaxial orientation, its oriented axis direction coincides with the optical axis. Further, it is possible to create the relationship of $\Delta n<0$ by adequately selecting a polymer substance.

The liquid crystal molecules contained in the LC in FIG. 9B are uniaxial and have a positive anisotropy of refractive index and their optical axis is oriented in the plane direction. The nx is large and the ny and the nz are small, and a relationship of $nx>ny=nz$ holds. Because $\Delta n>0$, it has a positive anisotropy of refractive index. Its optical axis coincides with the x-axis. Generally, a molecular axis of the liquid crystal molecule becomes the optical axis.

FIG. 9C shows a state in which the RCF and the LC are superposed. They are superposed so that the optical axis (x-axis) of the RCF coincides with the optical axis (x-axis) of the LC. As a result, all the refractive indices with respect to the triaxial directions of xr y and z become almost equal, providing a triaxial symmetrical optical configuration. Due to that, the view angle dependency of contrast is significantly improved. Note that the optical axis of the LC actually rotates in the forward direction (e.g. counterclockwise). In response to that, the optical axis of the RCF is twistedly rotated in the reverse direction (clockwise). Thereby, the coloration caused by the wave-length dispersion may be eliminated almost completely. Note that when single RCF is used, a structure in which the optical axis is continuously twistedly rotated is adopted. When a plurality of RCFs are combined to compose the optically anisotropic substance, they are arranged so that the optical axis of each RCF is twistedly rotated stepwise.

The liquid crystal display panel according to the present invention excludes the problems with the conventional STN and OMI modes and includes only the advantages of those modes by appropriately setting various parameters of the liquid crystal display panel. That is, it achieves a wider viewing angle, prevents coloration and provides higher contrast. It goes without saying that it has a steep threshold characteristic suitable for multiplex driving which is similar to those of the conventional STN and OMI modes.

Embodiment

A preferred embodiment of a liquid crystal display panel according to the present invention will now be described in detail with reference to the drawings.

FIG. 1 is a typical sectional view showing a basic configuration of the liquid crystal display panel according to the present invention. This liquid crystal display panel is constructed using a pair of upper and lower glass substrates 1 and 2 which are joined together by a seal material 3 with a predetermined gap therebetween. A nematic liquid crystal 4 which has a positive anisotropy of refractive index and which is twisted at a high degree is held in this gap. A transparent electrode 5 and an orientation film 6 are formed on the inner surface of the upper glass substrate 1. For example, the transparent electrode 5 is patterned in the form of stripes in the direction of lines. The orientation film 6 is made of, for example, polyimide and is rubbed in a predetermined direction to provide an orientation plane. The lower glass substrate 2 is also formed with a transparent electrode 7 and an orientation film 8. For example, the transparent electrode 7 is patterned in the form of stripes in the direction of rows. The orientation film 8 is similarly made of polyimide or the like and is rubbed in a predetermined direction to provide an orientation plane. As a result, a simple matrix type liquid crystal cell is obtained.

Figure 2:
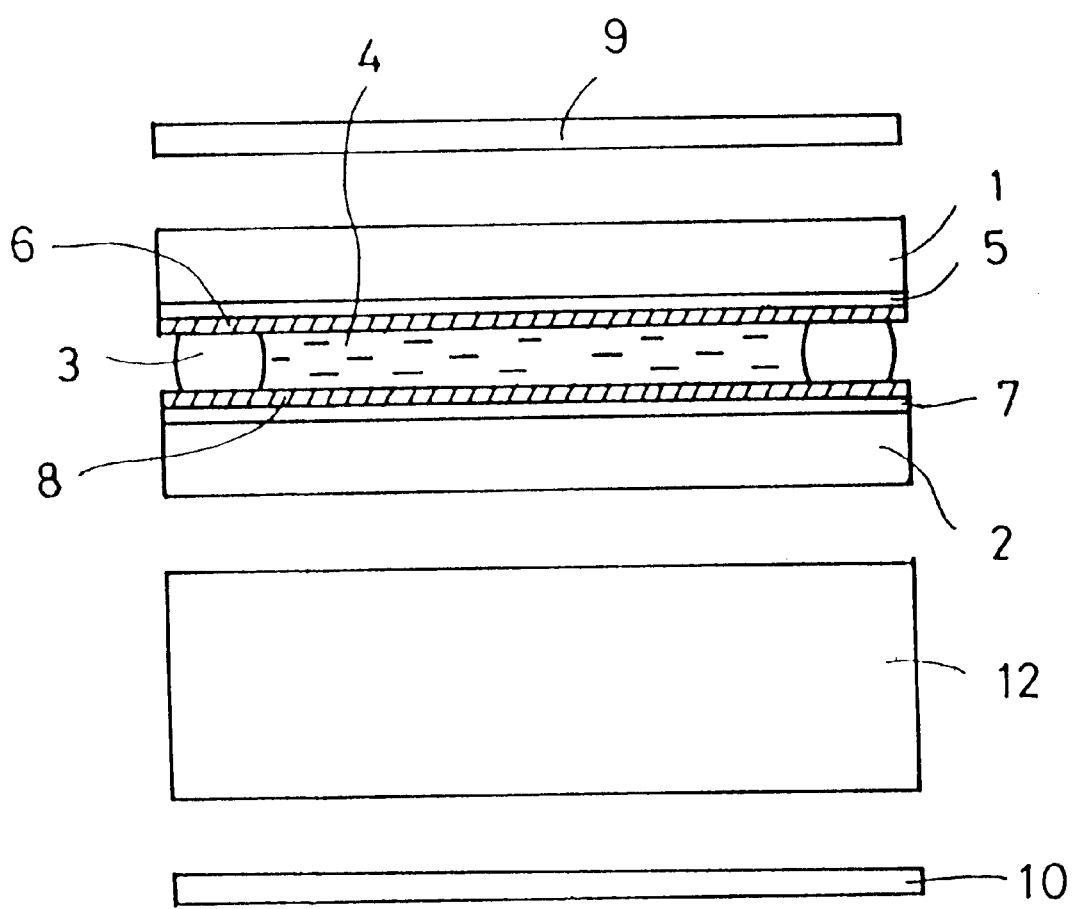
FIG. 2 is a typical section view showing one example of the liquid crystal display panel according to the present invention.
Figure 3:
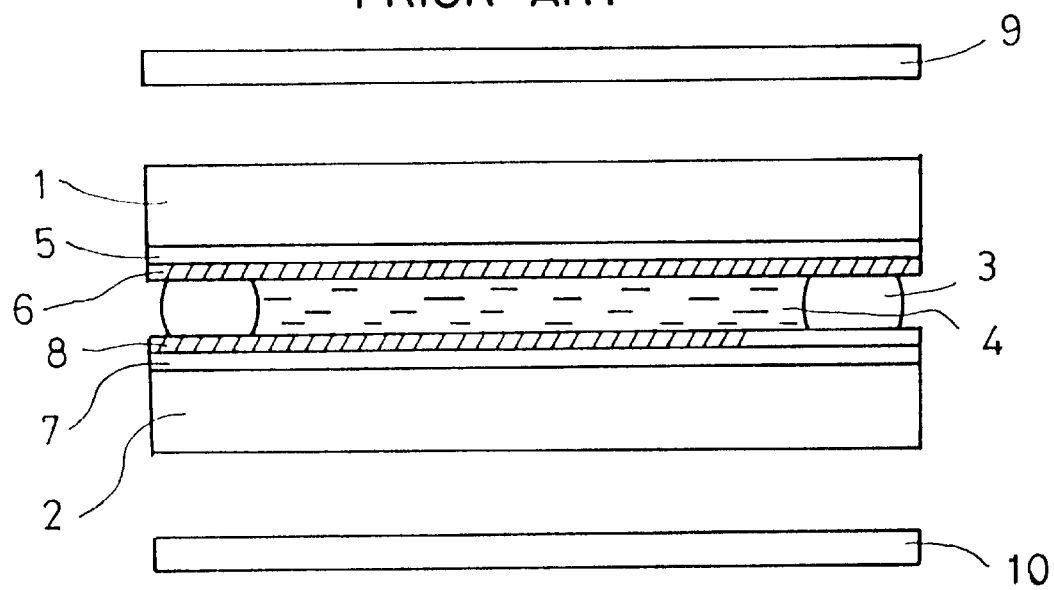
FIG. 3 is a typical section view showing one example of a conventional liquid crystal display panel.
Figure 4:
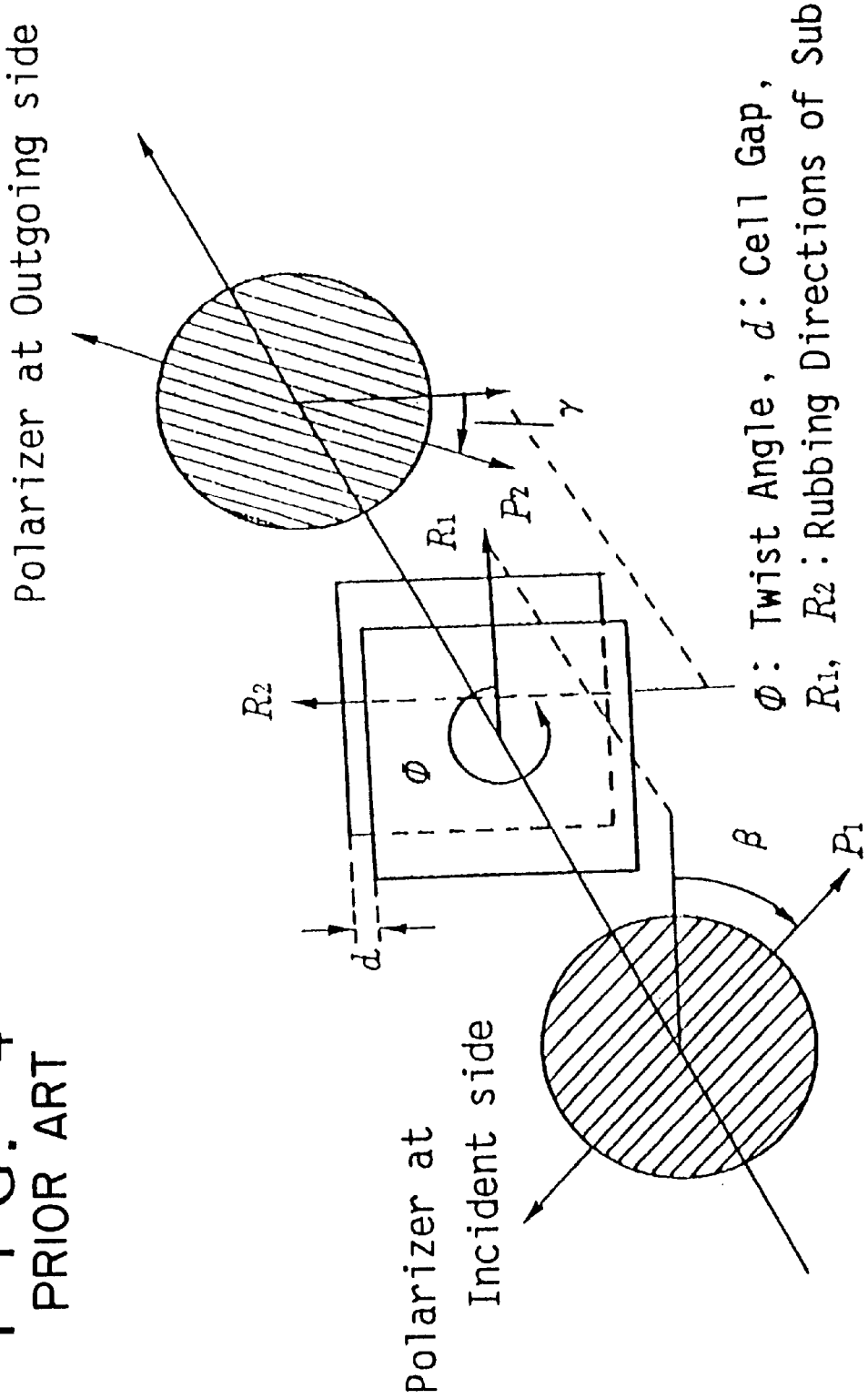
FIG. 4 is a typical view showing a general configuration of the conventional liquid crystal display panel.
Figure 6:
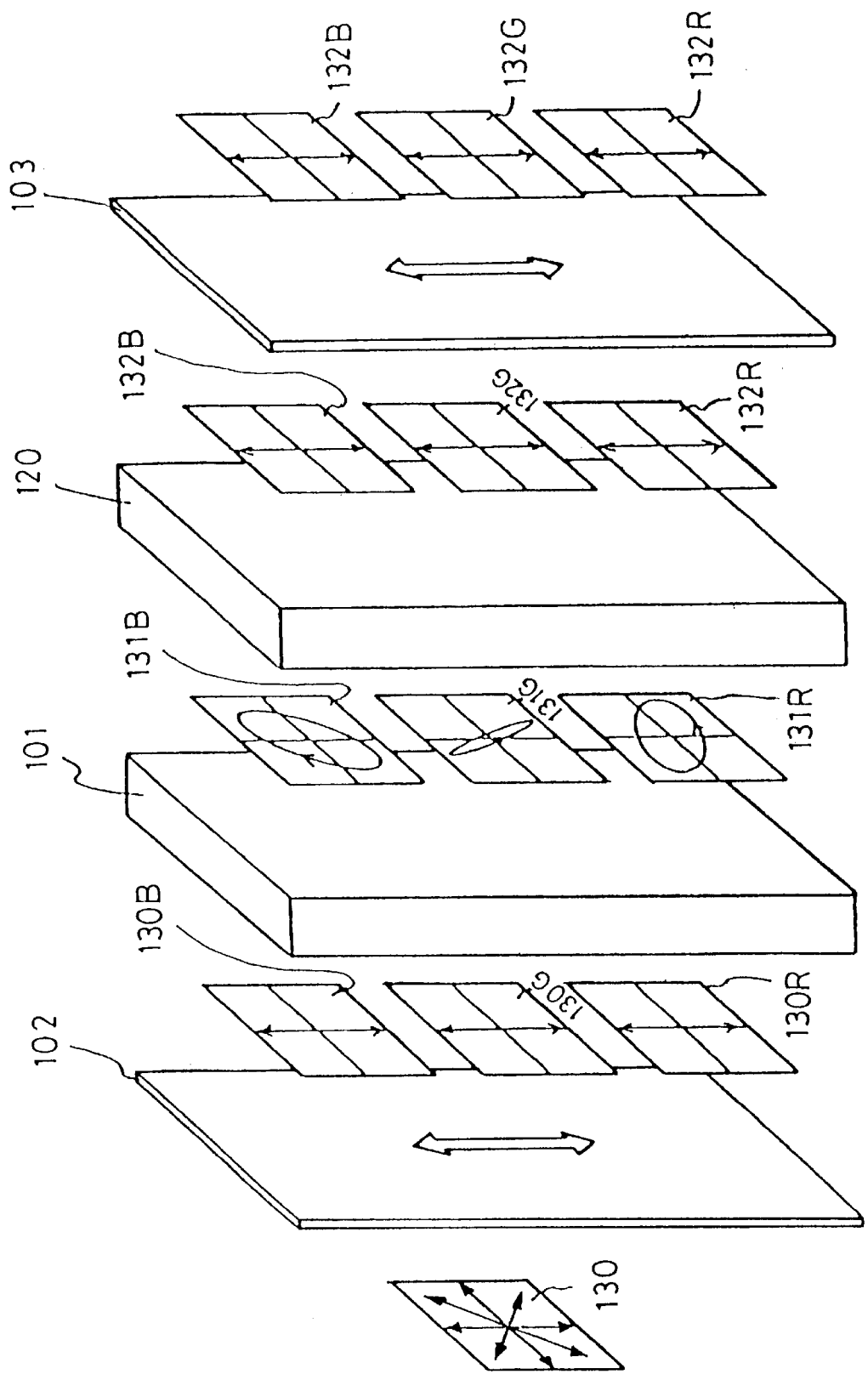
FIG. 6 is a typical view for explaining the operation of a conventional compensating optically anisotropic substance.

This liquid crystal cell is sandwiched by polarizers 9 and 10 on the upper and lower sides thereof, respectively. A polymer film 11 which is an optically anisotropic substance for preventing coloration is interposed between the upper glass substrate 1 and the upper polarizer 9. Similarly, a polymer film 12 which is an optically anisotropic substance for preventing coloration is interposed between the lower glass substrate 2 and the lower polarizer 10. Beside the case wherein both of the polymer film 11 and the polymer film 12 are interposed as shown in FIG. 1, there are cases wherein the polymer film 11 is omitted and only the polymer film 12 is interposed as shown in FIG. 2, wherein only the polymer film 11 is interposed and the polymer film 12 is omitted (not shown) and wherein the polymer films 11 and 12 are not simplex and composed of a plurality of polymer films (not shown).

Figure 10:
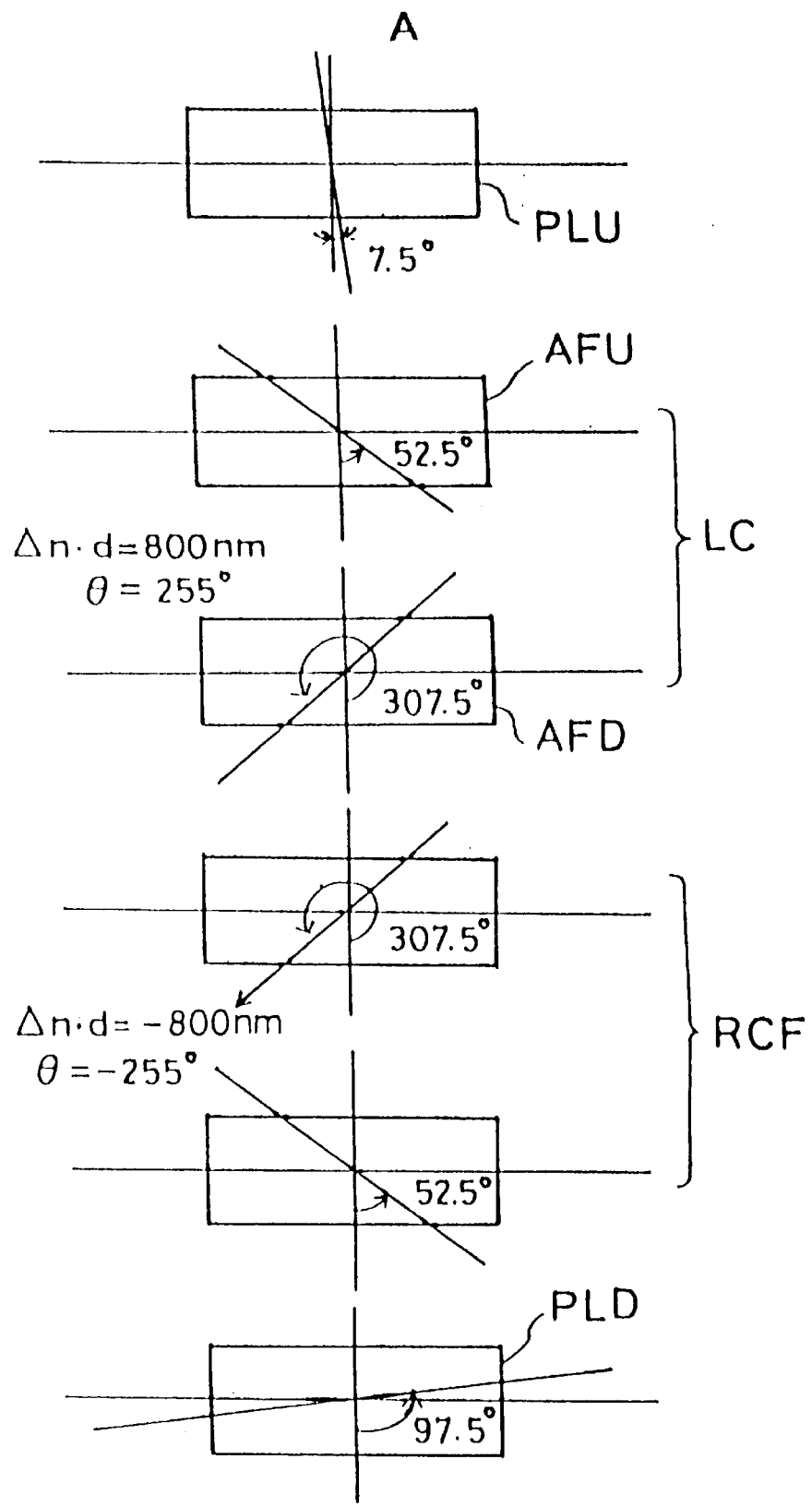
FIG. 10 is a typical view showing a first embodiment (A) of the display panel according to the present invention.

FIG. 10 shows a first embodiment (A) of the display panel of the present invention. A polarizing axis (absorption axis) of the upper polarizer PLU is set at an azimuth of 7.5°. The liquid crystal cell LC is supertwistedly oriented by $\theta=255°$. The retardation of this liquid crystal cell LC is 800 nm. Note that the retardation is denoted by $\Delta n \cdot d$. $\Delta n$ denotes an anisotropy of refractive index as described before and d denotes a thickness of the liquid crystal layer. In the liquid crystal cell LC, the rubbing direction (orientation) of the upper orientation film AFU is set at 52.5° and that of the lower orientation film AFD is set at 307.5°. Accordingly, the optical axis of the liquid crystal layer is twistedly rotated by 255° in the forward direction. The RCF is composed of a single polymer film. Its retardation $\Delta n \cdot d$ is set at −800 nm. That is, the RCF has a negative anisotropy of refractive index and its optical axis is twistedly rotated by 255° in the reverse direction ($\theta=255°$). They are set so that the optical axes coincide from each other at the boundary of the LC and the RCF. Finally, a polarizing axis of the lower polarizer PLD is set at an azimuth of 97.5°. Accordingly, polarizing axes of the PLU and PLD substantially cross each other at right angles. The first embodiment turns to the normally black mode from this relationship.

Figure 15:
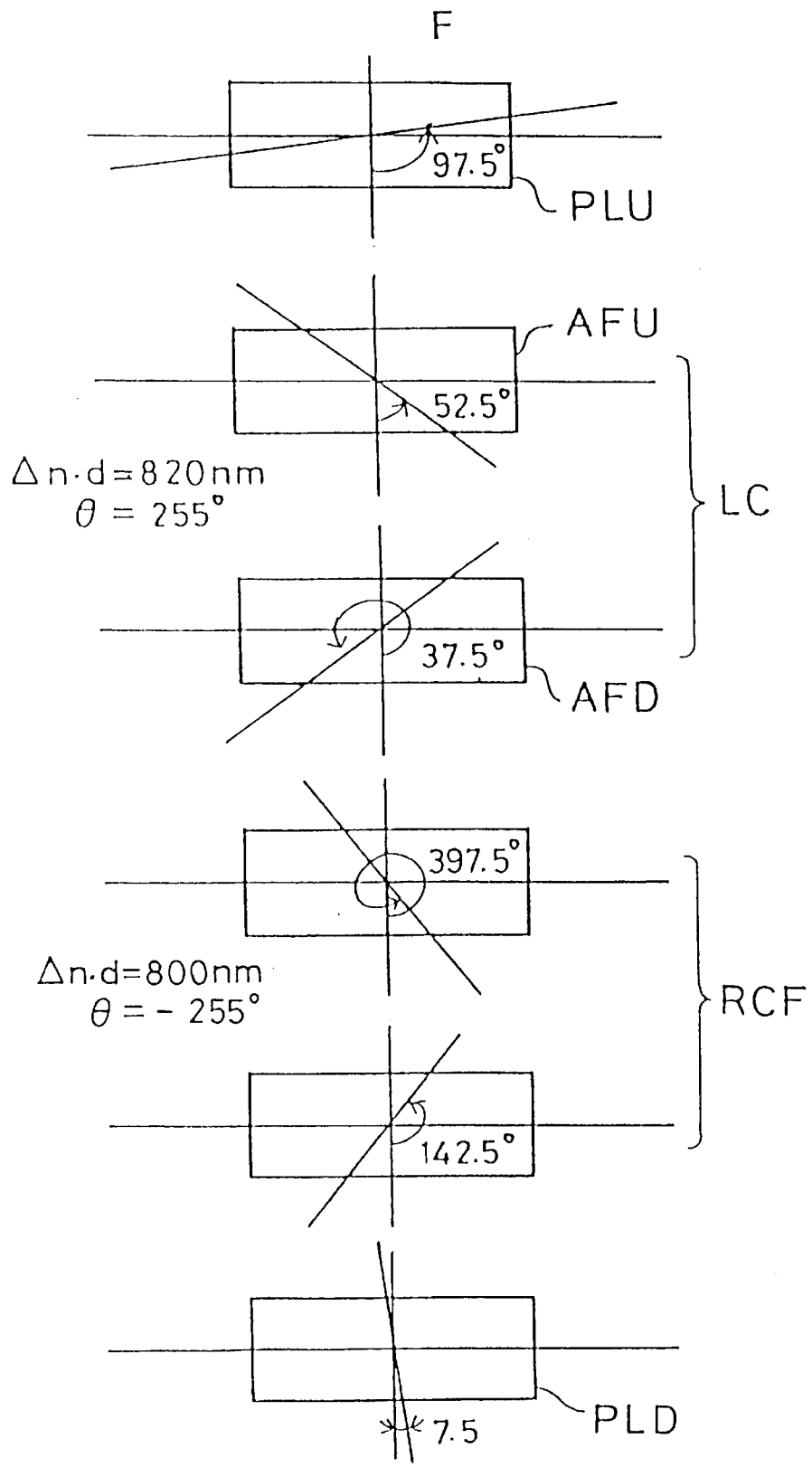
FIG. 15 is a typical view showing a first example for reference (F) of the display panel.

FIG. 15 shows a conventional liquid crystal panel for the purpose of comparison and is referred to as a first example for reference (F). A polarizing axis of the upper polarizer PLU is set at an azimuth of 97.5°. The liquid crystal cell LC has a retardation $\Delta n \cdot d=820$ nm and has a positive anisotropy of refractive index. The twist angle $\theta$ is set at 255°. In concrete, the rubbing direction of the upper orientation film AFU is set at 52.5° and that of the lower orientation film AFD is set at 307.5°. The RCF is composed of a single polymer film and the retardation $\Delta n \cdot d$ is 800 nm. That is, the RCF has a positive anisotropy of refractive index, differing from the first embodiment (A). The optical axis is also twistedly rotated and its twist angle $\theta$ is −255° in the reverse direction. The optical axis is shifted by 90° at the boundary of the LC and the RCF. Finally, the direction of polarizing axis of the lower polarizer PLD is set at 7.50°.

Figure 16A:
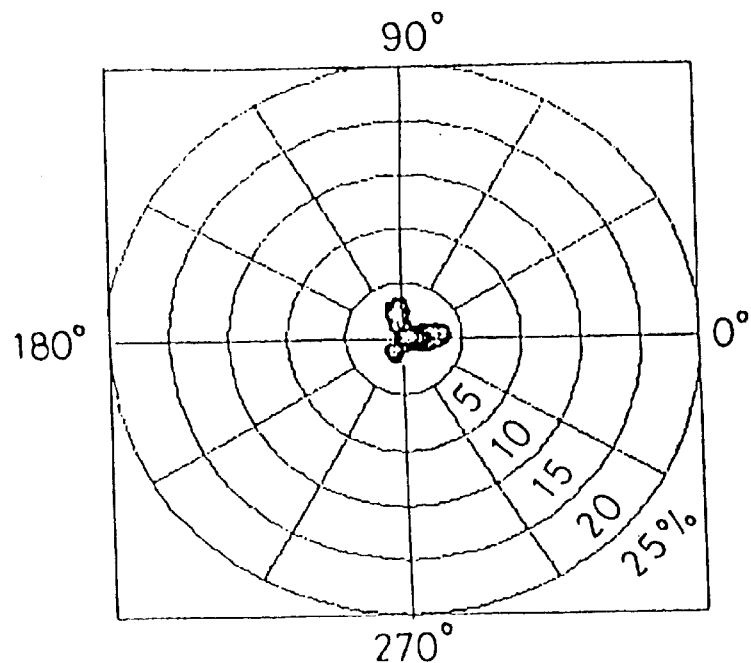
FIGS. 16A and 16B are graphs showing a viewing angle dependency of transmittance in the off state of the first embodiment (A) and the first example for reference (F), respectively.
Figure 16B:
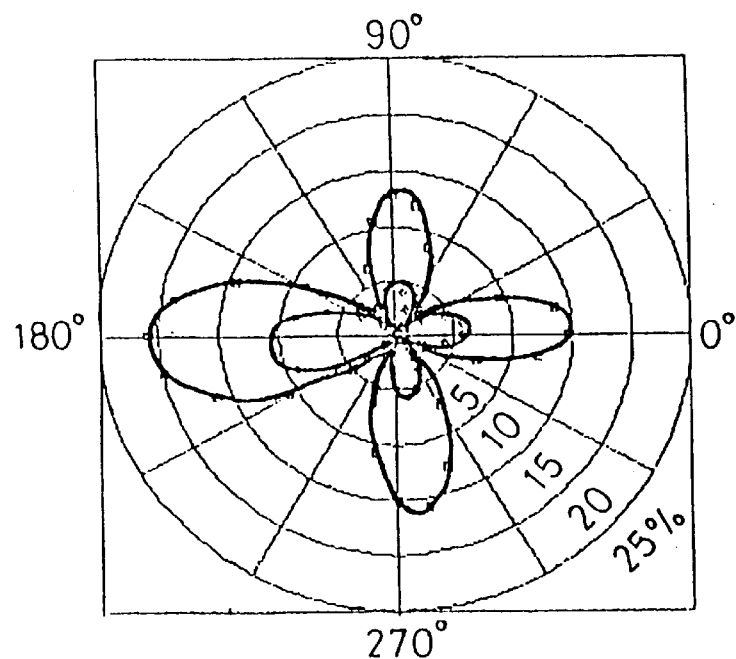
Figure 17A:
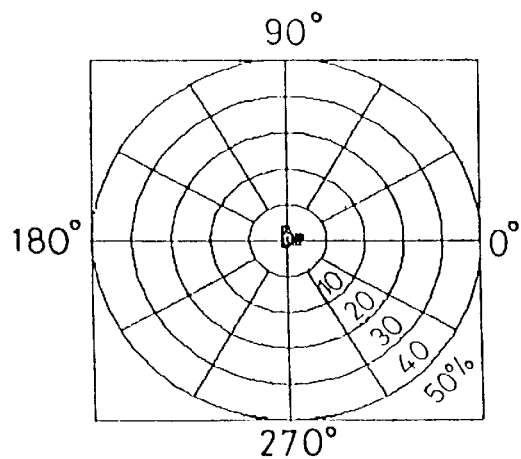
FIGS. 17A through 17E are graphs showing viewing angle dependencies of transmittance in the off state.
Figure 17C:
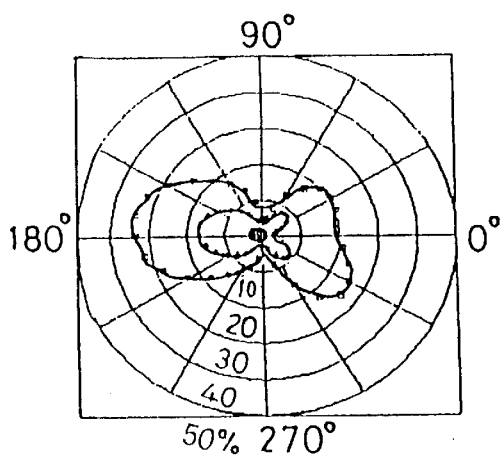
Figure 17B:
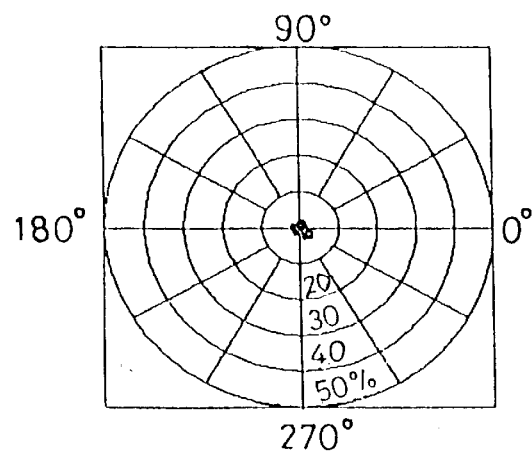
Figure 17D:
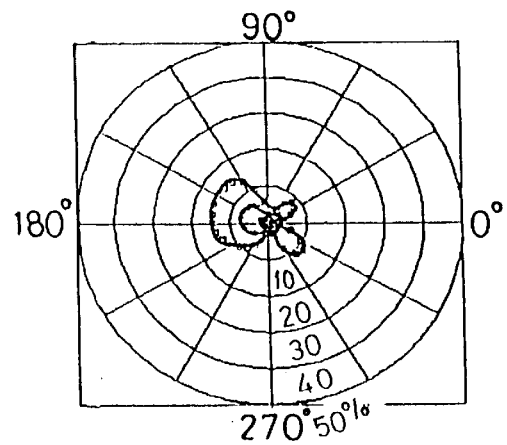
Figure 17E:
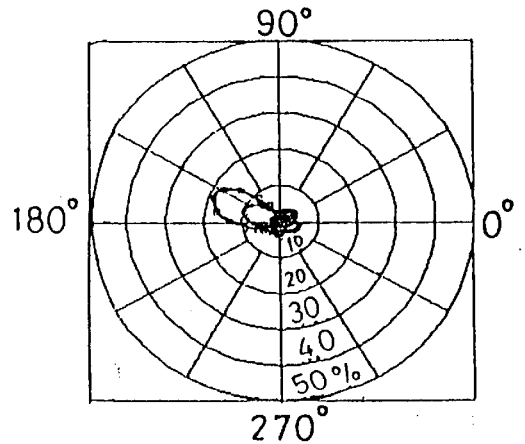

FIGS. 16A and 16B are graphs showing simulated results of viewing angle dependency of transmittance of the first embodiment (A) and the first example for reference (F), respectively. In the graphs, the transmittance is plotted across an azimuth angle of 360°. Among two curves, the inner curve represents a transmittance distribution curve when a tilt angle is 40° and the outer curve represents a transmittance distribution curve when a tilt angle is 60°. The transmittance is represented in terms of percent and concentric circles are drawn per 5% toward the outside in the radius direction from the center. Note that the tilt angle represents an inclination of line of sight to a normal line of the display panel. These graphs are obtained by simulating the transmittance in the normally black mode in the off-state. Accordingly, if the light is completely shielded, the transmittance becomes 0% and the transmittance distribution curve converges to the center. As the curve extends toward outside, the transmittance becomes higher, showing that light is less shielded in the off-state and the light has leaked.

As for the first embodiment (A) of the present invention, the transmittance distribution curve is concentrated at the center and the light is shielded very well. The transmittance is within 5% and almost no light leaks, regardless of the azimuth angle and tilt angle. In contrast, the transmittance increases in the directions of 0°, 90°, 180° and 270° of azimuth angle and the light leaks remarkably in the first example for reference (F) which is the prior art example. When the tilt angle reaches 60°, a leakage of about 20% occurs in maximum and it has a large viewing angle dependency. As described before, the first embodiment (A) and the first example for reference (F) basically has the same structure. It is only different in that the anisotropy of refractive indices of the RCF are negative and positive, respectively. A large difference of the viewing angle dependency as shown in the graph in FIG. 16 is brought about by that difference, showing that the effect of the present invention is very remarkable.

Note that although the RCF has been a single polymer film, the same effect may be obtained when it is composed of more than two polymer films so long as the twisted rotation angle is the same.

Figure 11:
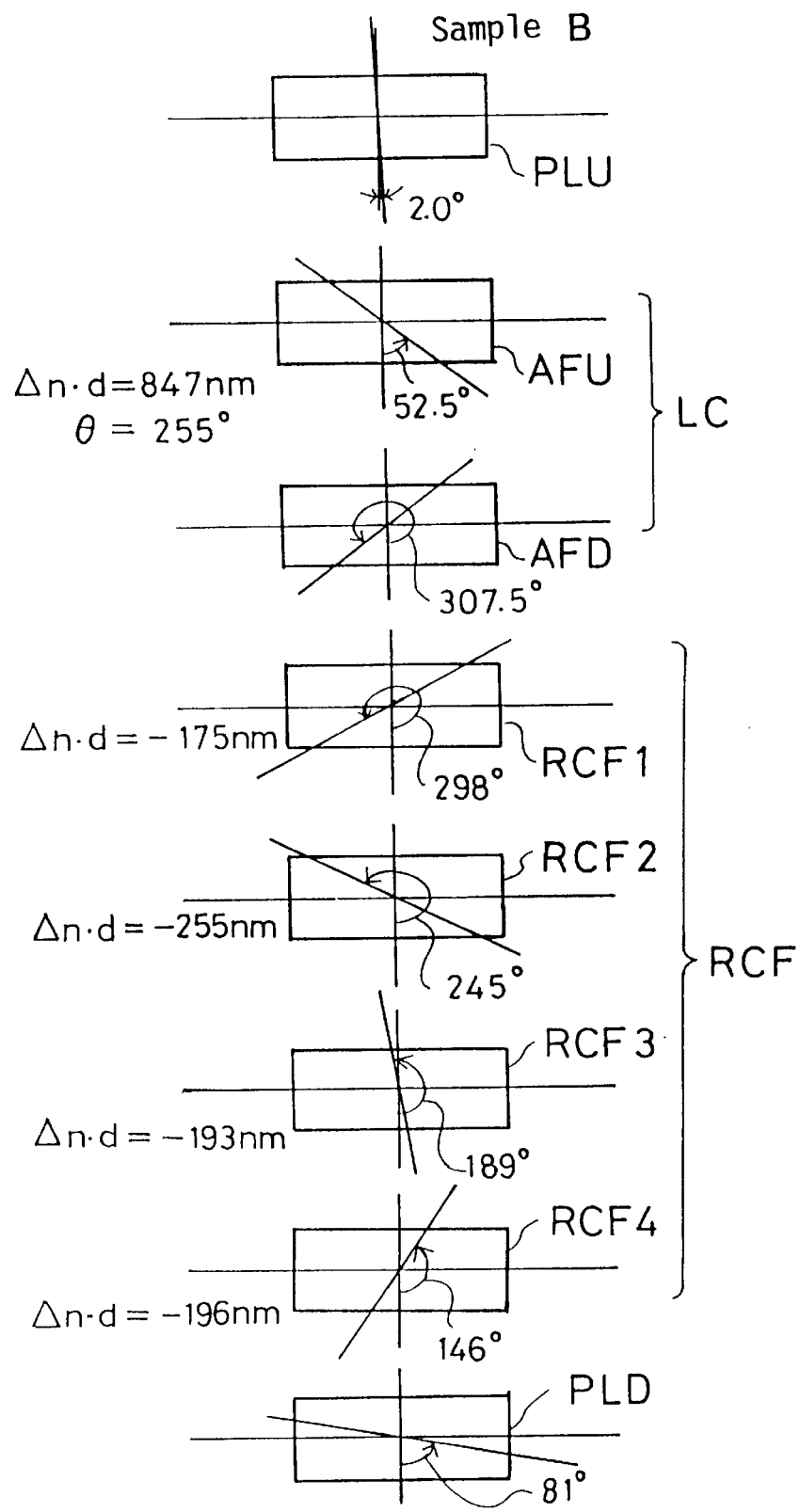
FIG. 11 is a typical view showing a second embodiment (B) of the display panel according to the present invention.

FIG. 11 shows a second embodiment (B) of the display panel of the present invention. An azimuth of a polarizing axis of the upper polarizer PLU is set at 2.0°. A retardation of the liquid crystal cell LC is set as $\Delta n \cdot d = 847$ nm. The twist angle $\theta$ is 255°. That is, the rubbing direction of the upper orientation film AFU is set at 52.5° and that of the lower orientation film AFD is set at 307.5°. Next, the RCF is composed of a plurality of laminated polymer films and an optical axis of each polymer film is twistedly rotated in the reverse direction stepwise.

In the present embodiment, four polymer films RCF1, RCF2, RCF3 and RCF4 are laminated. The retardation of the RCF1 is −175 nm and its optical axis is set in an azimuth of 298°. The retardation of the RCF2 is −255 nm and its optical axis is set in an azimuth of 245°. The retardation of the RCF3 is −193 nm and its optical axis is set in an azimuth of 189°. The retardation of the RCF4 is −196 nm and its optical axis is set in an azimuth of 146°. Thus, the four RCF1 through RCF4 having a negative antisotropy of refractive index are laminated in the second embodiment (B). The optical axes are twistedly rotated in the reverse direction from the LC sequentially from the RCF1 to the RCF4.

Note that the RCF having the negative anisotropy of refractive index may be readily created by uniaxially orienting polystyrene, poly methyl metacrylate or the like or by biaxially orienting polycarbonate or the like. Conversely, a RCF having a positive anisotropy of refractive index may be obtained by uniaxially orienting polycarbonate or the like. Finally, a polarizing axis of the lower polarizer PLD is set in an azimuth of 81°.

As it is apparent from the above description, while the single RCF in which the optical axis is continuously twistedly rotated within the plane has been used in the first embodiment (A), a plurality of RCFs in which the optical axes are twistedly rotated stepwise are laminated to compose an optically anisotropic substance for preventing coloration in the second embodiment (B). It has a performance substantially equivalent to the first embodiment (A) optically.

Figure 12:
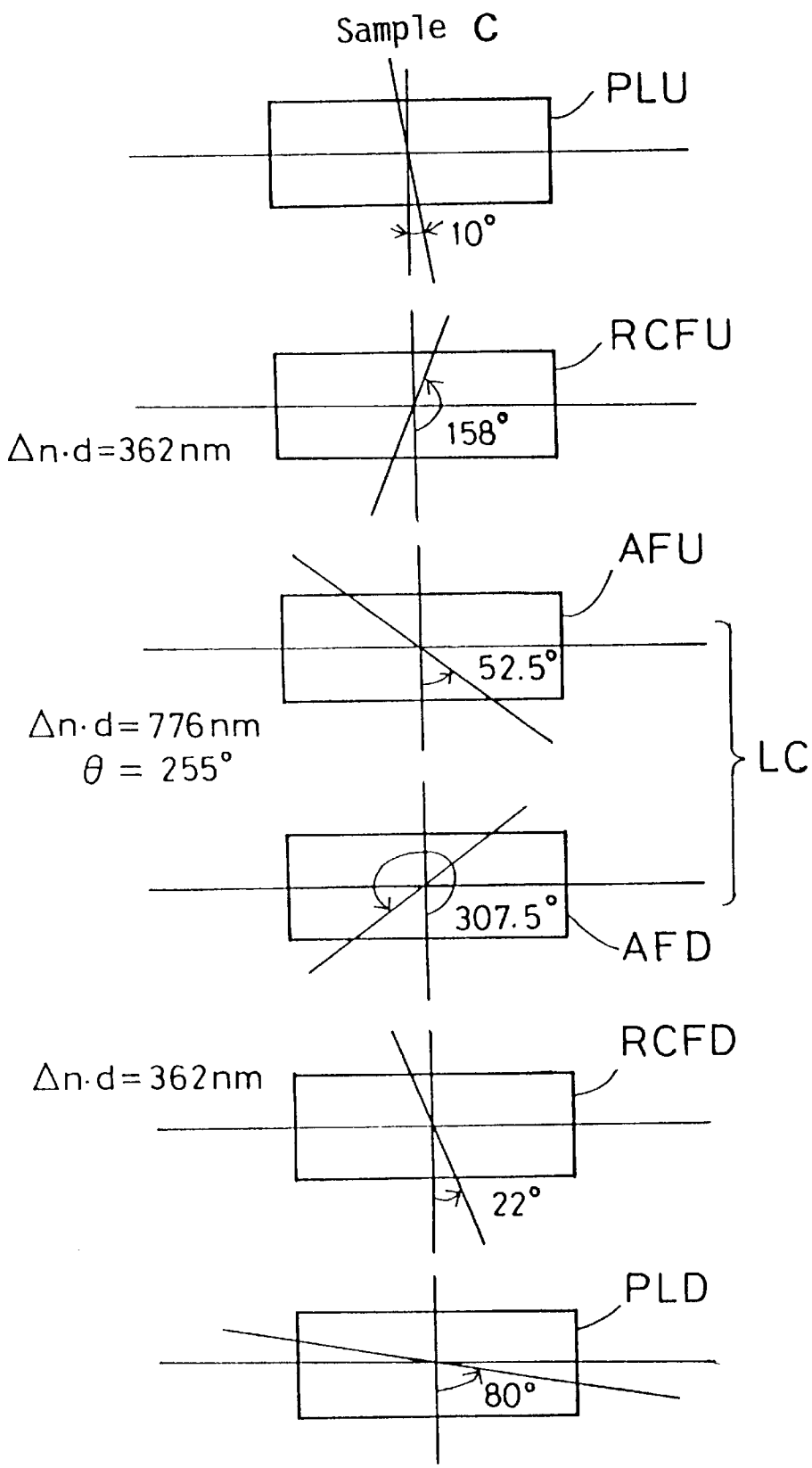
FIG. 12 is a typical view showing a second example for reference (C) of the display panel.

FIG. 12 shows a second example for reference (C) for the purpose of comparison. In the second example for reference (C), a polarizing axis of the upper polarizer PLU is set in an azimuth of 10°. A retardation of the liquid crystal cell LC $\Delta n \cdot d$ is set at 776 nm. Its twist angle $\theta$ is set at 255°. In concrete, the rubbing direction of the upper orientation film AFU is set at 52.5° and that of the lower orientation film AFD is set at 307.5°. In the second example for reference (C), an upper compensating film RCFU is interposed between the upper polarizer PLU and the liquid crystal cell LC. The RCFU has a positive anisotropy of refractive index and its retardation $\Delta n \cdot d$ is set at 362 nm. Its optical axis is set in an azimuth of 158°. A polarizing axis of the lower polarizer PLD is set in an azimuth of 80°. A lower compensating film RCFD is interposed between the liquid crystal cell LC and the lower polarizer PLD. The RCFD also has a positive anisotropy of refractive index and its retardation $\Delta n \cdot d$ is set at 362 nm. Its optical axis is set in an azimuth of 22°. Thus, the second example for reference (C) has a symmetrical structure in which the liquid crystal cell LC is sandwiched by the RCFU and RCFD.

Figure 13:
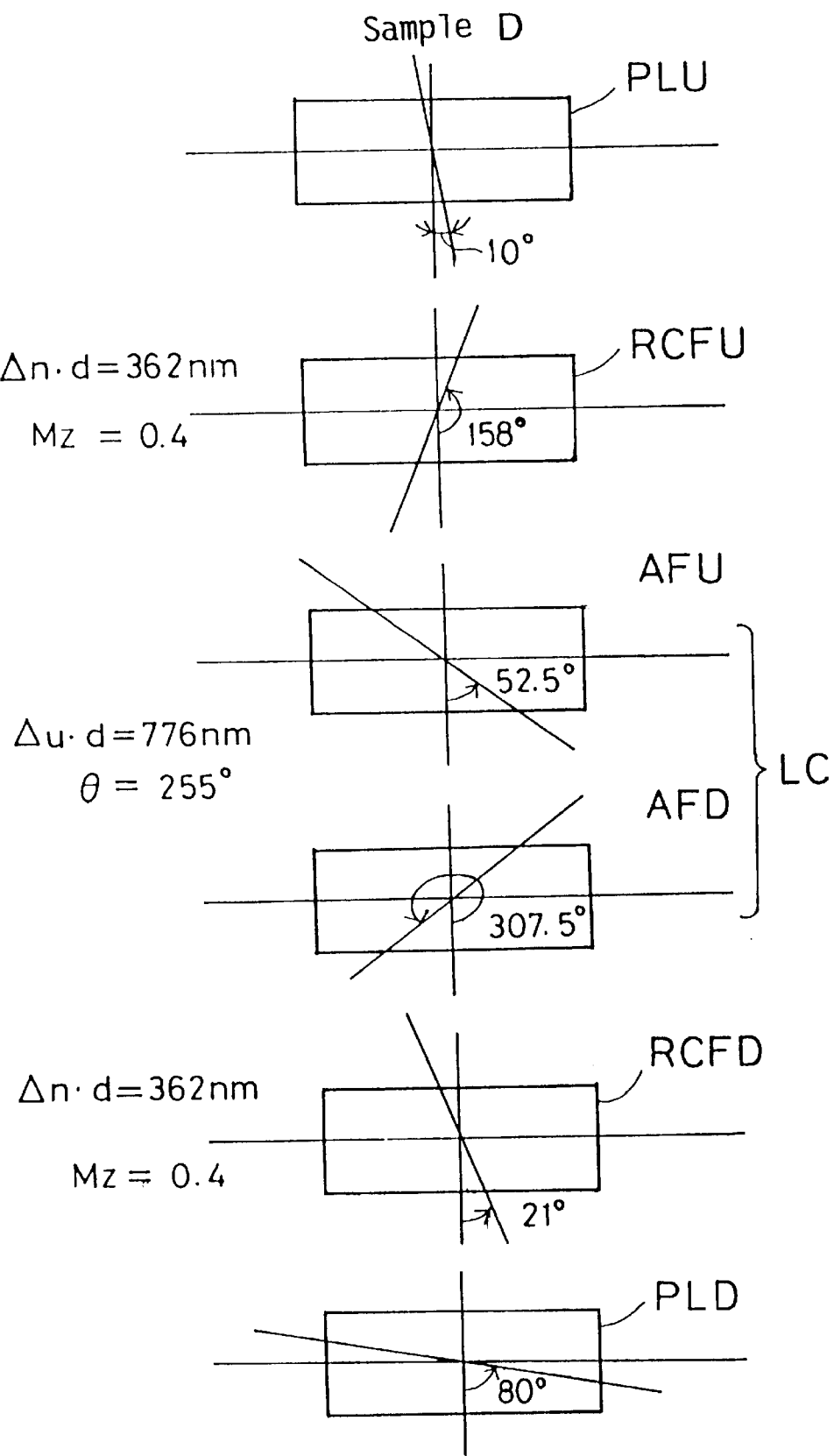
FIG. 13 is a typical view showing a third example for reference (D) of the display panel.

Next, a third example for reference (D) will be explained with reference to FIG. 13. The third example for reference (D) basically has the same symmetrical structure with the second example for reference (C) and various parameters such as the azimuth of axis and retardation are also the same. They are different in that biaxial films are used as the RCFU and RCFD. Here, $Mz = (nx - nz)/\Delta n$ is used as a scale for expressing the biaxial quality. Mz of the both RCFU and RCFD is set at 0.4. They are the same with the RCFU and RCFD used in the second example for reference (C) in that they have the positive anisotropy of refractive index and the value of the retardation is equal, except that they are biaxial.

FIG. 14 shows a fourth example for reference (E). A polarizing axis of the upper polarizer PLU is oriented in an azimuth of 166°. A retardation of the liquid crystal cell LC is set at $\Delta n \cdot d = 800$ nm and its twist angle $\theta$ is set at 255°. A polarizing axis of the lower polarizer PLD is set in an azimuth of 78°. Differing from the second example for reference (C) and the third example for reference (D) described above, the fourth example for reference (E) has an asymmetrical structure and two compensating films RCF1 and RCF2 are disposed and laminated between the upper polarizer PLU and the liquid crystal cell LC. The RCF1 has a positive anisotropy of refractive index and its retardation is set at $\Delta n \cdot d = 382$ nm. The same applies also to the second RCF2. However, while an optical axis is set in an azimuth of 112° in the RCF1, it is set in an azimuth of 148° in the RCF2. Note that the both RCF1 and RCF2 are uniaxial.

FIGS. 17A through 17E are graphs showing simulated results of viewing angle dependency of transmittance in the off-state of the first embodiment (A) through the fourth example for reference (E). The graphs are represented in the same manner as with the graphs in FIG. 16 described before. However, the scale of the transmittance is different and it is taken per 10%. Accordingly, the outermost concentric circle represents 50% of transmittance. Among three curves, the inner curve represent a transmittance distribution curve when a tilt angle is 20°, the middle curve represents a transmittance distribution curve when a tilt angle is 40° and the outer curve represents a transmittance distribution curve when a tilt angle is 60°.

As for the first embodiment (A) and the second embodiment (B) of the present invention, the transmittance is 5% or less in the whole azimuth even if the tilt angle is inclined significantly to 60° and almost no light leaks. In other words, almost no viewing angle dependency of transmittance is seen. In contrast, it can be seen that the light leaks depending on an azimuth in the second example for reference (C) through the fourth example for reference (E). The transmittance exceeds 20% at 0° and 180° of azimuth angles when the tilt angle is 60° in the second example for reference (C) and is occur extreme leakage is occurs. In the case of the third example for reference (D), the transmittance extends to about 15% in a range of 180° of azimuth angle when the tilt angle is 60°. In the fourth example for reference (E), the transmittance extends to about 20% in a range of 150° of azimuth angle when the tilt angle is 60°.

Figure 18A:
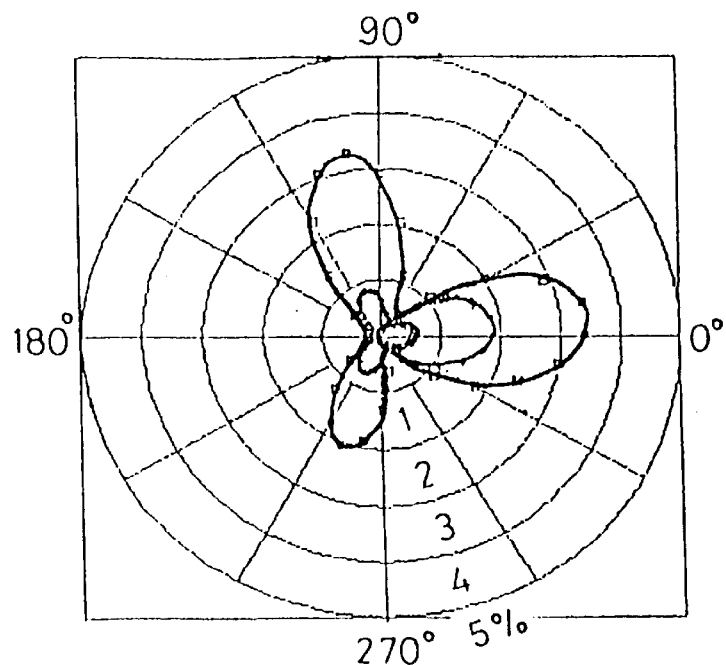
FIGS. 18A and 18B are graphs showing viewing angle dependencies of transmittance in the off state.
Figure 18B:
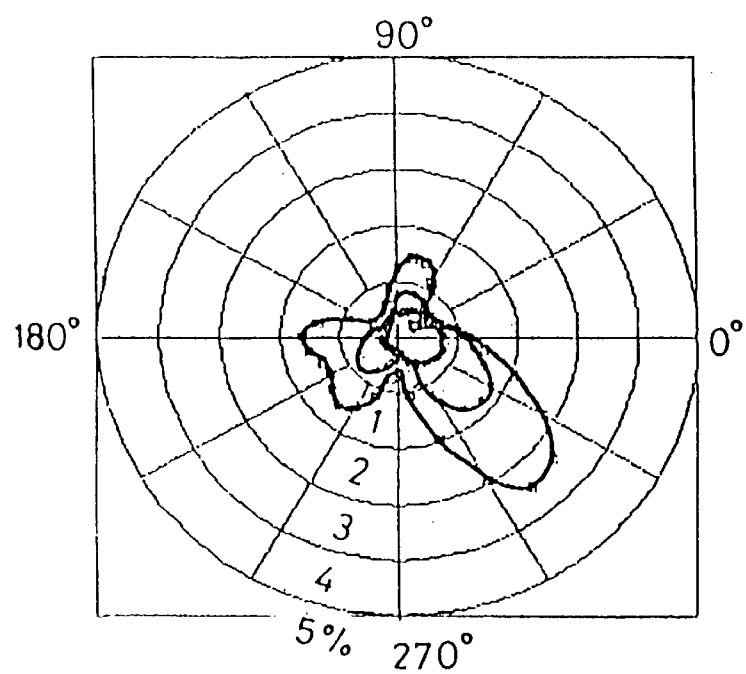
Figure 19A:
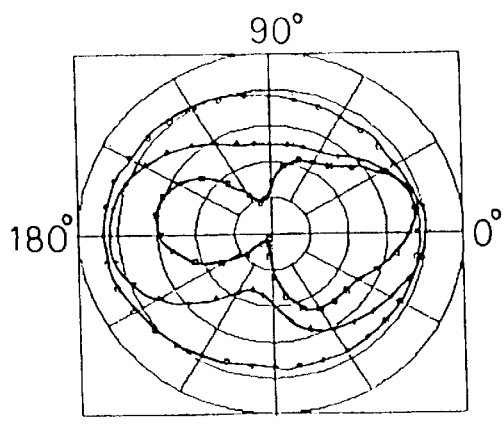
FIGS. 19A through 19E are graphs showing viewing angle dependencies of transmittance in the on state.
Figure 19C:
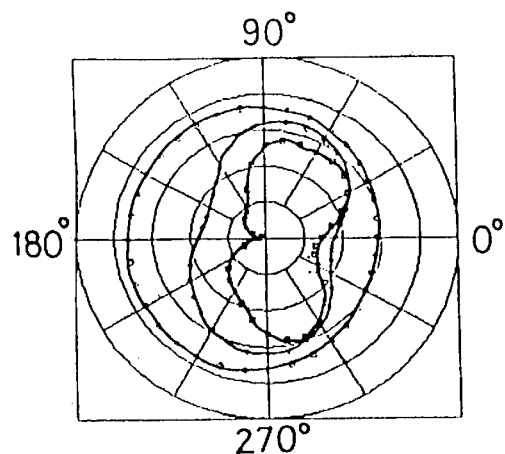
Figure 19B:
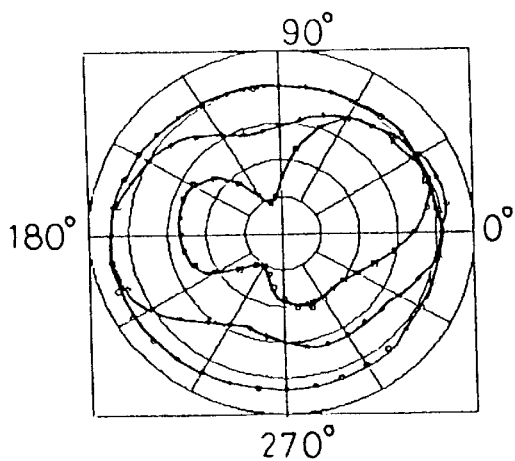
Figure 19D:
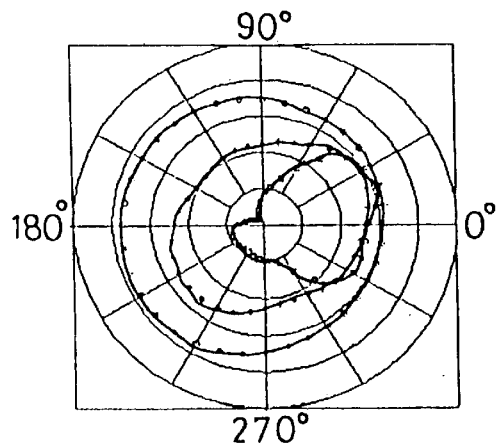
Figure 19E:
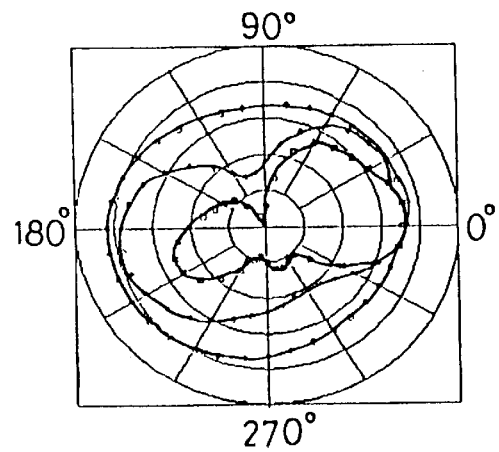
Figure 20A:
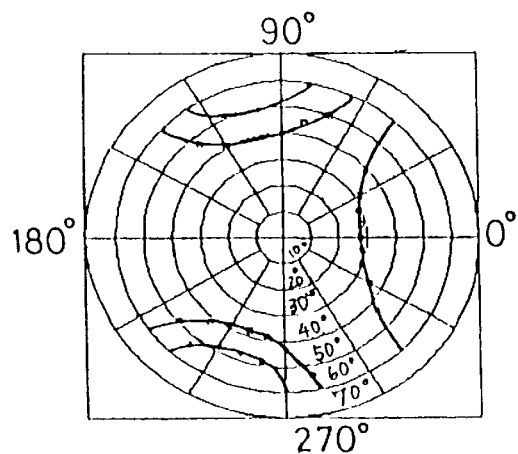
FIGS. 20A through 20E are graphs showing viewing angle dependencies of contrast of the display panel.
Figure 20C:
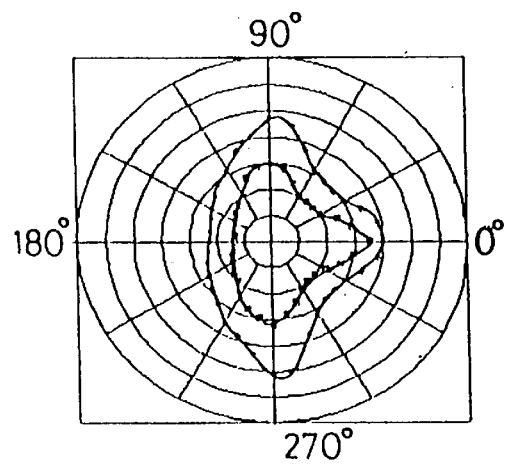
Figure 20B:
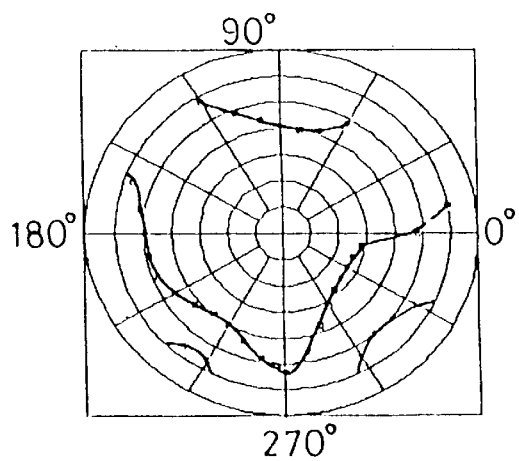
Figure 20D:
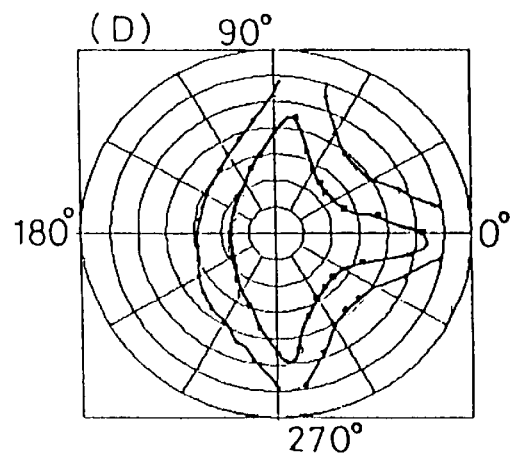
Figure 20E:
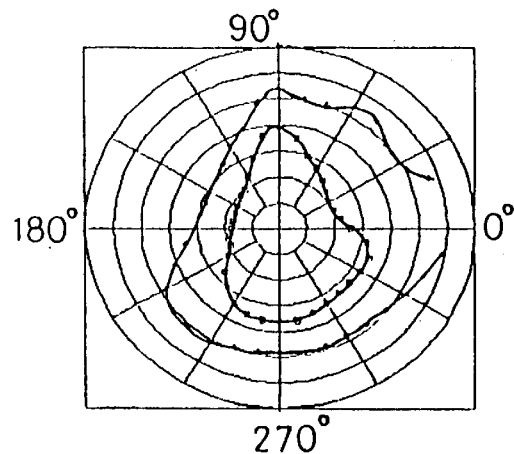

FIGS. 18A and 18B are magnified graphs of the graphs of the first embodiment (A) and the second embodiment (B)

shown in FIG. 17 magnified by ten times. Accordingly, the outermost concentric circle represents the line of 5% of transmittance. As described before, the transmittance is suppressed to 4% or less across the whole azimuth even if the tilt angle is inclined significantly to 60° in the first embodiment (A) and the second embodiment (B).

FIGS. 19A through 19E are graphs showing simulated results of viewing angle dependency of transmittance in the on-state of the first embodiment (A) through the fourth example for reference (E). The outermost concentric circle represents 50% of transmittance in each graph. Among three curves contained in each graph, the inner curve represent a transmittance distribution curve when a tilt angle is 60°, the middle curve represents a transmittance distribution curve when a tilt angle is 40° and the outer curve represents a transmittance distribution curve when a tilt angle is 20°. Although the transmittances of the first embodiment (A) and the second embodiment (B) are larger more or less as compared to those of the second example for reference (C) through the fourth example for reference (E) as a whole, the difference among the samples is not so remarkable as compared to those in the off-state. It is considered to happen because the compensating effect by the RCF is not so effective since the liquid crystal molecules are built up in the on-state.

FIGS. 20A through 20E are graphs showing simulated results of equal contrast curves of the first embodiment (A) through the fourth example for reference (E). Note that the contrast was found from a ratio of the transmittance in on-state to the transmittance in off-state. In each graph shown in FIG. 20, the concentric circles represent tilt angles from 10° to 70°, beside the azimuth angle of 360°. The inner curve represents an equal contrast curve whose contrast ratio is 40 and the outer curve represents an equal contrast curve whose contrast ratio is 10.

Noticing on the equal contrast curve whose contrast ratio is 40, it can be seen that a significant contrast can be obtained up to a range of considerable tilt angle in the first embodiment (A) and the second embodiment (B). In contrast, the level of 40 of contrast ratio cannot be maintained when the tilt angle exceeds 30° in the second example for reference (C) through the fourth example for reference (E). Thus, a large difference in the viewing angle dependency of contrast is produced among the first embodiment (A) and second embodiment (B) of the present invention and the second example for reference (C), third example for reference (D) and fourth example for reference (E) of the prior art examples and it is found that a very remarkable contrast improving effect may be obtained according to the present embodiments of the present invention. Note that this effect is not limited only to the liquid crystal display panel of the first embodiment and second embodiment. It is obtained similarly in any liquid crystal display panel in the STN mode, SBE mode and OMI mode.

Next, a specific structural example of a third embodiment of the liquid crystal display panel of the present invention will be explained in detail with reference to FIG. 21. Note that because the basic structure is similar to the structure shown in FIG. 1, the same reference numerals are denoted to corresponding parts to make it easy to understand it.

The third embodiment has a structure wherein the polarizers, RCFs and liquid crystal cell are arranged to be symmetrical in the vertical direction. Asymmetrically arranged structures are of course possible. As illustrated, the absorption axis of the upper polarizer 9 is tilted by 3.0° counterclockwise with respect to the reference vertical line. The direction of the optical axis (uniaxial orientation) of the upper polymer film 11 is tilted by 125.6° counterclockwise with respect to the reference vertical line. The retardation of this birefringent polymer film 11 is set at, for example, 38.6 nm. The rubbing direction of the orientation film 6 formed on the upper glass substrate 1 is tilted by 52.5° counterclockwise with respect to the reference vertical line. The rubbing direction of the orientation film 8 formed on the lower glass substrate 2 is tilted by 307.5° counterclockwise with respect to the reference vertical line.

Therefore, the twist angle of the nematic liquid crystal held between the orientation films 6 and 8 is set at 255°. The retardation of the nematic liquid crystal is set at 0.75 μm. Specifically, the anisotropy of refractive index Δn of the liquid crystal is 0.182 and the cell gap d is 4.1 μm. The liquid crystal used is RDP-40736 from RODIC Corp. The combination of the anisotropy of refractive index and the cell gap is not confined only to that shown here. A combination of a cell gap smaller than 4.1 μm and an anisotropy of refractive index greater than 0.182 is also possible so long as the retardation which is a product of them is the same. A combination of a cell gap greater than 4.1 μm and an anisotropy of refractive index smaller than 0.182 is also possible. Next, the uniaxial orientation of the lower polymer film 12 is tilted by 59° counterclockwise with respect to the reference vertical line. Finally, the absorption axis of the lower polarizer 10 is tilted by 87° counterclockwise with respect to the reference vertical line. This configuration allows display in a normally white mode. Specifically, the display will be substantially in white in an unselected state wherein an off-voltage is applied and substantially in black in a selected state wherein an on-voltage is applied.

Figure 22:
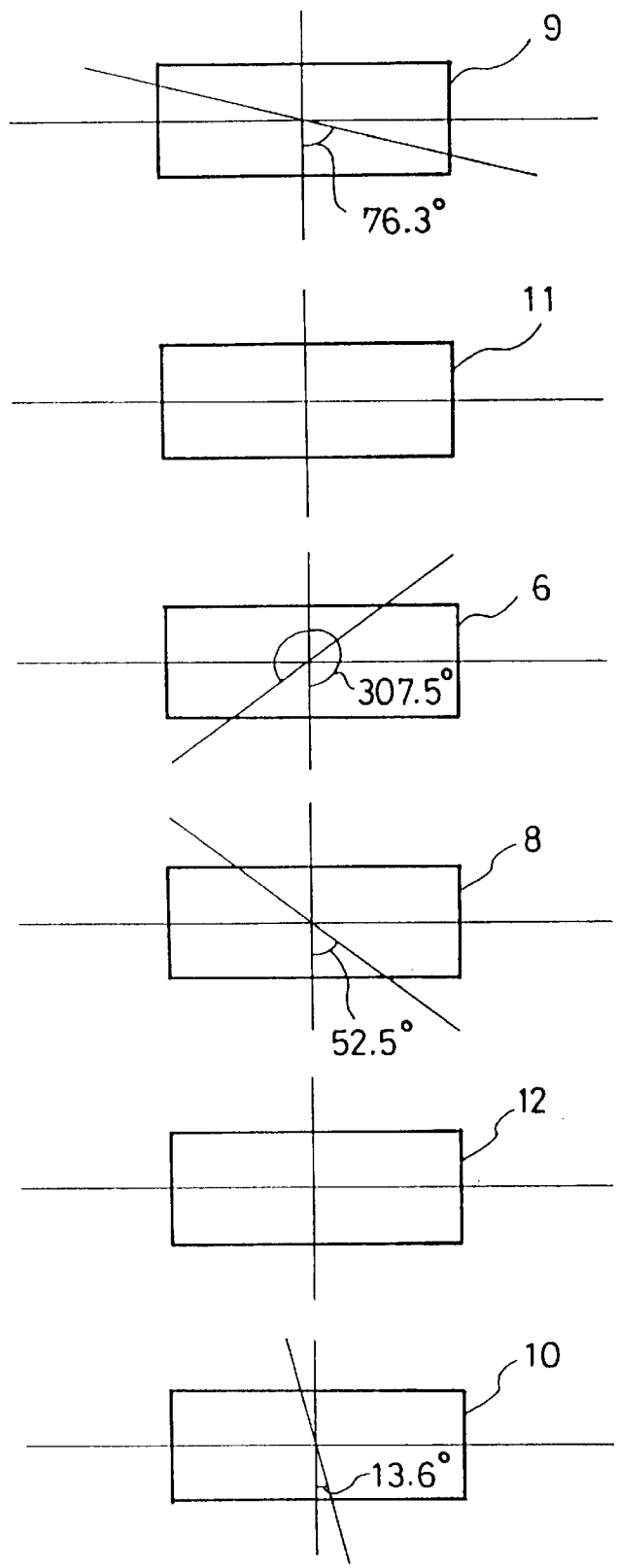
FIG. 22 is a typical view showing fourth and fifth embodiments of the display panel according to the present invention.

A specific structural example of a fourth embodiment of the liquid crystal display panel of the present invention will be explained in detail with reference to FIG. 22.

The fourth embodiment has a structure wherein the polarizers, RCFs and liquid crystal cell are arranged to be symmetrical in the vertical direction. Asymmetrically arranged structures are of course possible. As illustrated, the absorption axis of the upper polarizer 9 is tilted by 76.3° counterclockwise with respect to the reference vertical line. Next, the upper polymer film 11 is disposed. The retardation of this birefringent polymer film 11 is set at 150 nm. Because the refractive index within the plane is equal and its optical axis is oriented in the thickness direction, the disposing angle is set arbitrary. The rubbing direction of the orientation film 6 formed on the upper glass substrate 1 is tilted by 307.5° counterclockwise with respect to the reference vertical line. The rubbing direction of the orientation film 8 formed on the lower glass substrate 2 is tilted by 52.5° counterclockwise with respect to the reference vertical line.

Therefore, the twist angle of the nematic liquid crystal held between the orientation films 6 and 8 is set at 255° The retardation of the nematic liquid crystal is set at 0.728 μm. Specifically, the anisotropy of refractive index Δn of the liquid crystal is 0.189 and the cell gap d is 4.0 μm. The liquid crystal used is RDP-40736 from RODIC Corp. The combination of the anisotropy of refractive index and the cell gap is not confined only to that shown here. A combination of a cell gap smaller than 4.0 μm and an anisotropy of refractive index greater than 0.189 is also possible so long as the retardation which is a product of them is the same. Or a combination of a cell gap greater than 4.0 μm and an anisotropy of refractive index smaller than 0.189 is also possible. Next, the lower polymer film 12 is disposed. The retardation of the birefringent polymer film 12 is set at 150 nm. Because the refractive index within the plane is equal and its optical axis is oriented in the thickness direction, the disposing angle is set arbitrary. Finally, the absorption axis of the lower polarizer 10 is tilted by 13.6° counterclockwise with respect to the reference vertical line. This configuration allows display in a normally white mode. Specifically, the display will be substantially in white in an unselected state wherein an off-voltage is applied and substantially in black in a selected state wherein an on-voltage is applied.

A specific structural example of a fifth embodiment of the liquid crystal display panel of the present invention will be explained in detail with reference to the same FIG. 22.

The fifth embodiment has a structure wherein the polarizers, RCFs and liquid crystal cell are arranged to be symmetrical in the vertical direction. The absorption axis of the upper polarizer 9, rubbing direction of the orientation film 6 formed on the upper glass substrate 1, rubbing direction of the orientation film 8, twist angle of the nematic liquid crystal held between the orientation films 6 and 8, retardation of the nematic liquid crystal cell and absorption axis of the lower polarizer 10 are the same with those in the fourth embodiment. The retardation of the upper birefringent polymer film 11 is set at 220 nm. Because the refractive index within the plane is equal and its optical axis is oriented in the thickness direction, the disposing angle is set arbitrarily. The retardation of the lower birefringent polymer film 12 is set at 220 nm. Because the refractive index within the plane is equal and its optical axis is oriented in the thickness direction, the disposing angle is set arbitrarily. This configuration allows display in a normally white mode. Specifically, the display will be substantially in white in an unselected state wherein an off-voltage is applied and substantially in black in a selected state wherein an on-voltage is applied.

Figure 23:
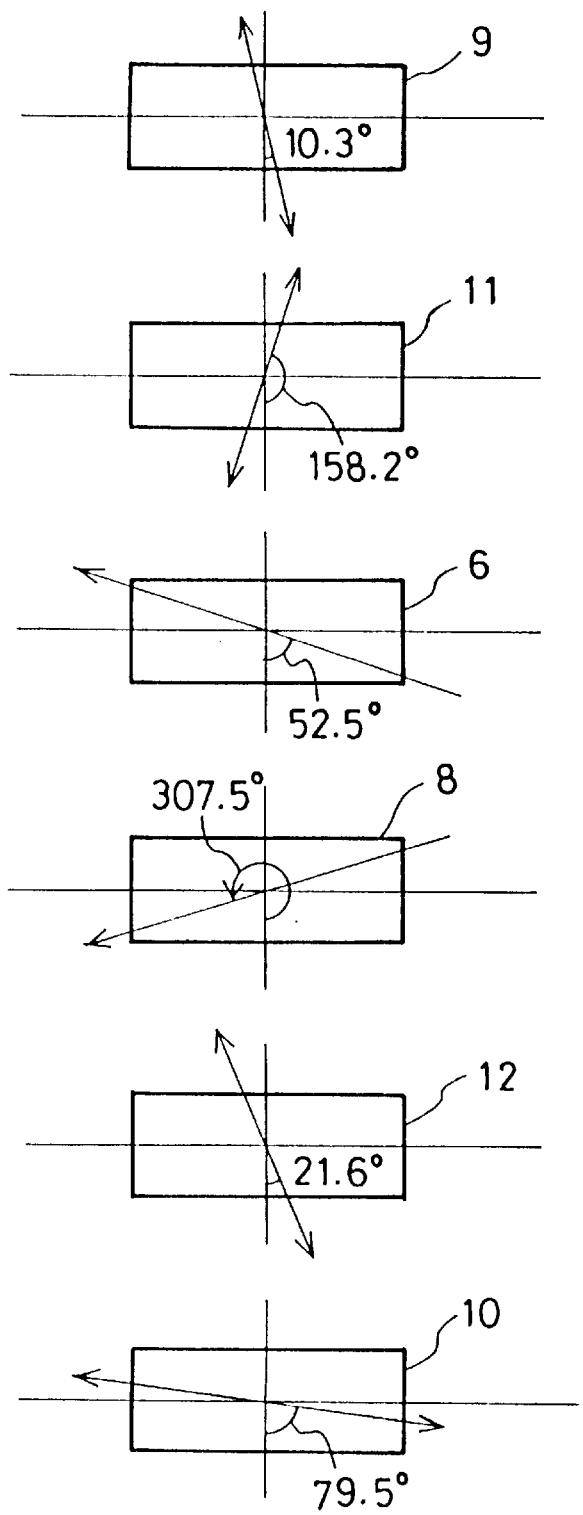
FIG. 23 is a typical view showing a fifth example for reference of the display panel.

Next, a fifth example for reference of the STN mode will be explained for the purpose of comparison with reference to FIG. 23. The fifth example for reference of the STN mode has a structure wherein the polarizers, RCFs and liquid crystal cell are arranged to be symmetrical in the vertical direction. The absorption axis of the upper polarizer 9 is tilted by 10.3° with respect to a reference line. The direction of the optical axis of a uniaxially oriented upper polymer film 11 is tilted by 158.2° with respect to the reference line. The retardation of this birefringent polymer film 11 is set at 369 nm. The rubbing direction of an upper orientation film 6 is tilted by 52.5° with respect to the reference line. The rubbing direction of a lower orientation film 8 is tilted by 307.5° with respect to the reference line. The retardation of the nematic liquid crystal held between the orientation films 6 and 8 is set at 0.800 $\mu$m. The direction of the optical axis of a lower uniaxially oriented polymer film 12 is tilted by 21.6° with respect to the reference line. The retardation of this birefringent polymer film 12 is set at 369 nm. Finally, the absorption axis of a lower polarizer 10 is tilted by 79.5° with respect to the reference line.

A seventh example for reference of the STN mode will be explained with reference to FIG. 25. The absorption axis of an upper polarizer 9 is tilted by 79.5° with respect to a reference line. The direction of the optical axis of a uniaxially oriented upper polymer film 11 is tilted by 21.7° with respect to the reference line. The retardation of this birefringent polymer film 11 is set at 369 nm. The rubbing direction of an upper orientation film 6 is tilted by 307.5° with respect to the reference line. The rubbing direction of a lower orientation film 8 is tilted by 52.5° with respect to the reference line. The retardation of the nematic liquid crystal held between the orientation films 6 and 8 is set at 0.800 $\mu$m. The direction of the optical axis of a lower uniaxially oriented polymer film 12 is tilted by 158.3° with respect to the reference line. The retardation of this birefringent polymer film 12 is set at 369 nm. Finally, the absorption axis of a lower polarizer 10 is tilted by 10.3° with respect to the reference line. Thus, in this fifth and seventh examples for reference, the components are arranged to be symmetrical in the vertical direction and the twist angle of nematic liquid crystal is set at 255° as in the embodiment to facilitate comparison.

Figure 24:
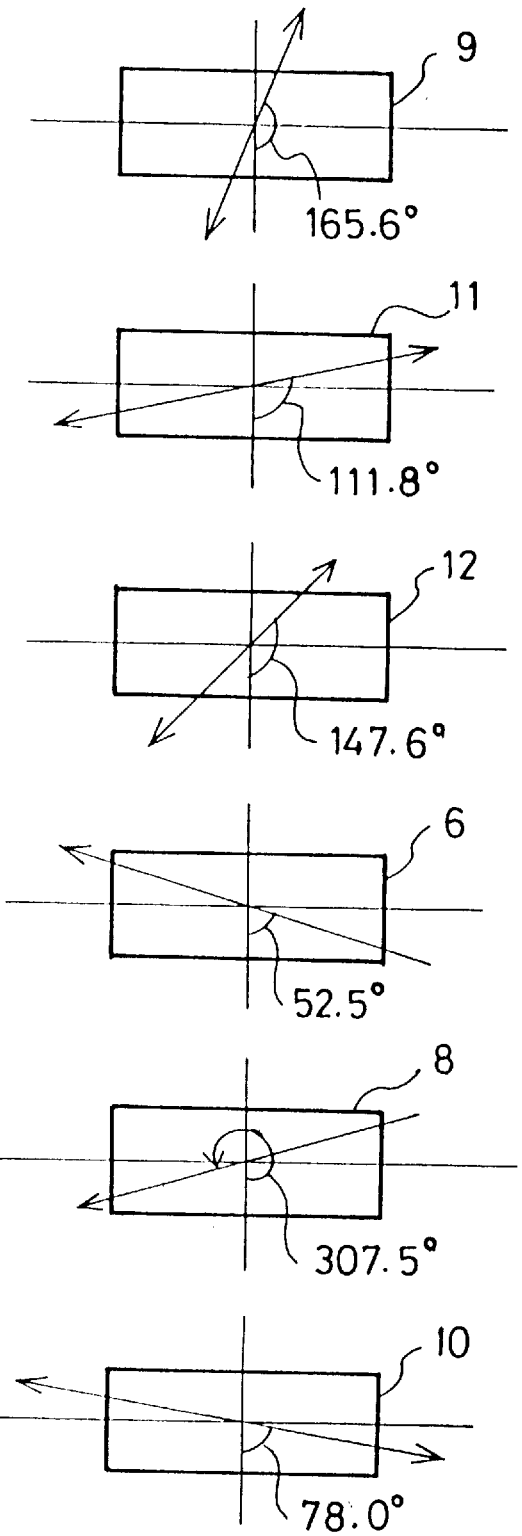
FIG. 24 is a typical view showing a sixth example for reference of the display panel.

FIG. 24 shows a sixth example for reference which is an asymmetrically arranged STN mode. The absorption axis of an upper polarizer 9 is tilted by 165.6° with respect to the reference line. The direction in which a first polymer film 11 is drawn is tilted by 111.8° with respect to the reference line, the retardation thereof being set at 390 nm. The direction in which a second polymer film 12 is drawn is tilted by 147.6° with respect to the reference line, the retardation thereof being also set at 390 nm. Thus, this example for reference has an asymmetrical arrangement wherein the two birefringent polymer films 11 and 12 are provided above a liquid crystal cell. The rubbing direction of an upper orientation film 6 is tilted by 52.5° with respect to the reference line. The rubbing direction of a lower orientation film 8 is tilted by 307.5° with respect to the reference line. Therefore, the twist angle of the nematic liquid crystal is set at 255° as in the above-described example. Further, the retardation of this nematic liquid crystal is set at 0.825 $\mu$m. In this example for reference, RDP-40609 from RODIC corp. or ES4288 from CHISSO Corp. is used as the material for the nematic liquid crystal. Finally, the absorption axis of a lower polarizer 10 is tilted by 78.0° with respect to the reference vertical line.

The present invention is characterized in that the retardation of the nematic liquid crystal 4 is set at 0.55 $\mu$m to 0.75 $\mu$m and in that the twist angle thereof is set at 180° to 270°. Further, the retardation of the polymer films 11 and 12 is set 200 nm or less. Or, the refractive index of the polymer film in the thickness direction is smaller than that in the in-plane direction.

Next, differences between the conventional STN and OMI modes and the present invention will now be described by way of comparison with reference to FIG. 26. Referring first to the retardation of the liquid crystal cells, it is 0.55 $\mu$m to 0.75 $\mu$m set for the cell according to the present invention while it is set at 0.80 $\mu$m to 0.85 $\mu$m for the STN mode and at 0.50 $\mu$m to 0.60 $\mu$m for the OMI mode. Thus, the retardation of the liquid crystal cell according to the present invention is just in the middle of those for the ST and OMI modes. The RCFs are used in the present invention and the STN mode but not in the OMI mode.

According to the present invention, while the retardation of the RCFs are set at 200 nm or less or the refractive index of the RCF in the thickness direction is smaller than that in the in-plane direction, the refractive index in the in-plane direction of the RCF is smaller than that in the in-plane direction which is orthogonal thereto and that in the thickness direction and the retardation of RCFs is set at about 400 nm in the STN mode. The display mode of the present invention is normally white while the display mode can be either normally white or normally black for the STN mode. The display mode for the OMI mode is normally white. As to the twist angle, it is set at 180° to 270° according to the present invention while it is set at 180 to 270° and 180° for the STN and OMI modes, respectively. It will be apparent from such differences in those parameters that the present invention provides wider viewing angles, prevents coloration and excludes the problems with the STN mode while including the advantages of the OMI mode. Further, the present invention achieves higher contrast and excludes the problems of the OMI mode while including the advantages of the STN mode.

The viewing angle characteristics of the third preferred embodiment and the fifth and sixth examples for reference have been calculated by way of simulation, the result of calculation being shown in FIGS. 37 to 84.

The program used in this simulated calculation was DIMOS from Autronic Corp., Germany.

Figure 27:
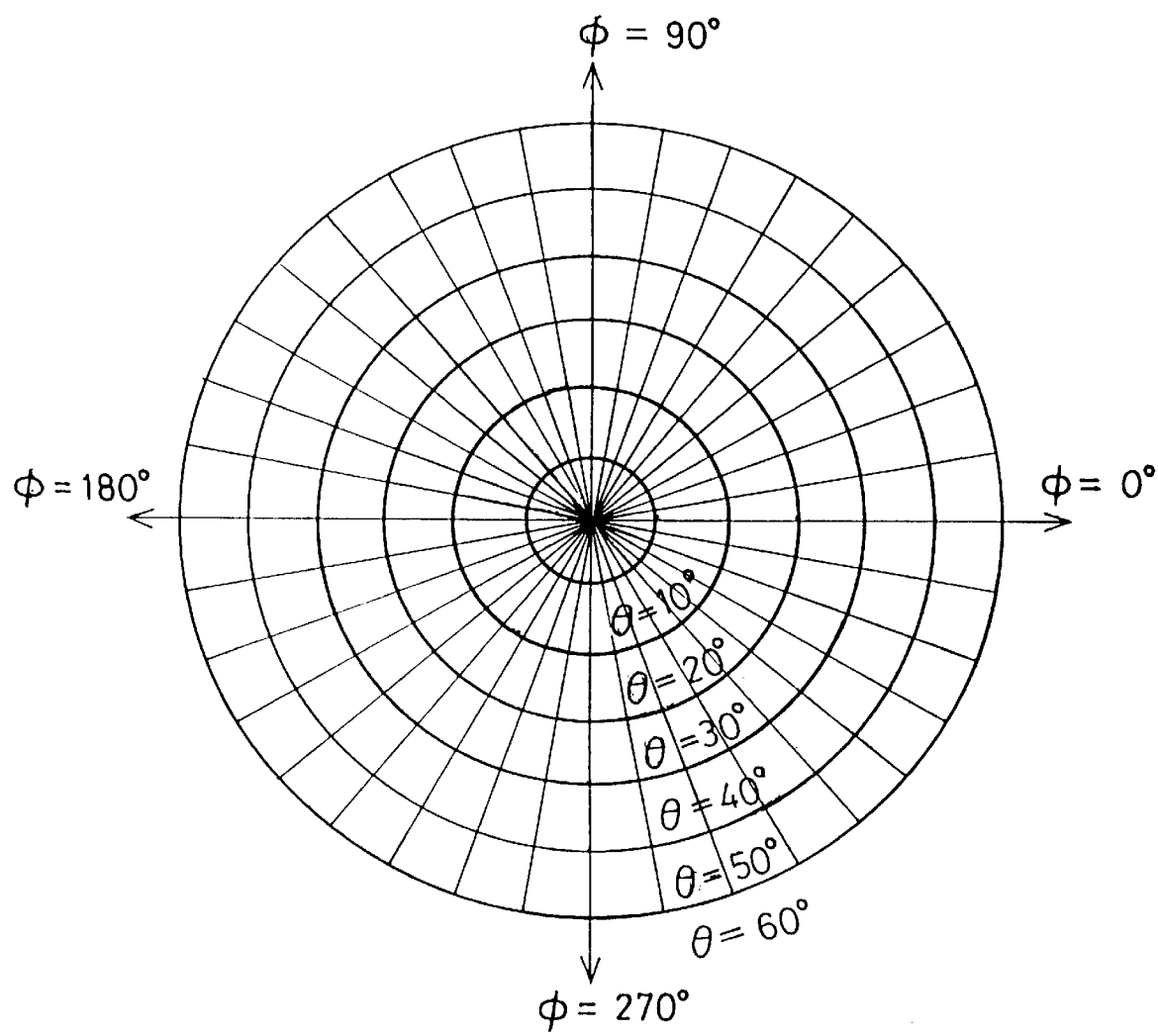
FIG. 27 is a line diagram for explaining a simulated calculation related to a viewing angle characteristic of a liquid crystal display panel.

The method of calculation of the viewing angle characteristics will be described with reference to FIG. 27. The azimuth angle Φ ranging from 0° to 360° is divided into in divisions of 10° each. Further, the tilt angle ranging from 0° to 60° with respect to the normal line of the liquid crystal panels is divided into divisions of 10° each. For 217 points represented by the angles (Φ,θ), chromaticity (X, Y) and lightness (Y) have been calculated using the above-mentioned program.

The calculation was made separately for the unselected state (black level) wherein an off-voltage is applied and the selected state (white level) wherein an on-voltage is applied on each of the third embodiment and the fifth and sixth examples for reference. The viewing angles characteristics of those examples will now be described with reference to FIGS. 37 to 84 showing the result of the calculation.

Figure 21:
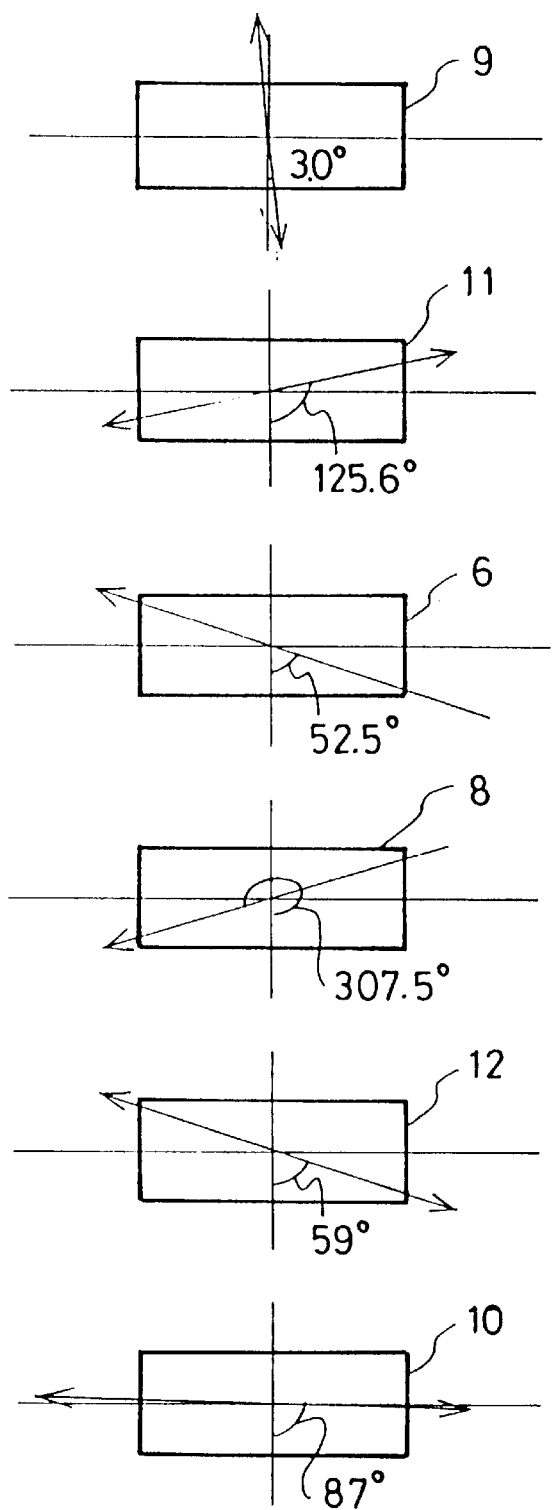
FIG. 21 is a typical view showing a third embodiment of the display panel according to the present invention.

In the third embodiment shown in FIG. 21, the viewing angle characteristic was extremely flat in the unselected state (an off-state wherein an off-voltage is applied, normally white), and substantially uniform white display (there was slight bluish coloration) was provided over the entire range from the azimuth angle Φ=0° to Φ=360°. Further, the display was substantially uniformly white over the range of the tilt angle from θ=0° to θ=60°. The white display had very high transmittance and good contrast. Thus, the liquid crystal display panel according to the present invention is characterized in that it has a wide viewing angle characteristic, substantially no coloration, and high contrast. On the other hand, in the selected state (an on-state wherein an on-voltage is applied) of the third embodiment, a slightly bluish or purplish black level was obtained as shown in FIGS. 45 through 52. As to the dependence on the azimuth angle Φ, blackness is strong in the azimuths of 0° and 180° and is slightly weaker in the azimuths of 90° and 270°. On the other hand, the dependence on the tilt angle θ is satisfactory because no inversion of contrast is observed.

As to the dependence on the viewing angle in the selected state in the fifth example for reference, reddish coloration was observed around the azimuth angle Φ=180° as shown in FIGS. 53 through 60 while whitish color including slightly bluish or brownish coloration was obtained in other azimuths. In the unselected state of this fifth example for reference, the displayed color had coloration in yellow, purple, green and blue depending on the azimuth angle.

In the selected state of the sixth example for reference, transmittance was reduced as the tilt angle θ was increased as shown in FIGS. 69 through 76 and, as a result, a uniform white level could not be obtained. Further, this white level is also bluish when viewed as a whole. In the unselected state of the sixth example for reference, the displayed color was fairly blackish.

The viewing angle characteristics of the fourth and fifth embodiments and the seventh example for reference have been calculated by way of simulation, the result of calculation being shown in FIGS. 28 to 33. The program used in this simulated calculation was DIMOS from Autronic Corp., Germany.

In FIGS. 28 through 33, the transmittance is plotted across an azimuth angle of 360°. The transmittance is represented by percent and concentric circles are drawn from the center toward the outside in the radius direction per 10%. Accordingly, the innermost circle represents 10% of transmittance and the outermost circle represents 50% of transmittance. An inclination of a line of sight with respect to the normal line of the display panel is a tilt angle and the curve represents a transmittance distribution curve at a certain tilt angle. Those graphs are obtained by simulating the transmittance in the black display state or the white display state. Accordingly, if the light is completely shielded, the transmittance becomes 0% and the transmittance distribution curve converges to the center. As the curve extends toward outside, the transmittance becomes higher, showing that light is less shielded in the black display state for example and that the light has leaked.

It was calculated for each sample of the fourth and fifth embodiments and the fifth example for reference separately in the unselected state wherein an off-voltage is applied and in the selected state wherein an on-voltage is applied. The viewing angle characteristic of each sample will be explained below with reference to the tables showing calculated results in FIGS. 28 through 33. In FIGS. 28 through 33, (A) represents the transmittance distribution curve of the fourth embodiment, (B) the transmittance distribution curve of the fifth embodiment and (C) the transmittance distribution curve of the fifth example for reference.

Figure 28A:
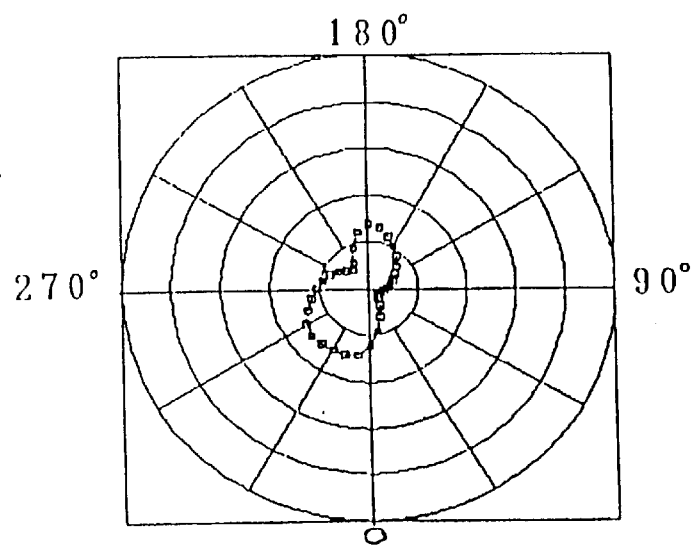
FIGS. 28A through 28C are diagrams for comparing transmittance curves at 60° of tilt angle in displaying black in the fourth and fifth embodiments of the display panel of the present invention and the fifth example for reference of the display panel.
Figure 28B:
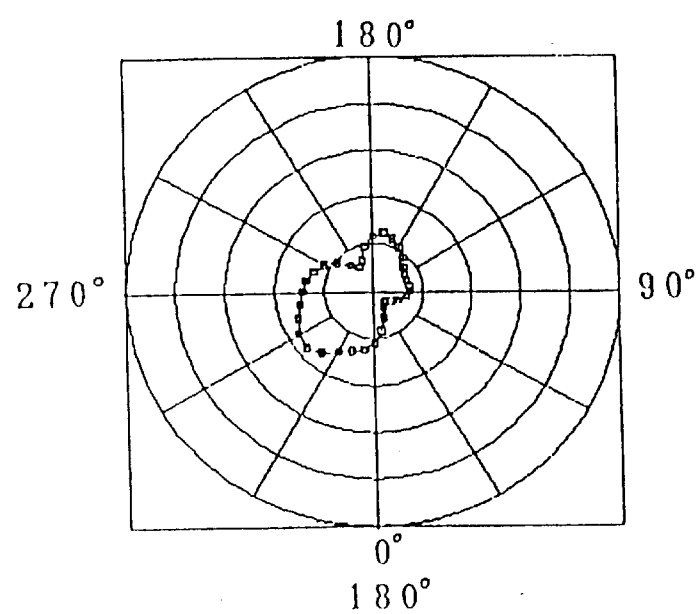
Figure 28C:
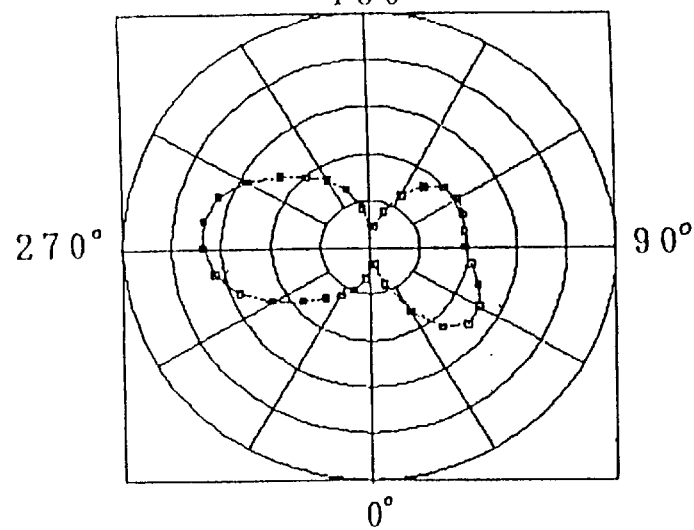

At first, FIG. 28 shows the simulated result of an azimuth dependency of transmittance in the black display state of the fourth and fifth embodiments and the fifth example for reference when the tilt angle is 60°. The curves in the fourth and fifth embodiments are located near the center as compared to the curve in the fifth example for reference and the transmittance thereof is 20% or less across the whole azimuth even if the tilt angle is significantly inclined to 60°. In contrast, the curve in the fifth example for reference largely varies depending on the azimuth angle and an extreme leakage of light of 35% is occurring at an azimuth angle of 270°.

Figure 29A:
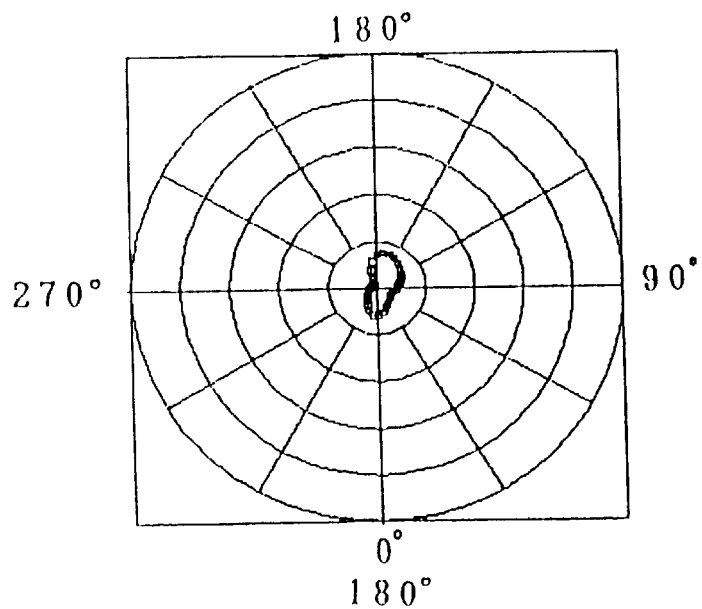
FIGS. 29A through 29C are diagrams for comparing transmittance curves at 40° of tilt angle in displaying black in the fourth and fifth embodiments of the display panel of the present invention and the fifth example for reference of the display panel.
Figure 29B:
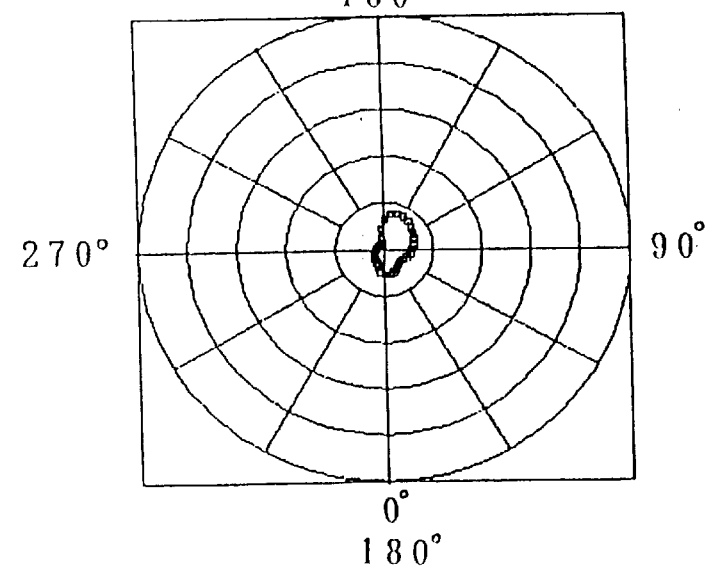
Figure 29C:
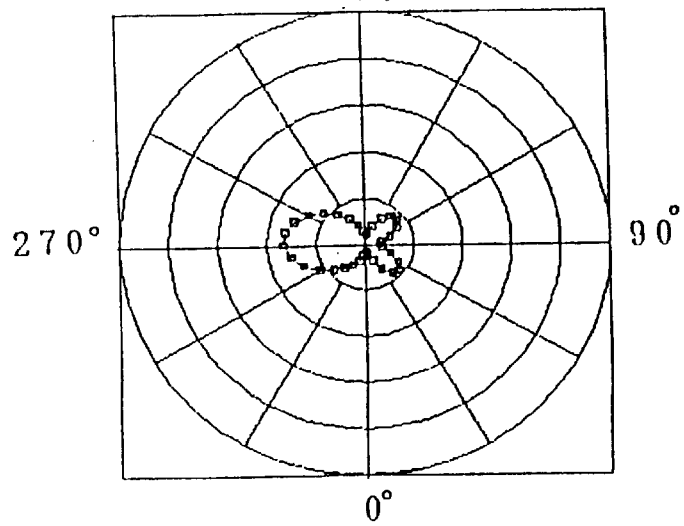

FIG. 29 shows the simulated result of the azimuth dependency of transmittance in the black display state of the fourth and fifth embodiments and the fifth example for reference when the tilt angle is 40°. The curves in the fourth and fifth embodiments are located within 10% across the whole azimuth. In contrast, the fifth example for reference is causing a leakage of light of about 18% at the azimuth angle of 270°.

Figure 30A:
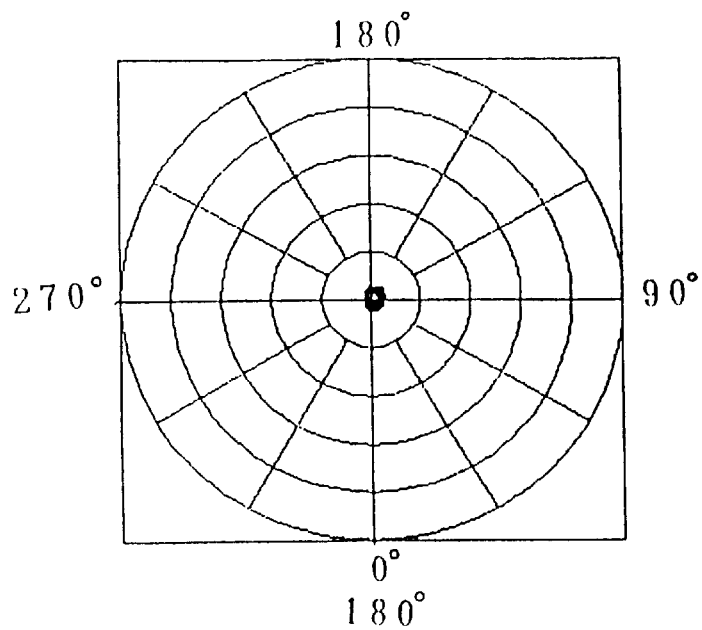
FIGS. 30A through 30C are diagrams for comparing transmittance curves at 20° of tilt angle in displaying black in the fourth and fifth embodiments of the display panel of the present invention and the fifth example for reference of the display panel.
Figure 30C:
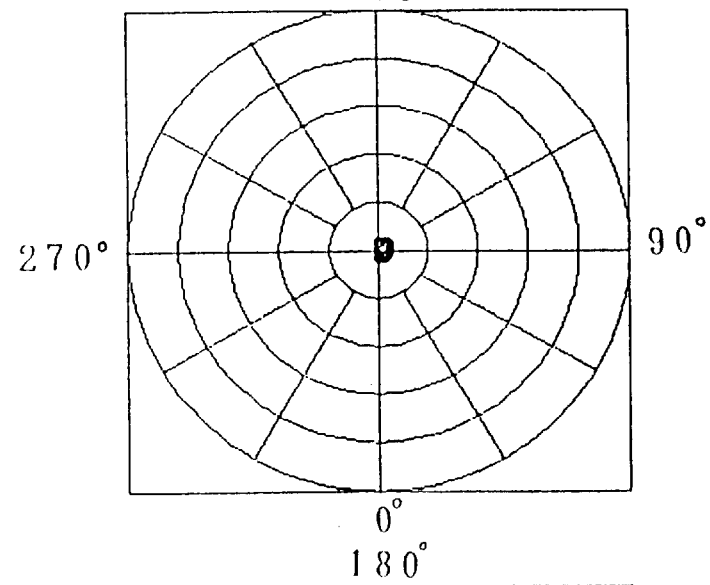
Figure 30B:
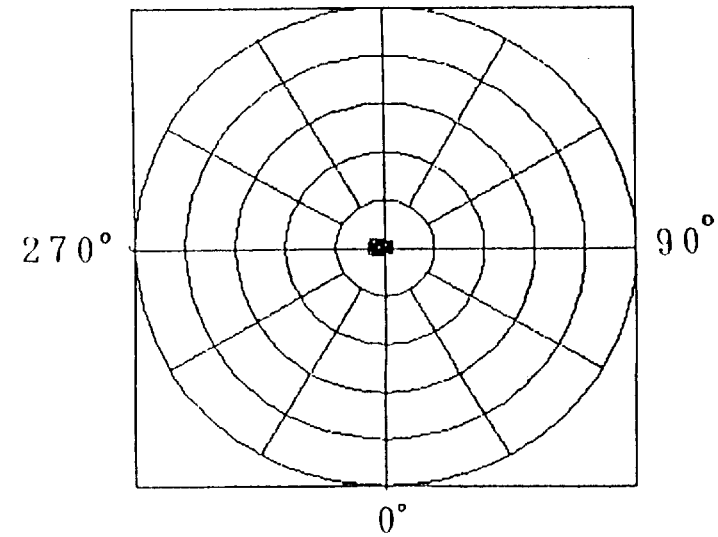

FIG. 30 shows the simulated result of the azimuth dependency of transmittance in the black display state of the fourth and fifth embodiments and the fifth example for reference when the tilt angle is 20°. The curves in the fourth and fifth embodiments and the fifth example for reference are converging near the center, shielding the light well and providing a good black display state.

When they are compared with respect to the whole black display state, there is no big difference among the fourth and fifth embodiment of the present invention and the fifth example for reference and a good black display state is provided by any of them in the region where the tilt angle is as small as 20°. In the region where the tilt angle is as large as 60°, while the fifth example for reference has azimuth angles in which the leakage of light occurs and is unable to provide a good black display state, the fourth and fifth embodiments of the present invention have less azimuth angle dependency and causes less leakage of light.

Figure 31A:
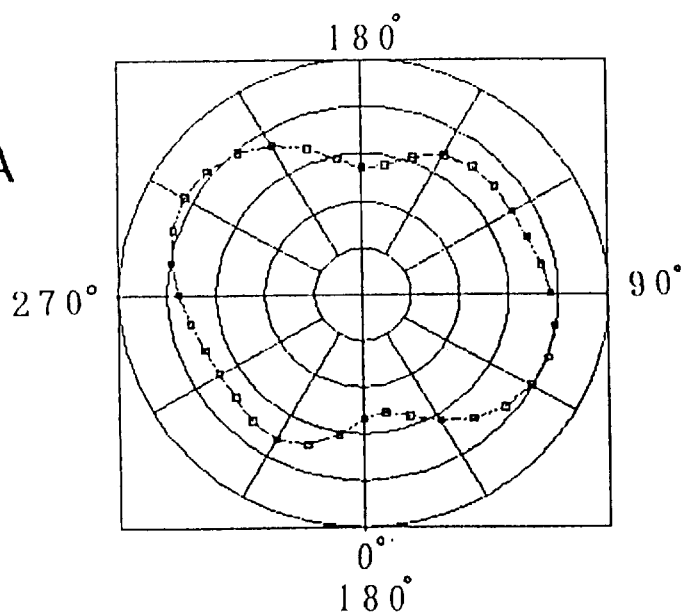
FIGS. 31A through 31C are diagrams for comparing transmittance curves at 60° of tilt angle in displaying white in the fourth and fifth embodiments of the display panel of the present invention and the fifth example for reference of the display panel.
Figure 31B:
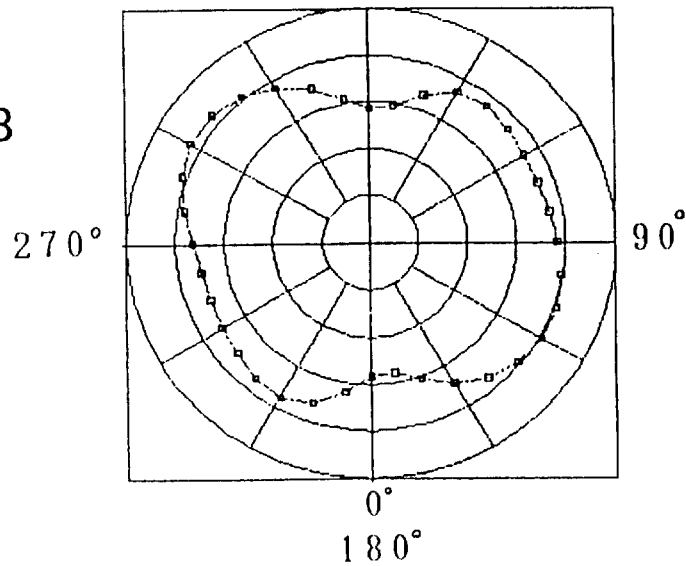
Figure 31C:
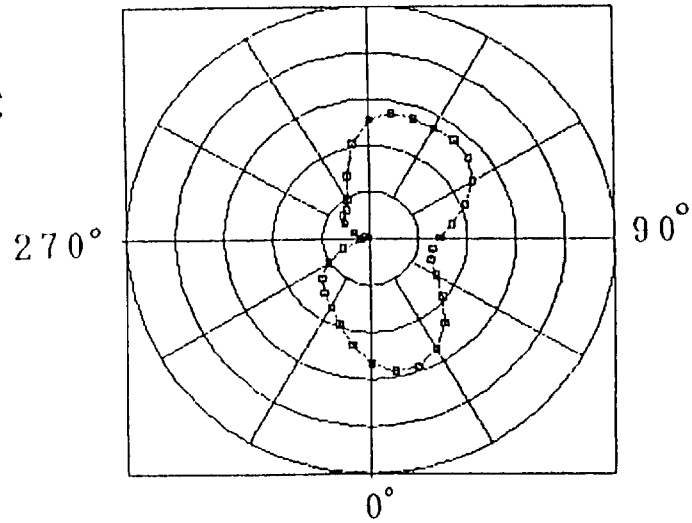

FIG. 31 shows the simulated result of an azimuth angle dependency of transmittance in the white display state of the fourth and fifth embodiments and the fifth example for reference when the tilt angle is 60°. The curves in the fourth and fifth embodiments exceed 25% even when the transmittance is least. Thus, they depend less on the azimuth angle and provide at least a good white display state. In contrast, the curve in the fifth example for reference does not reach 30% even when the transmittance is largest and the transmittance is extremely small in the azimuth angle of 270°.

Figure 32A:
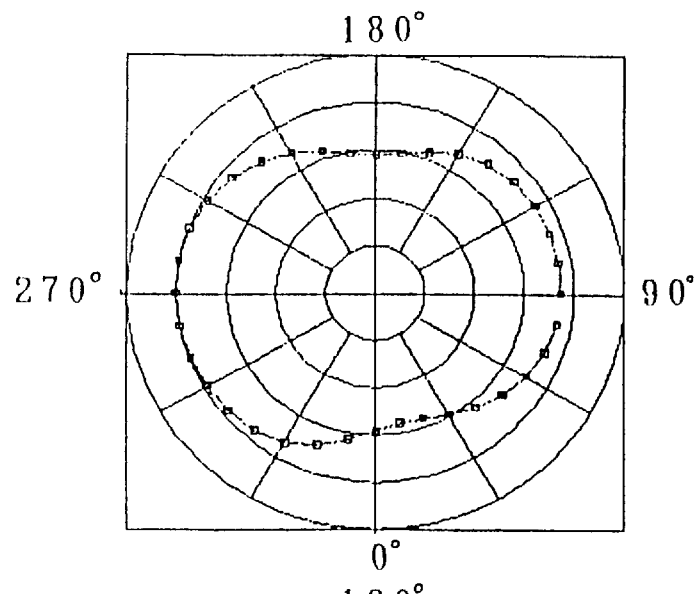
FIGS. 32A through 32C are diagrams for comparing transmittance curves at 40° of tilt angle in displaying white in the fourth and fifth embodiments of the display panel of the present invention and the fifth example for reference of the display panel.
Figure 32B:
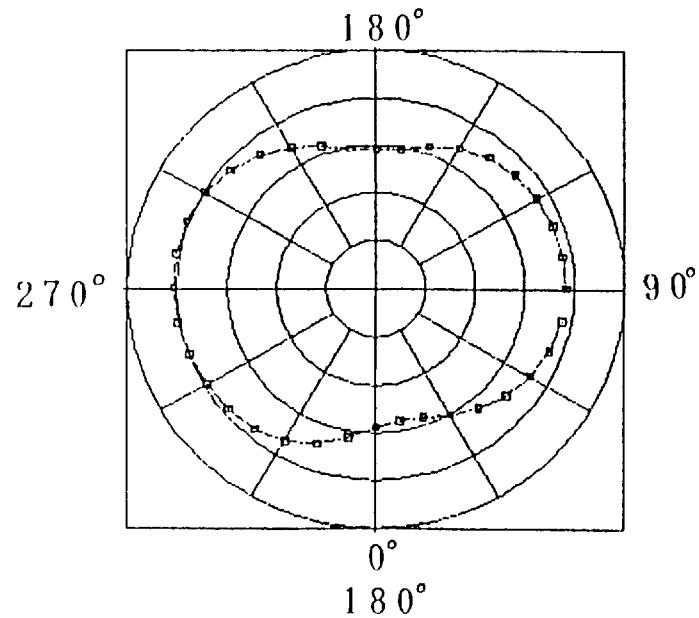
Figure 32C:
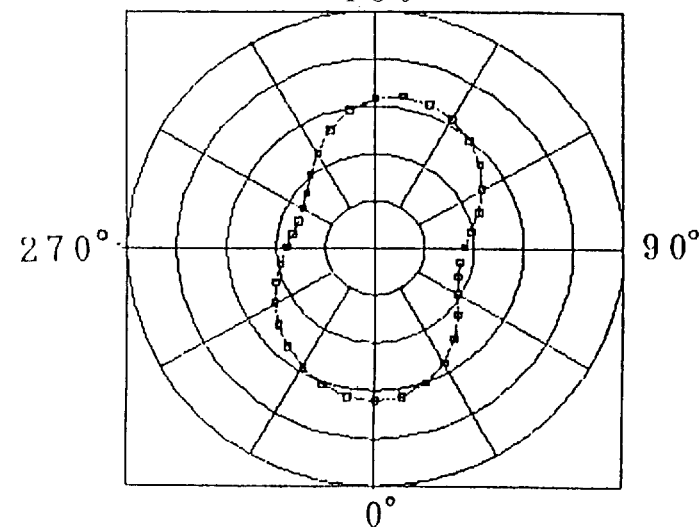

FIG. 32 shows the simulated result of the azimuth dependency of transmittance in the white display state of the fourth and fifth embodiments and the fifth example for reference when the tilt angle is 40°. The curves in the fourth and fifth embodiments are good similarly to the transinittance distribution curve when the tilt angle is 60° shown in FIG. 31. Although the curve of the fifth example for reference has no azimuth angle in which the transmittance is extremely small, it is leaned toward the center as compared to the curves in the fourth and fifth embodiments and the transmittance is small as a whole.

Figure 33A:
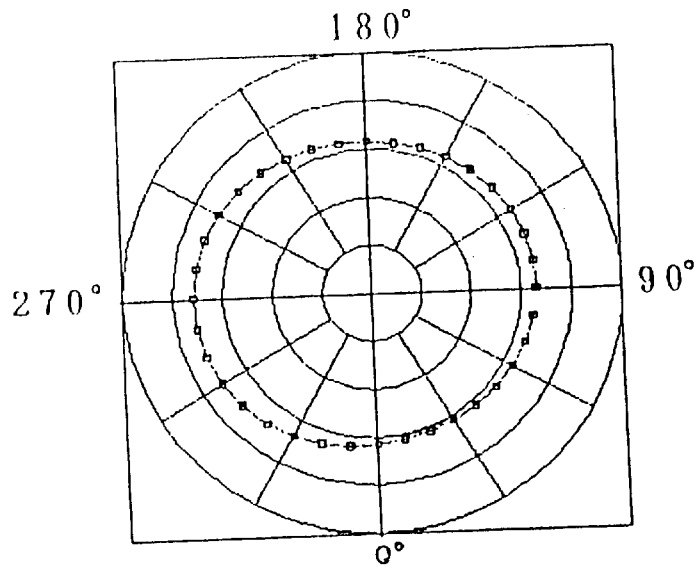
FIGS. 33A through 33C are diagrams for comparing transmittance curves at 20° of tilt angle in displaying white in the fourth and fifth embodiments of the display panel of the present invention and the fifth example for reference of the display panel.
Figure 33B:
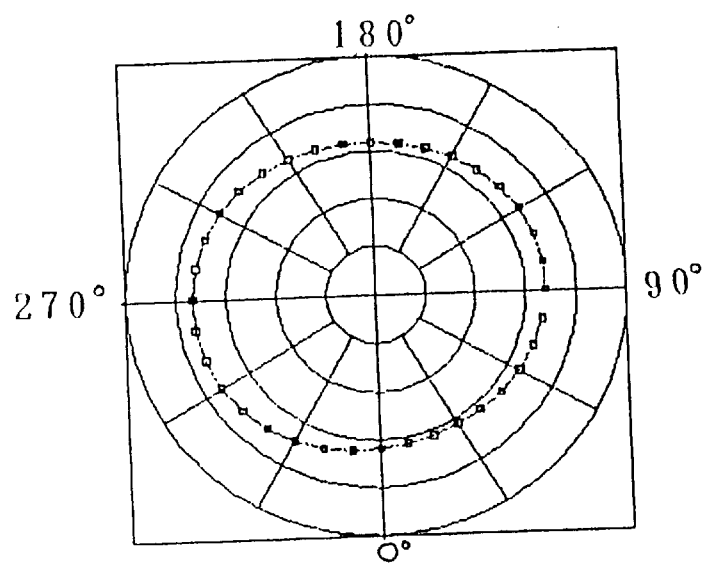
Figure 33C:
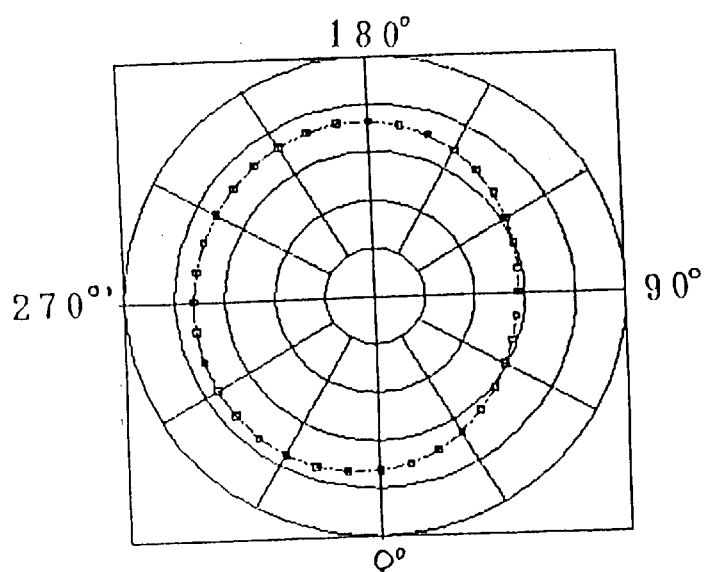

FIG. 33 shows the simulated result of the azimuth dependency of transmittance in the white display state of the fourth and fifth embodiments and the fifth example for reference when the tilt angle is 20°. The curves in the fourth and fifth embodiments as well as the fifth example for reference are drawing a large circle, providing good transmittance and white display state.

When they are compared with respect to the whole black display state, the fourth and fifth embodiment of the present invention has less dependency both on the tilt angle and azimuth angle and provide extremely uniform and good white display state across the whole viewing angle range. Although the fifth example for reference provides the white display state wherein it has less dependency on the azimuth angle in the region where the tilt angle is as small as 20°, it has a large dependency on the azimuth angle and provides a white display state having less transmittance in the region where the tilt angle is as large as 60°.

Finally, a driving method suitable for the liquid crystal display panel according to the present invention will be described.

In general, in a simple matrix type liquid crystal display panel, liquid crystal is held between a group of line electrodes and a group of row electrodes to provide pixels in the form of a matrix. Conventional liquid crystal display panels have been driven using a voltage-averaging method. The liquid crystal display panel according to the present invention exhibits significant characteristics such as a wide viewing angle even when driven using the voltage-averaging method. However, according to this method, the line electrodes are sequentially selected one by one and data signals corresponding to ON/OFF are supplied to all the row electrodes at timing of the selection. As a result, the voltage applied to each pixel is increased once (for a period corresponding to 1/N) during the period of one frame in which the entire line electrodes (N electrodes) are selected and is at a constant bias voltage during the remaining period (corresponding to (N−1/N). When the response speed of the liquid crystal is low, there will be changes in luminance depending on the effective value of the applied voltage waveform during the period of one frame.

However, if the frame frequency is decreased by increasing the number of divisions, the difference between the one frame period and the response time of the liquid crystal becomes small. As a result, the liquid crystal responds to each of pulses applied, resulting in flickering of luminance referred to as a frame response phenomenon which reduces contrast. Taking this point into consideration, according to the present invention, the liquid crystal display panel is driven using "a method of simultaneously selecting plural lines" as a measure to solve the problem of the frame response phenomenon. According to this method of simultaneously selecting plural lines, a plurality of line electrodes are simultaneously selected rather than selecting one line at a time as in the prior art, thereby increasing the apparent frequency to suppress the above-described frame response phenomenon. Since a plurality of line electrodes are simultaneously selected rather than selecting one line at a time, a step must be taken to obtain the display of an arbitrary image. Original pixel data must be supplied to the line electrodes after being subjected to an arithmetic process. Specifically, a plurality of line signals represented by pairs of orthogonal functions are pair-sequentially applied to the group of line electrodes during the selection period.

On the other hand, the pairs of orthogonal functions and the pairs of selected pixel data are sequentially calculated to obtain the sums of the products thereof, and row signals having voltage levels in accordance with the result of the calculation are applied to the group of row electrodes during the selection period in synchronism with said pair-sequential scan. By driving the liquid crystal display panel according to the present invention using such a method of simultaneously selecting plural lines, it is possible to cover response delays of the twisted nematic liquid crystal and to allow, for example, the display of animation.

The above-described method of simultaneous selecting plural lines will now be specifically described with reference to FIGS. 34 through 36.

Figure 34:
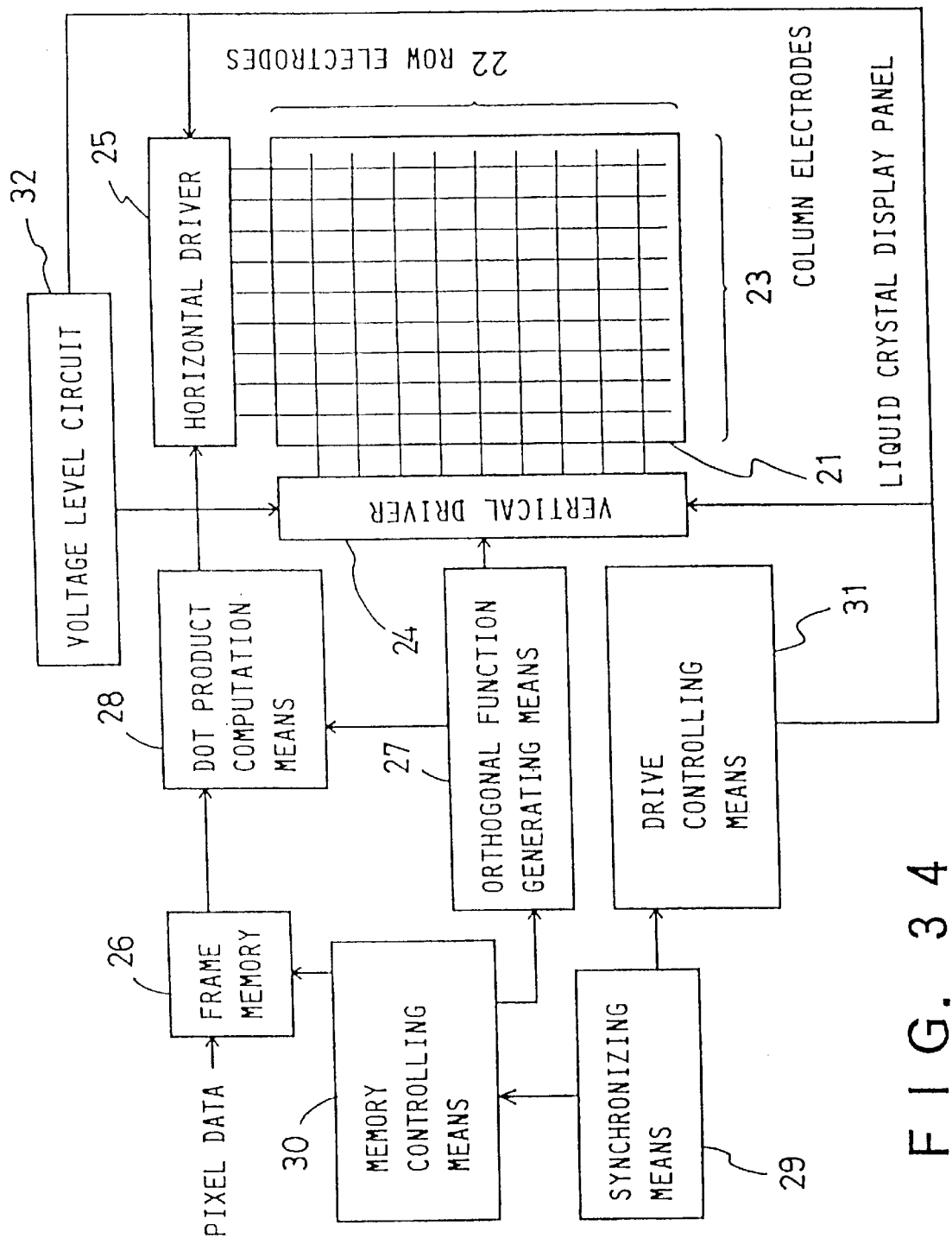
FIG. 34 is a block diagram showing an example of a driving circuit connected to a liquid crystal display panel according to the present invention.

The driving circuit shown in FIG. 34 is connected to a liquid crystal display panel 21. This liquid crystal display panel 21 has been specifically illustrated here with reference to FIG. 1 and FIG. 2 and has a flat panel structure wherein liquid crystal is interposed between a group of line electrodes 22 and a group of row electrodes 23. This driving circuit is equipped with a vertical driver 24 which is connected to the group of line electrodes 22 to drive them. Further, it is equipped with a horizontal driver 25 which is connected to the group of row electrodes 23 to drive them. This driving circuit is further equipped with a frame memory 26, an orthogonal function generation means 27 and a sum-of-products calculation means 28. The frame memory 26 keeps input pixel data on a frame basis.

The pixel data are data indicating the density of pixels defined at intersections of the group of line electrodes 22 and the group of row electrodes 23. The orthogonal function generation means 27 generates a plurality of orthogonal functions which are in a orthogonal relationship to each other and sequentially supplies them to the vertical driver 24 in appropriate combination patterns. The vertical driver 24 applies a plurality of line signals represented by pairs of orthogonal functions to the group of line electrodes 22 on a pair sequential scan basis during each period of selection.

On the other hand, the sum-of-products calculation means 28 sequentially makes sum-of-products calculations on the pairs of orthogonal functions and the pairs of pixel data and applies row signals having a voltage level corresponding to the result of calculations to the group of row electrodes 23 during each selection period in synchronism with said pair-sequential scan. Specifically, the sum-of-products calculation means 28 reads the pairs of pixel data stored in the frame memory 26 to execute the above-described sum-of-products calculations, thereby generating row signals. The horizontal driver 25 applies the row signals to the group of row electrodes 23. The voltage levels required to form the row signals are supplied by a voltage level circuit 32 in advance.

This voltage level circuit 32 supplies predetermine ed voltage levels also to the vertical driver 24. The vertical driver 24 appropriately selects voltage levels in accordance with the orthogonal functions and supplies them to the group of row electrodes 22 as row signals. This driving circuit is further equipped with a memory control means 30 which controls the writing of the pixel data into the frame memory 26. In addition, a synchronization circuit 29 and a drive control means 31 are included. The synchronization circuit 29 establishes synchronization between the timing at which the pixel data are read out from the frame memory 26 and the timing at which the signals from the orthogonal function generation circuit 27 are transferred. Desired display of an image can be obtained by repeating the pair-sequential scan plural times in one frame. This synchronization circuit 29 also controls the timing of a memory control circuit 30. Under the control of the synchronization circuit 29, the drive control means 31 supplies predetermined clock signals to the vertical driver 24 and the horizontal driver 25.

Next, the operation of the driving circuit shown in FIG. 34 will now be described in detail with reference to an example wherein seven line electrodes are simultaneously selected in accordance with the method of selecting plural lines.

Figure 35:
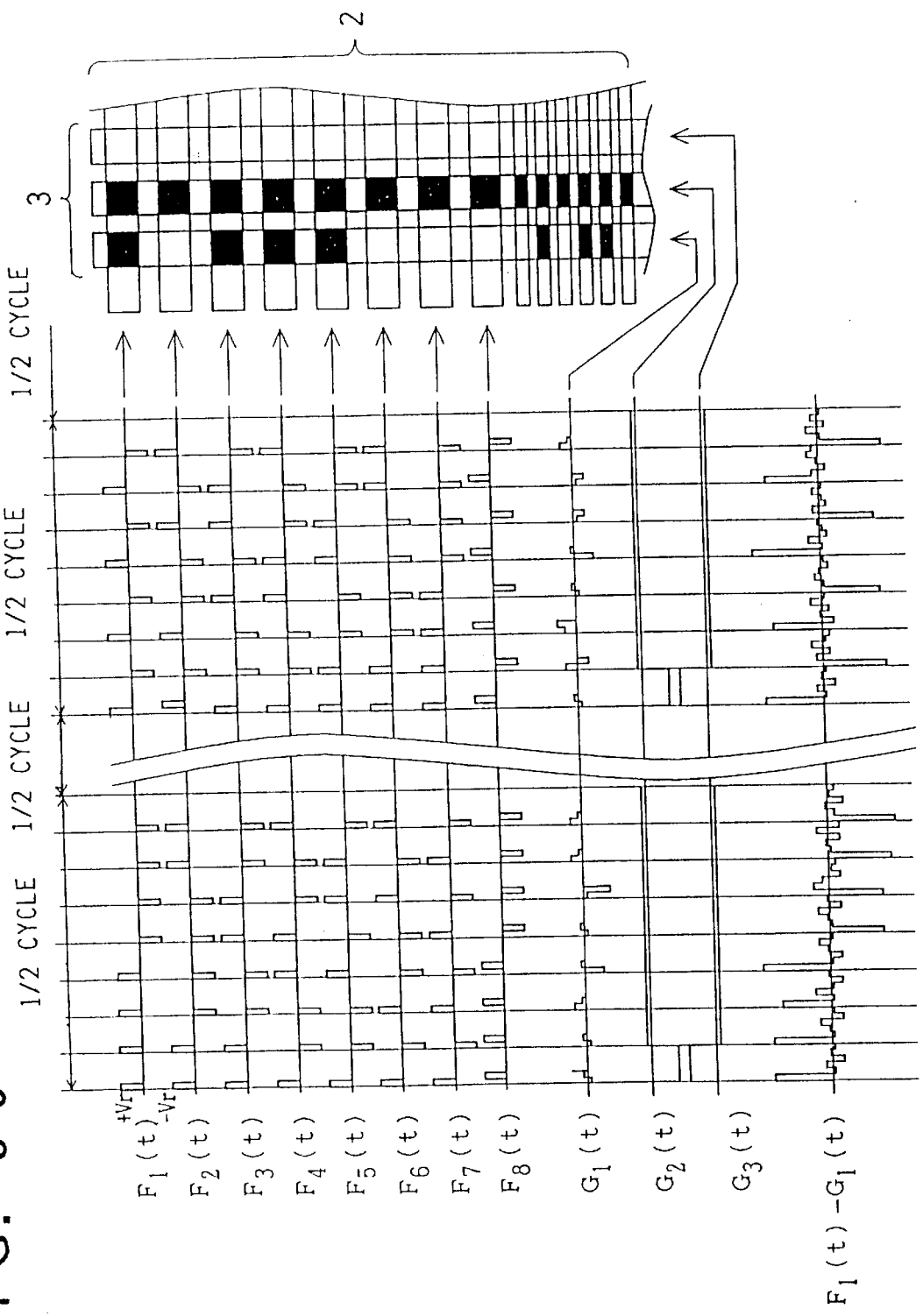
FIG. 35 is a timing chart for explaining the operation of the driving circuit shown in FIG. 34.

FIG. 35 is a waveform chart showing the simultaneous driving of seven lines. $F_1(t)$ to $F_7(t)$ designate line signals applied to the line elect rode s associated therewith, and $G_1(t)$ to $G_7(t)$ designate row signals applied to the respective row electrodes. The line signal F is set based on a Walsh function which is a complete normal orthogonal function at (0, 1). The voltage level is $-Vr$ for 0, $+Vr$ for 1 and Vo for an unselected period. The voltage level Vo for an unselected period is set at 0 V. The pair-sequential scan is performed from top to bottom by selecting seven each lines as one pair. The first-half cycle corresponding to one period of the Walsh function is completed by eight times of scan.

During the next one period, the second-half cycle is carried out with the polarity reversed to eliminate DC components. Further, in the next one period, the line signals are formed by shifting the combination pattern of the orthogonal functions in the longitudinal direction and are applied to the group of line electrodes 22. However, the longitudinal shifting is not necessarily required. On the other hand, the row signal applied to each row electrode is obtained by carrying out a predetermined sum-of-products calculation, with each piece of pixel data represented by $I_{ij}$ (i represents e line number of the matrix and j represents a row number). Assume that when a pixel is on, $I_{ij}=-1$ and, when it is off, $I_{ij}=+1$. Then a row signal $G_j(t)$ applied to each row electrode is basically set by performing a sum-of-products calculation as shown below.
[Equation 1]
Since a line signal is at the 0 level during the unselected period, the addition in the above equation results only in the sum of selected lines. Therefore, in the case of simultaneous selection of seven lines, row signals can take eight levels of electrical potential. In other words, the number of the levels of electrical potential required for row signals is (the number of lines simultaneously selected +1). As described above, these levels of electrical potential are supplied by the voltage level circuit 32 shown in FIG. 34.

Figure 36:
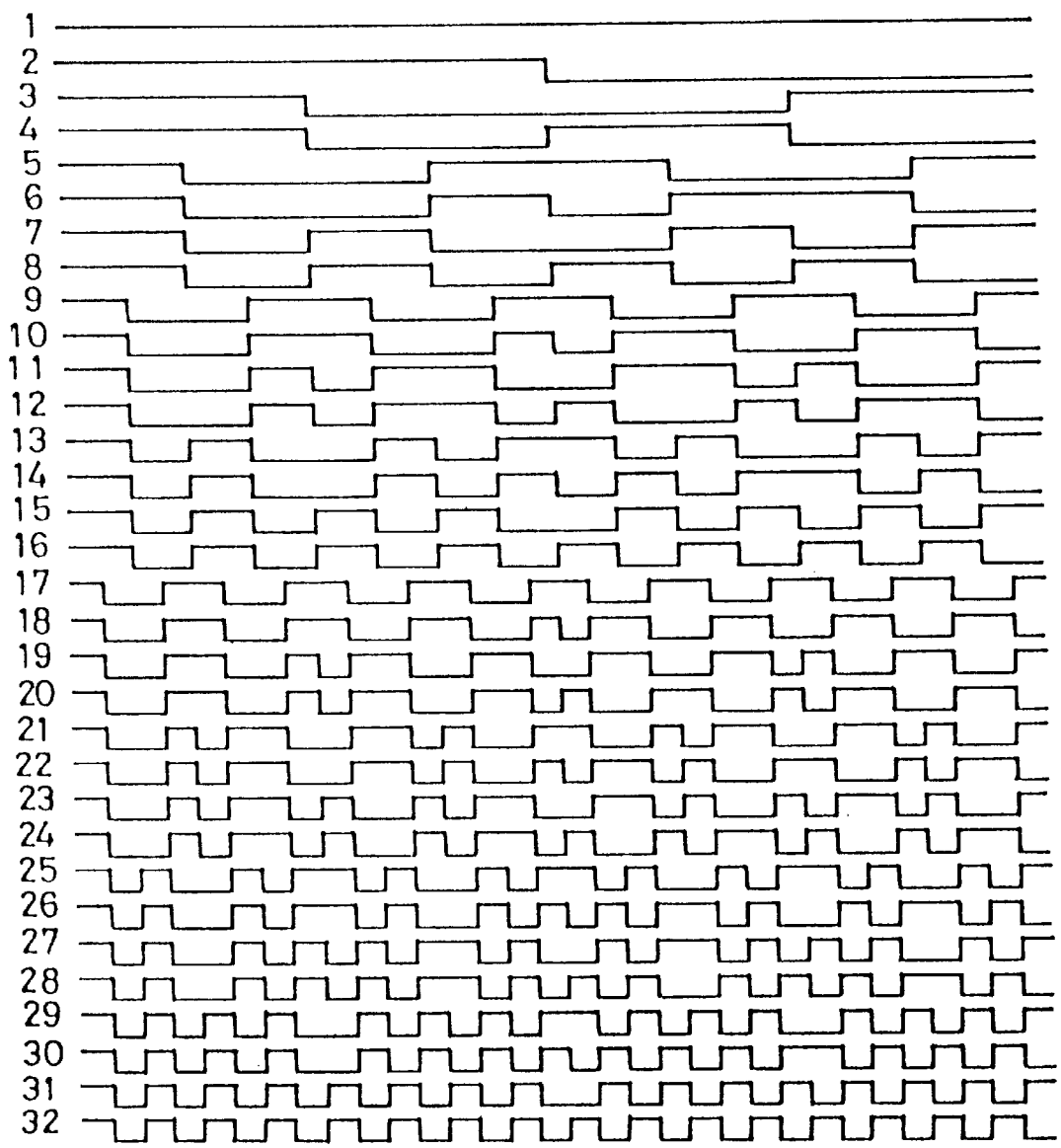
FIG. 36 is a waveform chart for explaining the operation of the driving circuit shown in FIG. 34.

FIG. 36 is a waveform chart illustrating the Walsh function.

Figure 7:
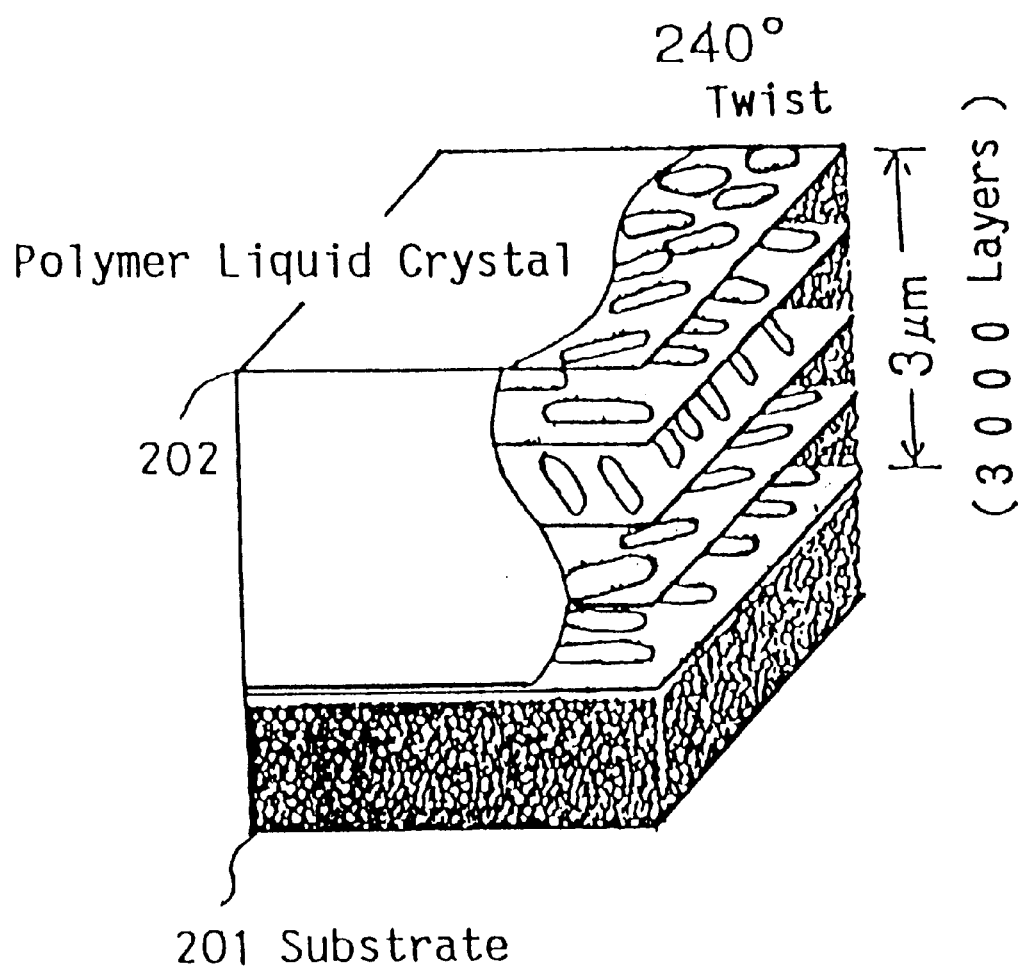
FIG. 7 is a typical partially broken perspective view showing one example of a conventional wavelength dispersion compensating polymer film.
Figure 8A:
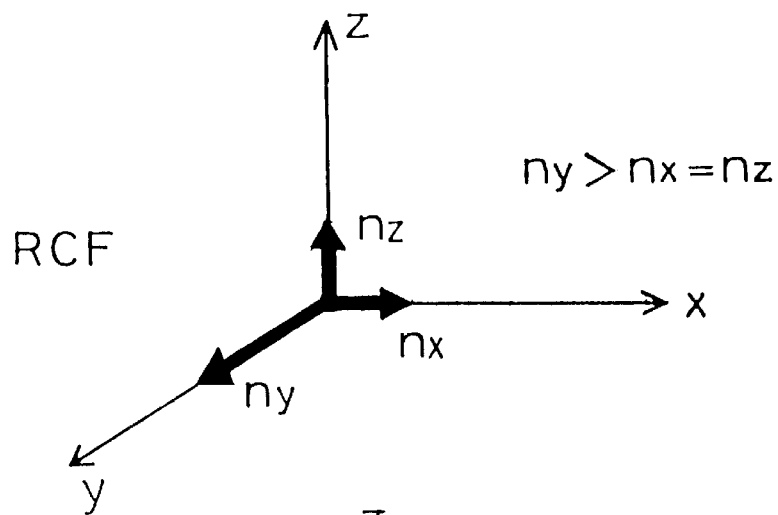
FIGS. 8A, 8B and 8C are typical views for explaining a problem of the conventional wavelength dispersion compensating polymer film.
Figure 8B:
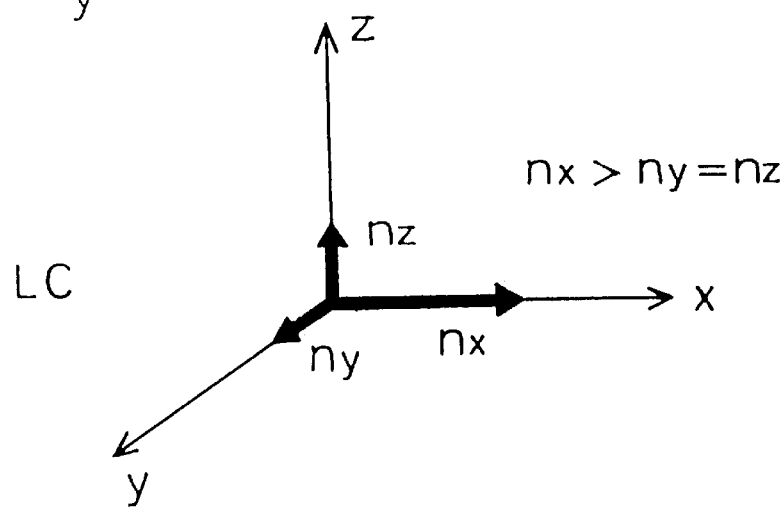
Figure 8C:
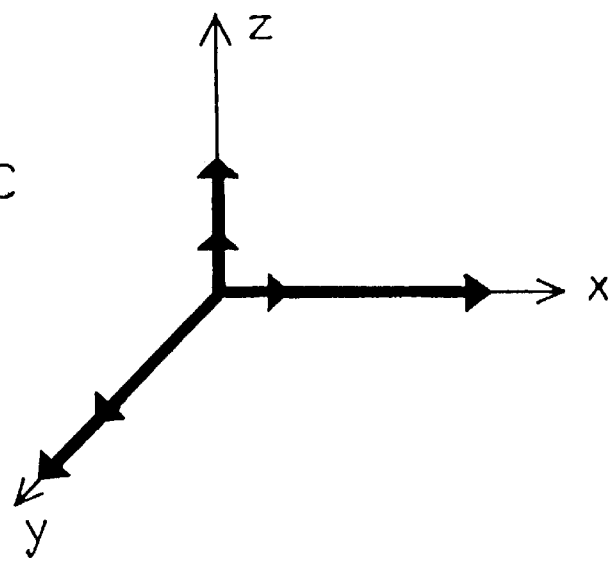

In the case of simultaneous selection of seven lines, line signals are generated using seven Walsh functions, for example, functions from the second to eighth functions. As apparent from comparison between FIG. 35 and FIG. 36, for example, $F_1(t)$ corresponds to the Walsh function in the second place from the top. This is at the high level during the first half of one period and at the low level during the second half. In response to this, the arrangement of the pulses included in $F_1(t)$ is, for example, (1, 1, 1, 1, 0, 0, 0, 0). Similarly, $F_2(t)$ corresponds to the Walsh function in the third place from the top and the arrangement of the pulses thereof is, for example, (1, 1, 0, 0, 0, 0, 1, 1). Further, $F_3(t)$ corresponds to the Walsh function in the fourth place from the top and the arrangement of the pulses thereof is, for examples (1, 1, 0, 0, 1, 1, 0, 0). As apparent from the above description, the line signal applied to one pair of line electrodes is represented by an appropriate combination pattern based on an orthogonal relationship. In the case shown in FIG. 7, orthogonal functions $F_8(t)$ to $F_{14}(t)$ are applied to the second pair in accordance with the same combination pattern. Similarly, predetermined line signals are applied to the third and later pairs in accordance with the same combination pattern.

Although this method of simultaneously selecting plural lines has been proposed as a driving method to increase the response speed of an STN liquid crystal display panel and to achieve higher contrast, it is suitable also as a method for driving a liquid crystal display panel according to the present invention. As a result, a liquid crystal display panel having high contrast and a high viewing angle and capable of displaying animation has been obtained.

An STN simple matrix liquid crystal display panel has been significantly poorer than a TFT active matrix liquid crystal display panel in two display characteristics, i.e., the response speed and viewing angle. By driving a liquid crystal display panel according to the present invention using the method of simultaneously driving plural lines, a simple matrix liquid crystal display panel has been achieved which is excellent in both the viewing angle characteristic and response speed.

As described above, according to the present invention, in a liquid crystal display panel comprising nematic liquid crystal twisted at a high degree which is arranged between a pair of substrates having a transparent electrode and an orientation plane and which has positive anisotropy of refractive index, while the liquid crystal layer has a positive anisotropy of refractive index and its optical axis is oriented in the plane direction, the polymer film for compensating and varying the wavelength dispersion has a negative anisotropy of refractive index and its optical axis is oriented in the plane direction. Further, while the liquid crystal layer is twistedly oriented and its optical axis is twistedly rotated in the forward direction at an angle over 90° along the thickness direction, the polymer film is twistedly rotated continuously or stepwise in the reverse direction at an angle over 90° along the thickness direction.

Such configuration allows the triaxially symmetrical compensation of the optical anisotropy of the liquid crystal cell and provides such effects that not only the coloration is removed but also the viewing angle dependency of contrast is improved significantly. Further, the use of the polymer film whose optical axis is twistedly rotated allows the compensation of not only the shift of color caused by the thickness of the liquid crystal layer but also the shift of color caused by the twisted orientation of the liquid crystal layer.

Further, the retardation of the liquid crystal is set at 0.55 $\mu$m to 0.75 $\mu$m and the twist angle is set at 180° to 270°. Or, the retardation of the liquid crystal is set at 0.55 μm to 0.75 μm, the twist angle is set at 180° to 270° and a polymer film which is an optically anisotropic substance whose retardation is set at 200 μm or less is included. Or, the retardation of the liquid crystal is set at 0.55 μm to 0.75 μm, the twist angle is set at 180° to 270° and a polymer film which is an optically anisotropic substance whose refractive index in the thickness direction is set smaller than that in the in-plane direction which is orthogonal thereto is included.

Such a configuration makes it possible to expand the viewing angle of a liquid crystal display panel, to prevent coloration, and to achieve higher contrast.

In addition, the use of the method of simultaneously selecting plural lines as the driving method provides a simple matrix liquid crystal display panel which is equivalent to a TFT liquid crystal display panel in display quality.

What is claimed is:

1. A display device comprising:

a liquid crystal cell for modulating light beams incident on the liquid crystal cell and advancing in a thickness direction of the liquid crystal cell from one side thereof to an opposite side, the liquid crystal cell having a liquid crystal material layer disposed between a group of line electrodes and a group of row electrodes to define a matrix of pixels, the liquid crystal material layer having a positive anisotropy of refractive index and an optical axis oriented in the plane of the liquid crystal cell;

optically anisotropic substances laminated on opposite sides of the liquid crystal cell for compensating and varying a wavelength dispersion of the light beams passing through the liquid crystal cell, the optically anisotropic substances comprising polymer films having a negative anisotropy of refractive index and an optical axis oriented in the plane of the liquid crystal cell; and means for applying to the group of line electrodes a plurality of line signals represented by pairs of orthogonal functions by pair-sequential scanning during a selection period.

2. A liquid crystal display panel comprising:

first and second substrates each having a transparent electrode and an orientation plane;

a nematic liquid crystal material disposed between the first and second substrates and having a positive anisotropy of refractive index and a retardation of 0.55 μm to 1.75 μm, the nematic liquid crystal material having molecules twisted at a high degree with a twist angle of 180° to 270°;

a polarizer disposed over the first substrate; and a simplex polymer film comprised of a single optically anisotropic substance disposed between the first substrate and the polarizer, the simplex polymer film having a retardation of 20 nm to 200 nm.

3. A liquid crystal display device having a liquid crystal display panel as set forth in claim 2.

4. A liquid crystal display panel comprising:

first and second substrates each having a transparent electrode and an orientation plane;

a nematic liquid crystal material disposed between the first and second substrates and having a positive anisotropy of refractive index and a retardation of 0.55 μm to 1.75 μm, the nematic liquid crystal material having molecules twisted at a high degree with a twist angle of 180° to 270°;

a polarizer disposed over the first substrate; and a polymer film disposed between the first substrate and the polarizer, the polymer film having a first refractive index corresponding to a first axis extending in a thickness direction of the polymer film, a second refractive index corresponding to a second axis in a plane of the polymer film, and a third refractive index corresponding to a third axis in the plane of the polymer film and orthogonal to the second axis, the first refractive index being smaller than the second and third refractive indices.

5. A liquid crystal display panel as claimed in claim 4; wherein the second refractive index is equal to the third refractive index.

6. A liquid crystal display panel as claimed in claim 4; wherein the first axis is generally orthogonal to the second and third axes.

7. A liquid crystal display device having a liquid crystal display panel as set forth in claim 4.

8. A liquid crystal display device comprising:

a liquid crystal display cell having a liquid crystal layer disposed between a group of line electrodes and a group of row electrodes to define a matrix of pixels, the liquid crystal layer having a positive anisotropy of refractive index;

an optically anisotropic substance disposed over the liquid crystal cell, the optically anisotropic substance comprising a polymer film having a negative anisotropy of refractive index; and means for applying to the group of line electrodes a plurality of line signals represented by pairs of orthogonal functions by pair-sequential scanning during a selecting period.

9. A display device as claimed in claim 8; wherein the liquid crystal layer has an optical axis disposed in a direction along a plane thereof; and wherein the polymer film has an optical axis disposed in the direction along the plane of the liquid crystal layer.

10. A display device as claimed in claim 8; wherein the liquid crystal layer comprises a nematic liquid crystal material having a retardation of 0.55 μ to 0.75 μ and having super-twisted molecules with a twist angle of 180° to 270°.

11. A display device as claimed in claim 10; wherein the polymer film has a retardation of 20 nm to 200 nm.

12. A display device comprising:

a liquid crystal cell for modulating light beams incident on the liquid crystal cell and advancing in a thickness direction of the liquid crystal cell from one side thereof to an opposite side, the liquid crystal cell having a liquid crystal material layer disposed between a group of line electrodes and a group of row electrodes to define a matrix of pixels, the liquid crystal material layer being twisted and having a positive anisotropy of refractive index and an optical axis oriented in the plane of the liquid crystal cell, the optical axis of the liquid crystal material layer being twisted with a twist angle greater than 90° in a forward direction along the thickness direction of the liquid crystal cell;

an optically anisotropic substance for compensating and varying a wavelength dispersion of the light beams passing through the liquid crystal cell, the optically anisotropic substance comprising a polymer film having a negative anisotropy of refractive index and an optical axis oriented in the plane of the liquid crystal cell, the optical axis of the polymer film being twisted with a twist angle greater than 90° in a direction reverse to the forward direction along the thickness direction of the liquid crystal cell; and means for applying to the group of line electrodes a plurality of line signals represented by pairs of orthogonal functions by pair-sequential scanning during a selection period.

13. A display device comprising:

a liquid crystal cell for modulating light beams incident on the liquid crystal cell and advancing in a thickness direction of the liquid crystal cell from one side thereof to an opposite side, the liquid crystal cell having a liquid crystal material layer disposed between a group of line electrodes and a group of row electrodes to define a matrix of pixels, the liquid crystal material layer being twisted and having a positive anisotropy of refractive index and an optical axis oriented in the plane of the liquid crystal cell, the optical axis of the liquid crystal material layer being twisted with a twist angle greater than 90° in a forward direction along the thickness direction of the liquid crystal cell;

optically anisotropic substances for compensating and varying a wavelength dispersion of the light beams passing through the liquid crystal cell, the optically anisotropic substances comprising a plurality of polymer films each having a negative anisotropy of refractive index and an optical axis oriented in the plane of the liquid crystal cell, the optical axes of the polymer films being twisted with a twist angle greater than 90° in a direction reverse to the forward direction along the thickness direction of the liquid crystal cell; and means for applying to the group of line electrodes a plurality of line signals represented by pairs of orthogonal functions by pair-sequential scanning during a selection period.

* * * * *